(12) United States Patent
Nakahira

(10) Patent No.: US 8,773,980 B2
(45) Date of Patent: Jul. 8, 2014

(54) DYNAMIC BANDWIDTH ALLOCATING METHOD AND DEVICE WITH HARDWARE REDUCED AND BANDWIDTH USABILITY IMPROVED

(75) Inventor: Yoshihiro Nakahira, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 628 days.

(21) Appl. No.: 12/585,210

(22) Filed: Sep. 8, 2009

(65) Prior Publication Data

US 2010/0061401 A1 Mar. 11, 2010

(30) Foreign Application Priority Data

Sep. 9, 2008 (JP) ................. 2008-230511

(51) Int. Cl.
*H04J 1/16* (2006.01)
*H04L 12/56* (2006.01)
*H04L 5/00* (2006.01)

(52) U.S. Cl.
CPC ............... *H04L 45/28* (2013.01); *H04L 5/003* (2013.01)
USPC .......................................... 370/227; 370/228

(58) Field of Classification Search
CPC ............................... H04L 45/28; H04L 5/003
USPC ................... 370/395.41, 431, 464, 468, 498; 70/329, 227, 228, 341, 431
See application file for complete search history.

(56) References Cited

U.S. PATENT DOCUMENTS 7,826,483 B2 * 11/2010 Neuhaeusler ................. 370/468
2003/0179769 A1 9/2003 Shi et al.
2006/0233197 A1 10/2006 Elmoalem et al.
2007/0133988 A1 6/2007 Kim et al.
2008/0159201 A1 * 7/2008 Ozluturk ...................... 370/318

FOREIGN PATENT DOCUMENTS

| EP | 1788735 A1 | 5/2007 |
| JP | 5153154 A | 6/1993 |
| WO | WO-03/007518 A2 | 1/2003 |

OTHER PUBLICATIONS

Naoaki Yamanaka, et al., "Performance Limitation of Leaky Bucket Algorithm for Usage Parameter Control and Bandwidth Allocation Methods" IEICE Trans. Commun., vol. E75-B, No. 2, pp. 82-86, Feb. 1992.
Naoaki Yamanaka, et al., "ATM Network Traffic Management System by Deterministic UPC" IEICE Trans., vol. J76-B-I, No. 3, pp. 253-263, Mar. 1993.
Yoshihiro Nakahira et al., "Channel allocation method for improvement of bandwidth utilization", The Institute of Electronics Information and Communication Engineers (Technical Report), CS2008-23, Sep. 4, 2008.

* cited by examiner

*Primary Examiner* — Brenda H Pham
(74) *Attorney, Agent, or Firm* — Rabin & Berdo, P.C.

(57) ABSTRACT

In subscriber units 0 to (N−1), a subscriber unit to be allocated to a bandwidth is defined as a subscriber unit K, where K is an integer from 0 to (N−1) inclusive. In a bandwidth allocating method, a free bandwidth in a communication channel ch(K−1) not used by the subscriber unit (K−1) is found, and a bandwidth requested by the subscriber unit K is allocated to the free bandwidth in the communication channel ch(K−1). A free bandwidth in the communication channel chK is found on the basis of a residual bandwidth requested by the subscriber unit K not allocated to the bandwidth in the communication channel ch(K−1), and the residual bandwidth requested by the subscriber unit K is allocated to the found free bandwidth in the communication channel chK. The operation is repeated for the subscriber units 0 to (K−1) and (K+1) to (N−1).

8 Claims, 42 Drawing Sheets

FIG. 35A

| COMMUNICATION CH | SUBSCRIBER NUMBER | | | | | | | |
|---|---|---|---|---|---|---|---|---|
| | 0 | 1 | 2 | 3 | 4 | 5 | 6 | 7 |
| 0 | ○ | | | | | | | |
| 1 | | ○ | | | | | | |
| 2 | | | ○ | | | | | |
| 3 | | | | | | | | ○ |
| 4 | | | | | ○ | | | |
| 5 | ○ | | | | | | | |
| 6 | | | | | | ○ | | |
| 7 | | | | | | | ○ | |

FIG. 35B

| COMMUNICATION CH | SUBSCRIBER NUMBER | | | | | | | |
|---|---|---|---|---|---|---|---|---|
| | 0 | 1 | 2 | 3 | 4 | 5 | 6 | 7 |
| 0 | ○ | | | | | | | |
| 1 | ○ | ○ | | | | | | |
| 2 | | | ○ | | | | | |
| 3 | | | | ○ | ○ | | | |
| 4 | | | | | | ○ | | |
| 5 | | | | | | ○ | ○ | |
| 6 | | | | | | | ○ | ○ |
| 7 | ○ | | | | | | | ○ |

FIG. 35C

| COMMUNICATION CH | SUBSCRIBER NUMBER | | | | | | | |
|---|---|---|---|---|---|---|---|---|
| | 0 | 1 | 2 | 3 | 4 | 5 | 6 | 7 |
| 0 | ○ | | | | | | | |
| 1 | ○ | | | ○ | | | | |
| 2 | | ○ | ○ | | | | | |
| 3 | | | ○ | | | | | |
| 4 | | | | | ○ | ○ | | |
| 5 | | | | | | ○ | ○ | |
| 6 | | | | | | | ○ | ○ |
| 7 | | | | | | | | ○ |

FIG. 35D

| COMMUNICATION CH | SUBSCRIBER NUMBER | | | | | | | |
|---|---|---|---|---|---|---|---|---|
| | 0 | 1 | 2 | 3 | 4 | 5 | 6 | 7 |
| 0 | ○ | | | | | | | |
| 1 | | | ○ | | | | | |
| 2 | | ○ | | | | | | |
| 3 | | | | ○ | | | | |
| 4 | | | | | ○ | | | |
| 5 | | | | | | ○ | | |
| 6 | | ○ | | | | | ○ | |
| 7 | | ○ | | | | | | ○ |

| COMMUNICATION CH | SUBSCRIBER UNIT NUMBER | | | | | | | |
|---|---|---|---|---|---|---|---|---|
| | 0 | 1 | 2 | 3 | 4 | 5 | 6 | 7 |
| 0 | ○ | | | | | | ○ | ○ |
| 1 | ○ | ○ | | | | | | ○ |
| 2 | ○ | ○ | ○ | | | | | |
| 3 | | ○ | ○ | ○ | | | | |
| 4 | | | ○ | ○ | ○ | | | |
| 5 | | | | ○ | ○ | ○ | | |
| 6 | | | | | ○ | ○ | ○ | |
| 7 | | | | | | ○ | ○ | ○ |

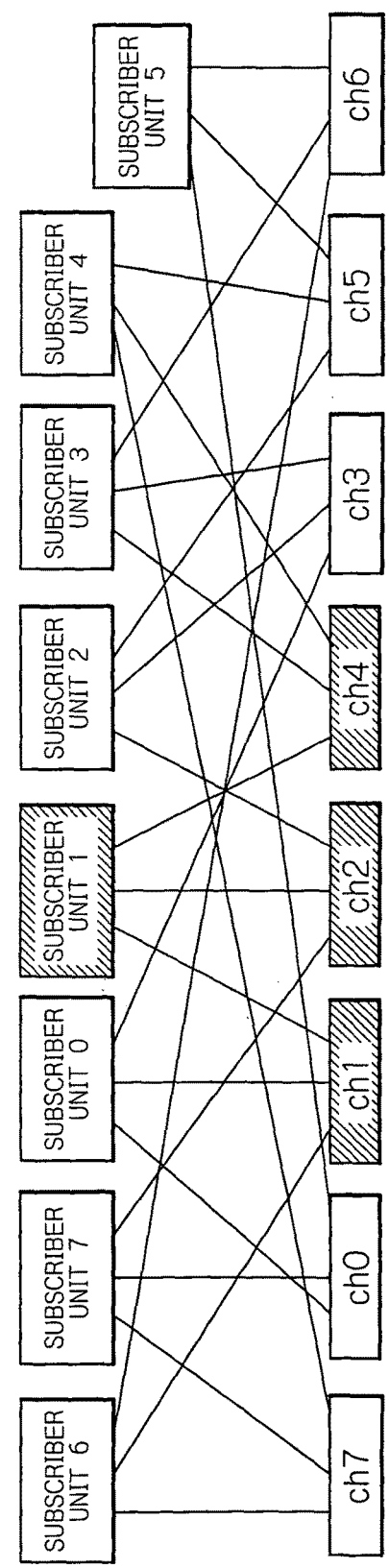

FIG. 39

SUBSCRIBER NUMBER

|  |  | 0 | 1 | 2 | 3 | 4 | 5 | 6 | 7 |
|--|--|--|--|--|--|--|--|--|--|
| CH NUMBER | 0 | [1] |  |  |  | [18] | [20] |  |  |
|  | 1 | [9] | [2] |  |  |  |  | [21] |  |
|  | 2 | [10] |  | [3] |  |  |  |  | [23] |
|  | 3 |  | [11] | [13] | [4] |  |  |  |  |
|  | 4 |  | [12] |  |  | [5] |  |  | [24] |
|  | 5 |  |  | [14] |  |  | [6] | [22] |  |
|  | 6 |  |  |  | [15] | [17] |  | [7] |  |
|  | 7 |  |  |  | [16] |  | [19] |  | [8] |

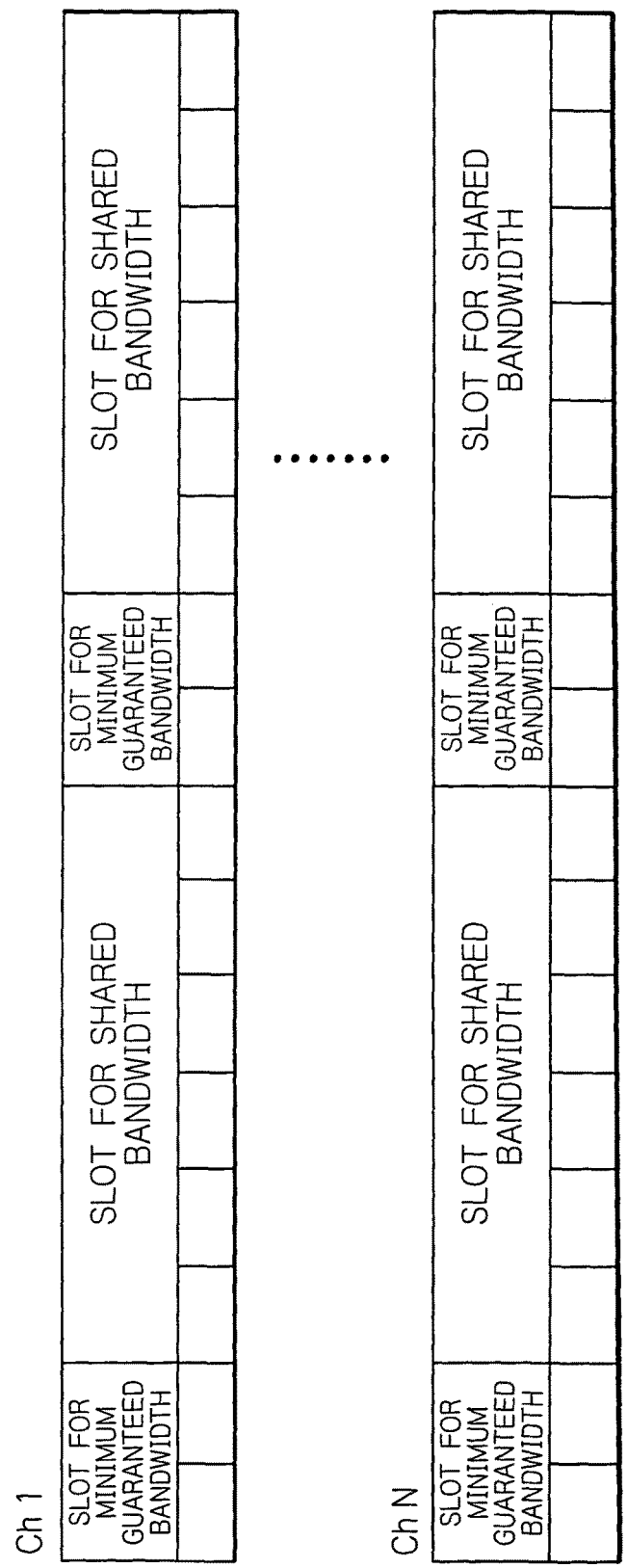

DYNAMIC BANDWIDTH ALLOCATING METHOD AND DEVICE WITH HARDWARE REDUCED AND BANDWIDTH USABILITY IMPROVED

BACKGROUND OF THE INVENTION

1. Field of the Invention

The present invention relates to a method and a system for allocating bandwidths for use in a telecommunications network having available channels limitative, such as a wavelength division multiplex passive optical network (WDM-PON) and a code division multiplex access passive optical network (CDMA-PON).

2. Description of the Background Art

FIG. 1 is a schematic system diagram useful for understanding an exemplified allocation of bandwidths for communications between central-office (CO) equipment 10 and subscriber terminals, e.g. personal computers, through network devices for subscriber, i.e. subscriber units 11 to 14. In the system having bandwidths limitative which are available between the central-office equipment 10 and the subscriber units 11 to 14, as shown in FIG. 1, the subscriber units 11 to 14 are adapted to apply for a parameter, such as a bandwidth, for communication to the central-office equipment 10 (step ST1). If the application from the subscriber units 11 to 14 is acceptable to the central-office equipment 10, it is then accepted, and otherwise it is rejected (step ST2). The subscriber units 11 to 14 will use respective bandwidths accepted by the central-office equipment 10 for the communication. If communication is tried on a bandwidth other than those accepted, i.e. violates the rejection, information on that communication will be discarded (step ST3). In another solution, in order to prevent the discard of information due to the violation, a rejected subscriber unit again requests the central-office equipment 10 for transmission before starting the communication, and when the subscriber unit receives permission for transmission and is allotted transmission timing or the bandwidth of a channel from the equipment 10, it will use the received information to proceed to the communication, the procedure being repeated until successful.

FIG. 2 is a conceptual diagram useful for understanding an optical access network as an example of the prior art system shown in FIG. 1. As seen from the figure, this example of optical access network includes an OLT (Optical Line Terminal) 20 provided as central-office equipment, ONUs (Optical Network Units) 21 to 24 provided as subscriber units, an optical beam coupler/splitter 25, optical fibers 26a to 26d respectively connecting the ONUs 21 to 24 to the coupler/splitter 25, and another optical fiber 27 connecting the OLT 20 to the coupler/splitter 25. Each of the ONU has to transmit an up-going optical signal at the timing of causing no collision of the signal to be transmitted against another up-going signal transmitted from another ONU in the coupler/splitter 25. The transmission timing is reported from the OLT 20 to the ONUs 21 to 24.

FIG. 3 is a conceptual diagram useful for understanding a CDMA radio access system as another example of the prior art system shown in FIG. 1. In the radio communication system shown in FIG. 3, a base station as central-office equipment 30 and subscriber terminals 31 to 34 communicate with each other over air interface serving as a shared transmission medium with radio waves. In the CDMA system, a frequency bandwidth is divided with code to form several channels, e.g. CH1 to CH4, which are time-shared for communication. Such a solution of communication is also the same as an optical access system using the optical CDMA technique.

In the communications systems shown in FIGS. 1, 2 and 3, it is important how to allocate bandwidths to the respective subscriber units. As a solution useful for practicing the allocation, a two-stepped leaky bucket system is disclosed in, for example, Naoaki YAMANAKA, et al., "Performance Limitation of Leaky Bucket Algorithm for Usage Parameter Control and Bandwidth Allocation Methods" IEICE Trans. Commun., Vol. E75-B, No. 2, pp. 82-86, February, 1992. A traffic management system by UPC (Usage Parameter Control) in an ATM (Asynchronous Transfer Mode) network is disclosed in, for example, Naoaki YAMANAKA, et al., "ATM Network Traffic Management System by Deterministic UPC" IEICE Trans., Vol. J76-B-I, No. 3, pp. 253-263, March, 1993.

FIG. 4 is also a conceptual diagram useful for understanding the UPC in the leaky bucket system. For describing a bandwidth control in the leaky bucket system, a bandwidth control model is used, in which information as in the form of traffic, such as packet or token, is compared to "water" and a queue serving as means for holding information is compared to a "bucket with a hole". As seen from FIG. 4, in the leaky bucket system, each input line uses two stepped "buckets with a hole" or queues 41 and 42 and a readout function therefrom. The "water" 43 to be inputted is supplied into the first step of "bucket with a hole" 41. This "water" to be inputted corresponds with information desired to be transmitted by the subscriber terminal. The amount of the information may increase or decrease, and possibly vanish. Out of the first step of "bucket with a hole" 41, a fixed amount of "water" flows per unit time, that is, a fixed amount of information per unit time is read out from the queue. A peak rate Tp applied for by the transmitting terminal corresponds to the size of the "hole" 41a of the first step of "bucket with a hole" 41, i.e. the amount of the information read out per unit time from the bucket 41. According to the volume 41b of the first step of "bucket with a hole" 41, an allowable amount of "water" violating, or exceeding, the peak rate is determined. If the input "water" violates the peak rate continuously for a long period, the "water" overflows from the first step of "bucket with a hole" 41 to be discarded.

According to the size of a "hole" 42a of the second step of "bucket with a hole" 42, the amount of information read out per unit time from the bucket 42 is determined, and the size corresponds to the size of an average bandwidth, i.e. average rate. According to the volume 42b of the second step of "bucket with a hole" 42, an allowable amount of "water" violating, or exceeding, an average flow rate $T_a$ outputted from the "hole" 42a is determined. In other words, according to the volume of the second step of "bucket with a hole" 42, an allowable range of temporal bias of inflowing "water", i.e. an arriving packet, is defined. Whenever the amount $T_{pe}$ of information arriving in a certain period $P_e$ exceeds $T_a \times P_e$ (i.e. $T_{pe} > T_a \times P_e$), the violating traffic will overflow from the second step of "bucket with a hole" 42 to be discarded.

The mechanism shown in FIG. 4 can be installed in subscriber units (network devices) configured so as to input a packet (traffic) as "water". However, as described in YAMANAKA, et al., the mechanism shown in FIG. 4 may be provided in the central-office equipment for all subscribers and the subscriber units are adapted to be responsive to control data sent from the central-office equipment to control the timing and period for transmitting user data. In that case, the "bucket with a hole" receives an application for a communication bandwidth from a subscriber unit and a token as traffic information in the queue installed in the subscriber terminal, and sends a transmission permission signal as its output to the subscriber unit (ONU), which in turn outputs the allowed amount of traffic.

FIG. 5 shows a mechanism for allocating a bandwidth in the next-generation PON (Passive Optical Network) system. In the current generation PON, such as G-PON (Gigabit capable PON) and GE-PON (Gigabit Ethernet-PON), in order to share a bandwidth, a packet multiplex technique, a kind of TDM (Time Division Multiplex) technique, is used, see FIG. 2. By contrast, the next-generation PON employs, in addition to the packet multiplex technique, a WDM (Wavelength Division Multiplex) or OCDM (Optical Code Division Multiplex) technique.

In the system shown in FIG. 5, for example, the subscriber units #0 to #(N−1) communicate over the channels ch0 to ch(N−1), respectively, as default channels. In FIG. 5, N is equal to 16. The ONUs functioning as part of subscriber units located in the respective subscriber premises and an OLT transport unit 503 functioning as part of the central-office equipment 501 report a bandwidth allowed for communication to an OLT controller 502, serving as a bandwidth calculating unit (step ST11, FIG. 5). This report includes information, such as a request for bandwidth and the queue length of a queue buffer in the subscriber unit. Thus, the signal in step ST11 may include a bandwidth request. Alternatively, in another method, either the ONU or OLT monitors the bandwidth being used to report information thereon. If the subscriber unit #1 requests communication in a bandwidth below that of the channel ch1 and another subscriber unit #0 requests communication in a bandwidth exceeding that of the channel ch0, the OLT controller 502 directs the subscriber unit #0 to communicate in an unused bandwidth within the channel ch1 in addition to the channel ch0 (step ST12, FIG. 5). That is, the signal in step ST12 may include a reply of transmission channel and time. This means that, while the subscriber unit #1 does not use the channel ch1, the subscriber unit #0 uses the channel ch1 for transmission. In this way, a free resource of bandwidth for each subscriber unit can be used by another subscriber unit, thereby increasing the usability of bandwidths. Incidentally, Japanese patent laid-open publication No. 153154/1993 discloses an exemplified system for managing and processing bandwidths of channels, wherein a bandwidth being used may be changed as needed.

In the above-described conventional techniques, many subscriber units can share bandwidths to increase the bandwidth usability. However, there are problems that the hardware implementing the sharing of bandwidths increases in volume and hence in cost. For example, the hardware implementing 16 subscriber units each of which can share bandwidths of 16 channels causes the cost of its transmitter/receiver to rise to 16-fold compared with the hardware without sharing bandwidths, that is, implementing 16 subscriber units each of which may use only the bandwidth of one channel.

In an exemplified method for sharing channels, each two of the subscriber units share two channels with each other, as shown in FIG. 6. In the figure, the subscriber units #0 and #1 share the channels ch0 and ch1, the subscriber units #2 and #3 share the channels ch2 and ch3, and the subscriber units #4 and #5 share the channels ch4 and ch5. However, a sharing method is expected that has higher bandwidth usability.

SUMMARY OF THE INVENTION

It is an object of the present invention to provide a method and a system for allocating a bandwidth that implement the reduced volume of hardware for sharing the bandwidths with the bandwidth usability increased.

In accordance with the present invention, a bandwidth allocating method in a bandwidth allocating device allocates, when transmitting a packet from a plurality of subscriber units 0 to (N−1) to a central office device, bandwidths of a plurality of communication channels ch0 to ch(N−1) available for transmission of information to the plurality of subscriber units 0 to (N−1), where N is a natural number, so that, when bandwidths requested by the subscriber units 0 to (N−1) or index information allowing calculation of bandwidths requested by the subscriber units 0 to (N−1) is inputted to the bandwidth allocating device, a subscriber unit A of the plurality of subscriber units 0 to (N−1) uses at least bandwidths of the communication channels chA and ch(A−1), where A is a natural number less than N, that the subscriber unit 0 uses at least bandwidths of the communication channels ch0 and ch(N−1), that the subscriber units A and (A−1) share at least bandwidths of the communication channel ch(A−1), and that the subscriber units (N−1) and 0 share at least bandwidths of the communication channel ch0, where among the plurality of subscriber units 0 to (N−1), a subscriber unit to be allocated to a bandwidth is defined as a subscriber unit K, where K is an integer from 0 to (N−1), inclusive. The method comprises the steps of: finding a free bandwidth in the communication channel ch(K−1) not used by the subscriber unit (K−1); allocating a bandwidth requested by the subscriber unit K to the found free bandwidth in the communication channel ch(K−1); finding a free bandwidth in a communication channel chK on the basis of a residual bandwidth requested by the subscriber unit K not allocated to the bandwidth in the communication channel ch(K−1); and allocating the residual bandwidth requested by the subscriber unit K to the found free bandwidth in the communication channel chK, the steps of finding the free bandwidth not used in the communication channel ch(K−1), allocating the bandwidth requested by the subscriber unit K to the free bandwidth in the communication channel ch(K−1), finding the free bandwidth in the communication channel chK, and allocating the residual bandwidth requested by the subscriber unit K to the free bandwidth in the communication channel chK being performed for each of the subscriber units 0 to (K−1) and (K+1) to (N−1).

Also in accordance with the present invention, a bandwidth allocating device allocates, when transmitting a packet from a plurality of subscriber units 0 to (N−1) to a central office device, bandwidths of a plurality of communication channels ch0 to ch(N−1) available for transmission of information to the plurality of subscriber units 0 to (N−1). In the bandwidth allocating device, when bandwidths requested by the subscriber units 0 to (N−1) or index information allowing calculation of bandwidths requested by the subscriber units 0 to (N−1) is inputted to the bandwidth allocating device, a subscriber unit A of the plurality of subscriber units 0 to (N−1) uses at least bandwidths of the communication channels chA and ch(A−1), where A is a natural number less than N, the subscriber unit 0 uses at least bandwidths of the communication channels ch0 and ch(N−1), the subscriber units A and (A−1) share at least bandwidths of the communication channel ch(A−1), and the subscriber units (N−1) and 0 share at least bandwidths of the communication channel ch0, where among the plurality of subscriber units 0 to (N−1), a subscriber unit to be allocated a bandwidth is defined as a subscriber unit K, where K is an integer from 0 to (N−1), inclusive. The bandwidth allocating device comprises: a first finding section for finding a free bandwidth in the communication channel ch(K−1) not used by the subscriber unit (K−1); a first allocator for allocating a bandwidth requested by the subscriber unit K to the found free bandwidth in the communication channel ch(K−1); a second finding section for finding a free bandwidth in a communication channel chK on the basis of a residual bandwidth requested by the subscriber unit K not allocated to the bandwidth in the communication channel ch(K−1); and a second allocator for allocating the residual bandwidth requested by the subscriber unit K to the found free bandwidth in the communication channel chK, the first finding section, first allocator, second finding section, and second allocator process for each of the subscriber units 0 to (K−1) and (K+1) to (N−1).

According to the bandwidth allocating method and device of the present invention, there are attained advantages of reducing the volume of the hardware implemented for sharing the bandwidths and increasing the bandwidth usability.

BRIEF DESCRIPTION OF THE DRAWINGS

The objects and features of the present invention will become more apparent from consideration of the following detailed description taken in conjunction with the accompanying drawings in which:

FIG. 35A shows a table useful for understanding a bandwidth allocation in a case where two subscriber units share the resource of two channels with each other;

FIG. 35B shows a table useful for understanding bandwidth allocation in a case where each subscriber unit uses two channels in a cyclic manner;

FIG. 35C shows a table useful for understanding the bandwidth allocating method in accordance with the third embodiment;

FIG. 35D shows a table useful for understanding the bandwidth allocating method in accordance with a variation of the third embodiment;

FIG. 38A shows a table useful for understanding a bandwidth allocating method in accordance with the fourth embodiment;

FIG. 38B is a schematic diagram useful for understanding the exemplified allocation of the channels in the bandwidth allocating method of the fourth embodiment;

FIGS. 39 and 40 show tables useful for understanding other exemplified bandwidth allocating methods in accordance with the fourth embodiment;

FIG. 58 schematically shows the time slots of the channels useful for understanding the operation of the dynamic bandwidth allocating device in accordance with the fifth reference example.

DESCRIPTION OF THE PREFERRED EMBODIMENTS

Figure 7:
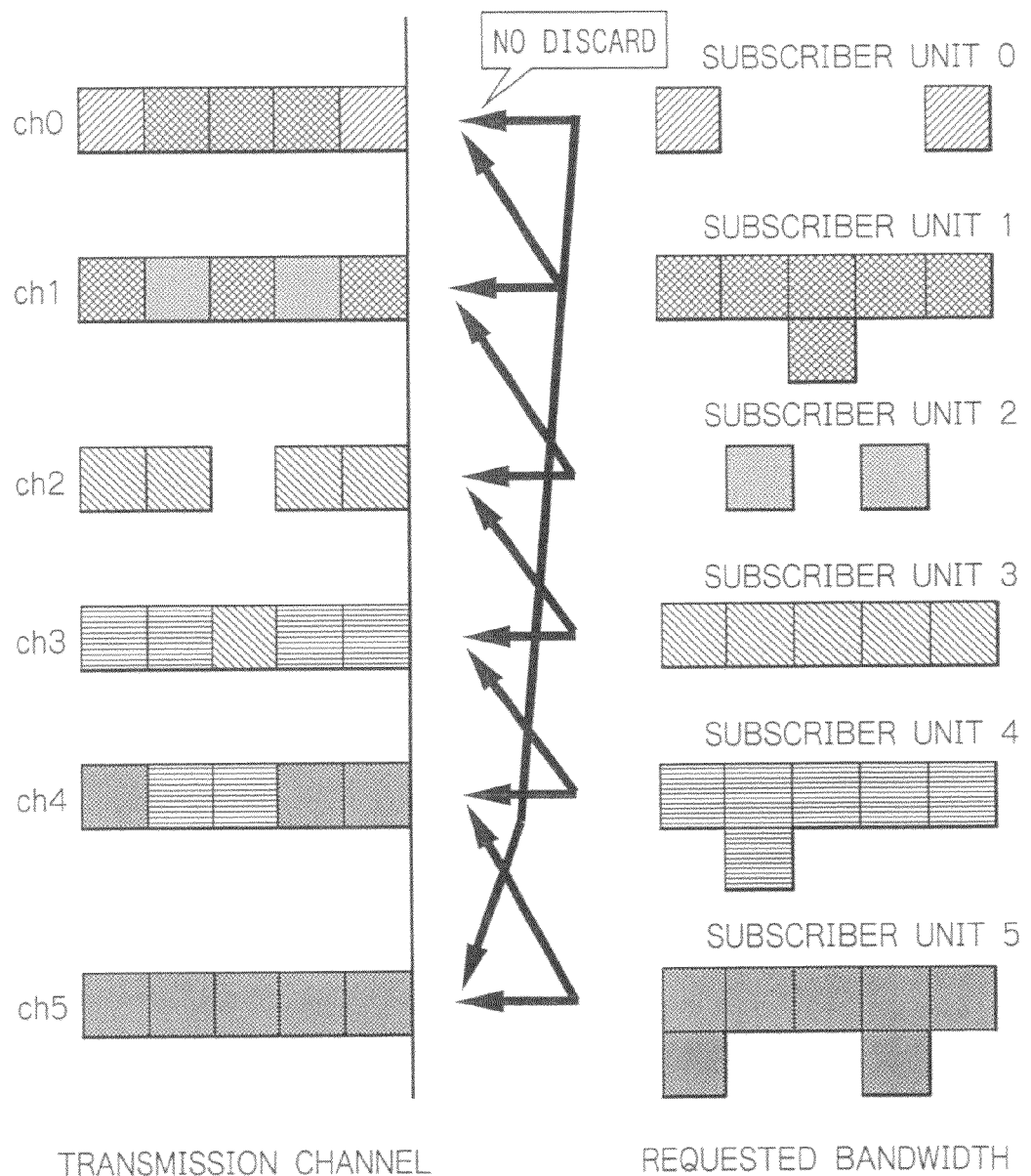
FIG. 7 schematically shows the transmission channels and the requested bandwidths in a communication system sharing two channels by each of the subscriber units in a cyclic manner.

Now, with reference to FIG. 7, it will be described how a bandwidth is allocated in accordance with an embodiment of the present invention. FIG. 7 conceptually shows how a subscriber unit A communicates on channels chA and ch(A−1), and exceptionally a subscriber unit #0 communicates on channels ch0 and ch(N−1). Now, A is an integer equal to or more than "0" but less than N, and N represents the number of the subscriber units, i.e. channels, and hence is a natural number. The sharing of the channels shown in FIG. 7 and its variations will be described in detail in connection with the following first to fourth embodiments. The essential technology for the first to fourth embodiments, particularly the concept of the internal configuration of a dynamic bandwidth allocating device and leaky bucket algorithm used in its operation will be described as reference examples after describing the embodiments.

For instance, in the reference examples, it will be proposed how to control the amount of requests from the subscriber units and the total amount by using a two-stepped leaky bucket. However, with the first and second embodiments, it will be proposed how subscriber units determine a period and a channel for transmission.

The third embodiment is directed to a manner of using the subscriber unit and allocating bandwidths so as to improve the fairness or the bandwidth usability even when subscriber units have the lopsided amounts of communication traffic.

The fourth embodiment will be described below which is directed to a bandwidth allocating system adapted for three or more channels available.

Figure 8:
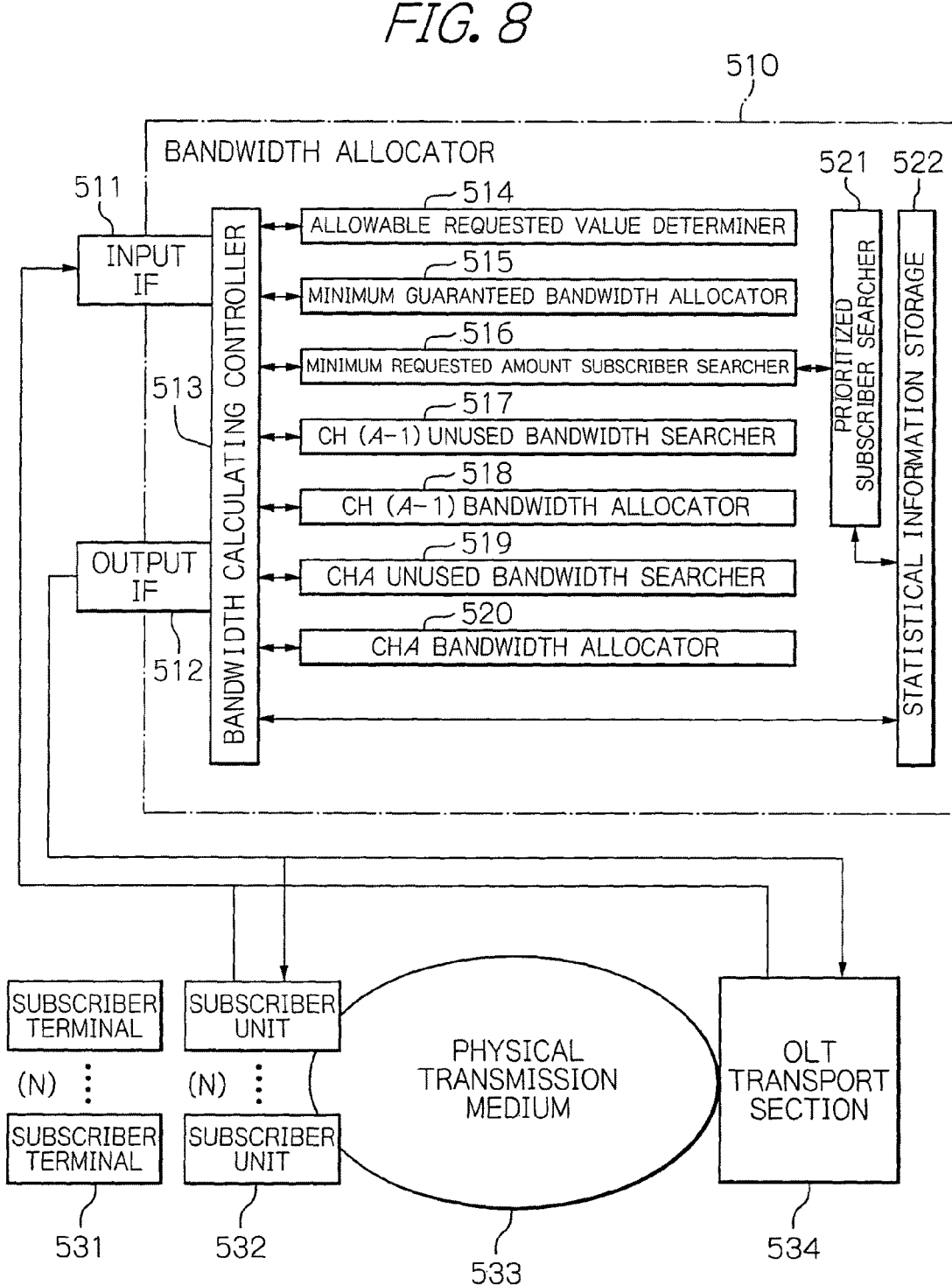
FIG. 8 is a schematic block diagram showing the configuration of a bandwidth allocating system in accordance with a first embodiment of the present invention.

Now, the configuration of the first embodiment will be described below. FIG. 8 is a schematic block diagram showing the configuration of the bandwidth allocating section, or allocator, 510 in accordance with the first embodiment of the present invention. As shown in FIG. 8, the bandwidth allocator 510 includes an input interface 511, an output interface 512, a bandwidth calculating controller 513, an allowable requested value determiner (leaky bucket) 514, the minimum guaranteed bandwidth allocator 515, the minimum requested amount subscriber searcher 516, a ch(A−1) unused bandwidth searcher 517, a ch(A−1) bandwidth allocator 518, a chA unused bandwidth searcher 519, a chA bandwidth allocator 520, a prioritized subscriber searcher 521, and a statistical information storage 522. In order to facilitate understanding, FIG. 8 also illustrates a subscriber network, which uses the bandwidth allocator 510, and includes a plurality (N) of subscriber terminals 531, a corresponding plurality of subscriber units 532, a physical transmission medium 533, e.g. radio wave propagation space or optional fiber, and a central office transport section 534, e.g. OLT transport section or transmitter/receiver.

The central office transport section 534 includes a transmitter/receiver, not show, and communicates with the subscriber units 532 through the physical transmission medium 533, e.g. radio wave propagation or air space, or an optical fiber system. The physical transmission medium 533 has its bandwidth shared by the subscriber units 532. In FIG. 8, the number of the subscriber units 532 is equal to N, where N is a natural number more than unity, while the physical transmission medium 533 also includes the corresponding number (N) of available channels. A is an integer in the range of "0" to (N−1), inclusive. The subscriber unit having its subscriber number A in the embodiment, i.e. the subscriber unit A is adapted to use the bandwidths of channels ch(A−1) and chA for communication. However, whenever A=0, the channel ch(A−1) will be a channel ch(N−1). In other words, the subscriber unit #0 can use the bandwidths of channels ch0 and ch(N−1) for communication. In the following description, the same shall apply to the available bandwidths for the subscriber unit #0. Such a manner for sharing the bandwidths is shown in FIG. 7, and is also referred to as cyclic or recursive bandwidth sharing.

The subscriber unit 532 shares the communication channels with other subscriber units 532. Therefore, if the subscriber unit 532 would freely select the communication channel, the available channels would collide against each other. Then, in respect of up-going and down-going communications, the bandwidth allocator 510 determines a period of time in which and a channel on which the subscriber unit 532, for example, ONU, and a station device, for example, OLT, have to transmit signals, and indicates the results from the determination to these devices, thereby preventing a collision. The first embodiment is directed to the case where the bandwidth allocator 510 is used in an optical access network. However, the bandwidth allocator 510 may similarly be used for a radio communication network, i.e. communication over air space rather than an optical fiber.

In operation, as the first step, the subscriber unit 532 sends bandwidth allocating or assigning calculation indexes (requested values), such as information on a requested bandwidth or the queue length of the device 532, to the bandwidth allocator 510 through the input interface 511. The requested values are then received by the bandwidth calculating controller 513.

Next, as the second step, the bandwidth calculating controller 513 transfers the received requested value to the allowable requested value determiner 514. The allowable requested value determiner 514 is configured, for example, by a two-stepped leaky bucket mechanism. The determiner 514 sends a bandwidth available for transmission with the subscriber unit 532 through the bandwidth calculating controller 513 and the output interface 512 to the subscriber unit 532 and the central office transport section 534. The sent value is used to guarantee the bandwidth defined by a contract between the subscriber unit 532 and a provider, not shown.

FIGS. 9 to 16 exemplarily show the bandwidths requested by the subscriber units, on the right side, and time slot tables, on the left side, in the first embodiment. The time slot tables have the lines of the numbers of channel ch0 to ch5 for use in the physical transmission medium 533 and the horizontal direction representing the time axis. In the first embodiment, in order to facilitate understanding, the time axis is not represented linear but discrete so as to be represented by a grid of squares. However, such a communication manner is not essential. It is to be noted that such a discrete communication can be expected to improve the processing speed and reduce the processing time. For the bandwidth allocating device in accordance with the first embodiment, a bandwidth is requested every period of time corresponding to 15 squares, or 15 time slots, in the grid pattern.

Figure 9:
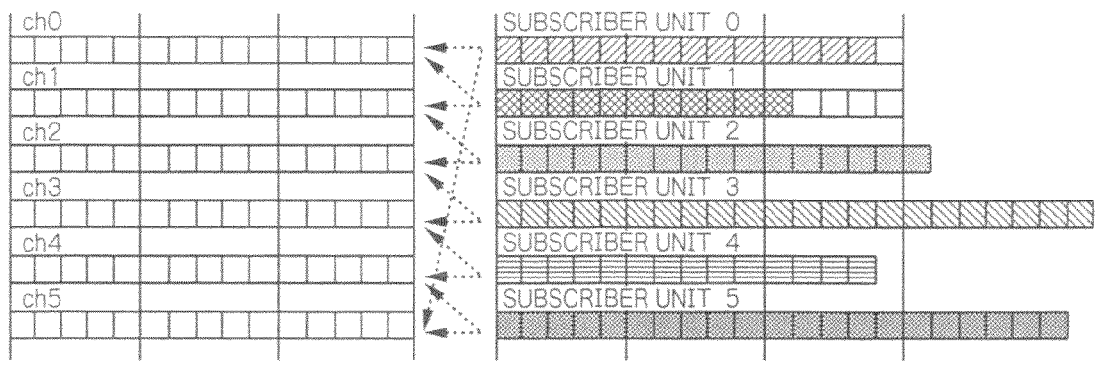
FIG. 9 schematically shows time slot tables, on its left side, and bandwidths, on its right side, requested by the subscriber units in the first embodiment.

FIG. 9 shows the initial states of the requested bandwidths of the subscriber units, on the right side, and time slot tables, on the left side. As shown in the right half of FIG. 9, the subscriber unit #0 has a requested bandwidth consisting of 14 time slots, the subscriber unit #1 has a requested bandwidth consisting of 11 time slots, the subscriber unit #2 has a requested bandwidth consisting of 16 time slots, the subscriber unit #3 has a requested bandwidth consisting of 22 time slots, the subscriber unit #4 has a requested bandwidth consisting of 14 time slots, and the subscriber unit #5 has a requested bandwidth consisting of 21 time slots. As shown in the left half of FIG. 9, acceptable bandwidths consist of the number of the channels×15 squares (=6×15), namely, 90 time slots in total. The time slot tables representing the acceptable bandwidths are shown in the left half of FIG. 9. Since, in the timing shown in FIG. 9, any subscriber units do not yet have bandwidths assigned in the time slot tables, all the bandwidths are unused.

Figure 10:
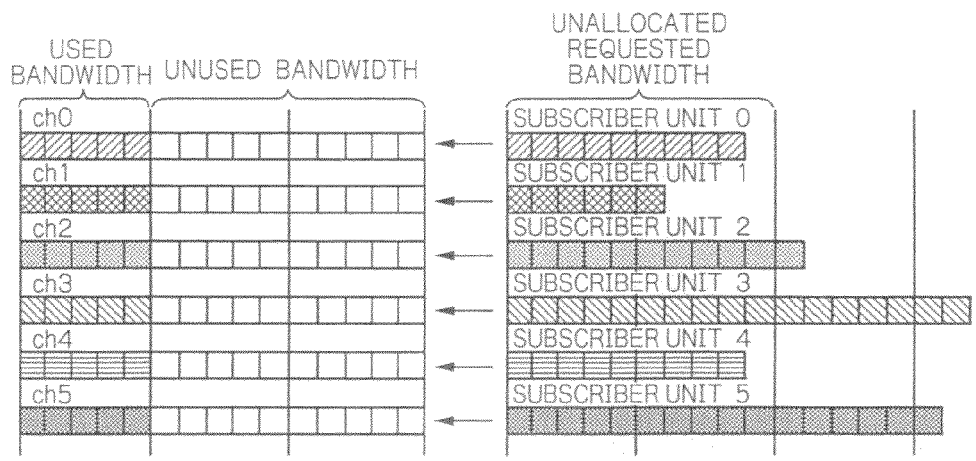
FIG. 10 schematically shows the relationship between requested yet unallocated bandwidths in the right side table and used and unused bandwidths on the left side, when the minimum guaranteed bandwidths are allocated, in the first embodiment.

Next, as the third step, the bandwidth calculating controller 513 directs the minimum guaranteed bandwidth allocator 515 to allocate the minimum guaranteed bandwidth. FIG. 10 shows time slot tables, on the left side, having the minimum guaranteed bandwidth allocated, as well as requested yet unallocated bandwidths, i.e. requested bandwidths not allocated yet, on the right side. In the first embodiment, each channel has its bandwidth consisting of five time slots allocated as the minimum guaranteed bandwidth. In addition, even if the requested bandwidth consists of less than five time slots, the bandwidth consisting of five time slots are allocated to the channel as the minimum guaranteed bandwidth.

Next, as the fourth step, the bandwidth calculating controller 513 directs the minimum requested amount subscriber searcher 516 to search for a subscriber unit requesting the minimum bandwidth. The minimum requested amount subscriber in turn searcher 516 searches for the subscriber unit requesting the minimum bandwidth to transfer the searching result to the bandwidth calculating controller 513. When a plurality of subscriber units has the same minimum requested amounts, for example, the prioritized subscriber searcher 521 determines the request of which subscriber unit is prioritized. For example, the bandwidth calculating controller 513 communicates with the statistical information storage 522 to find a subscriber unit having the small amount of previous transmission, and then prioritizes the found device. In addition, there is the policy for prioritizing not only by using fairly statistical information maintained in the statistical information storage 522, but also without using the statistical information, for example, on the basis of a contract fee, i.e. the amount of money, paid by subscribers. Now, the subscriber unit requesting the minimum bandwidth is referred to as a subscriber unit K, where K is an integer equal to or more than "0". The first embodiment will be described assuming the subscriber unit K to be the subscriber unit #1. The bandwidth is allocated in the order of the subscriber units K, (K+1) and (K+2), thus incrementing the numbers of subscriber unit.

Next, as the fifth step, for allocation to the subscriber unit K, the bandwidth calculating controller 513 directs the ch(A−1) unused bandwidth searcher 517 to calculate an unused bandwidth in the channel ch(K−1) available for the subscriber unit K. The ch(A−1) unused bandwidth searcher 517 calculates the unused bandwidth in the channel ch(K−1) and transfers the resultant calculation. In FIG. 10, the subscriber unit (K−1) is exemplarily the subscriber unit #0. As shown in the right half of FIG. 10, the subscriber unit #0 requests the allocation of the bandwidth consisting of nine time slots, while the unused bandwidth in the channel ch0 includes ten time slots as shown in the left half of FIG. 10. Therefore, the ch(A−1) unused bandwidth searcher 517 calculates the unused bandwidth in the channel ch(A−1) by the formula of "10−9=1" to report the result representing one time slot by return.

Figure 11:
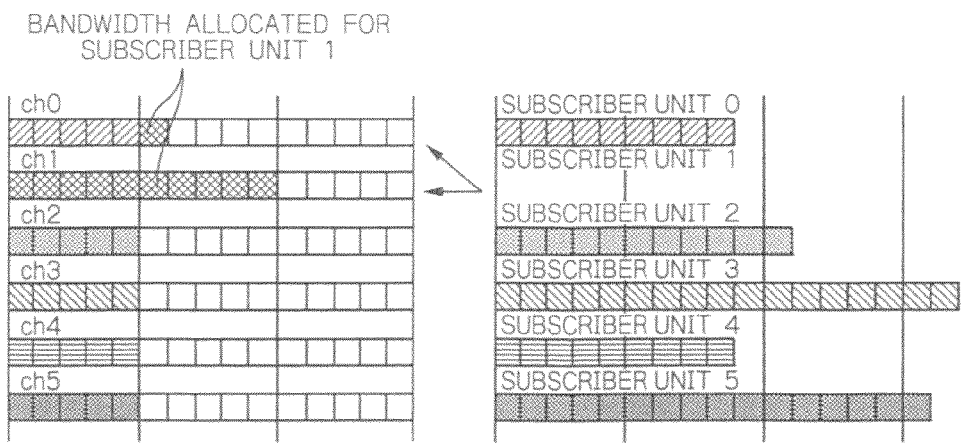
FIGS. 11 through 16 schematically show the relationship between requested yet unallocated bandwidths in the right side table and used and unused bandwidths in the left side table, when bandwidths for the subscriber units K (=1), K+1 (=2), K+2 (=3), K+3 (=4), K+4 (=5) and K+5 (=0) are allocated, respectively, in the first embodiment.

The bandwidth-calculating controller 513, for allocation to the subscriber unit K, directs the ch(A−1) bandwidth allocator 518 to allocate a bandwidth. In FIG. 11, the ch(A−1) bandwidth allocator 518 exemplarily allocates only one time slot reported just now to the channel ch0 as an allocation to the subscriber unit K. If the unallocated bandwidth requested by the subscriber unit (K−1) is broader than the unused bandwidth in the channel ch(K−1), the bandwidth of the subscriber unit K is not allocated to the channel ch(K−1).

Next, as the sixth step, the bandwidth calculating controller 513 directs the chA unused bandwidth searcher 519 to calculate and report the unused bandwidth in the channel chA. The chA unused bandwidth searcher 519 calculates the unused bandwidth in the channel chA to report by return the result to the bandwidth calculating controller 513. The bandwidth calculating controller 513 then directs the chA bandwidth allocator 520 to allocate the bandwidth. Since the subscriber unit #1 has five time slots of the requested but unallocated bandwidth (in FIG. 10, one time slot is already allocated to the channel ch(K−1)), all of the five residual time slots are allocated to the channel chK, i.e. ch1, as shown in FIG. 11. The residual time slots in the channel ch1 will be allowed to be used for the subscriber unit (K+1), i.e. the subscriber unit #2. If the subscriber unit K, i.e. the subscriber unit #1, has more than ten time slots of the requested but unallocated bandwidth, it is not allowed to allocate all the ten time slots to a single channel, thus the residuals not being used for transmission.

Figure 12:
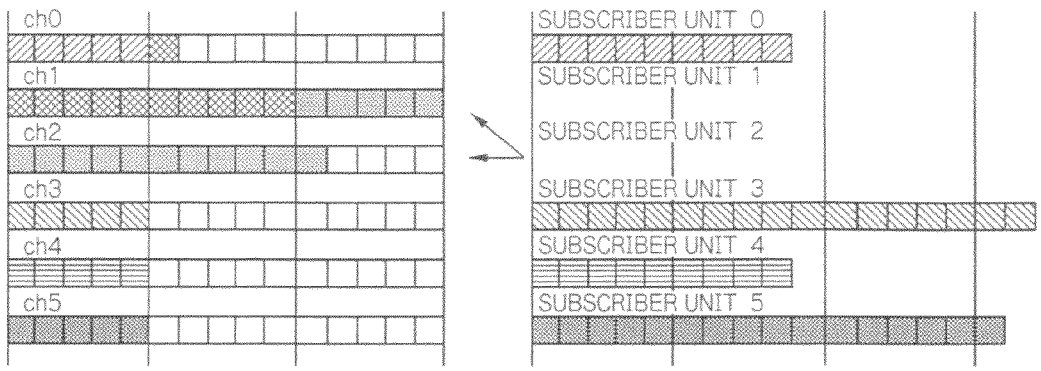

Next, as the seventh step, for the subscriber unit (K+1), i.e. the subscriber unit #2, an operation will be repeated which is similar to that of the subscriber unit K, i.e. the subscriber unit #1, as described in the fifth and sixth steps. Since the subscriber unit #2 has, as shown in FIG. 11, eleven time slots of the requested yet unallocated bandwidth, five time slots are allocated to the channel ch1 and six time slots to the channel ch2 as shown in FIG. 12.

Figure 13:
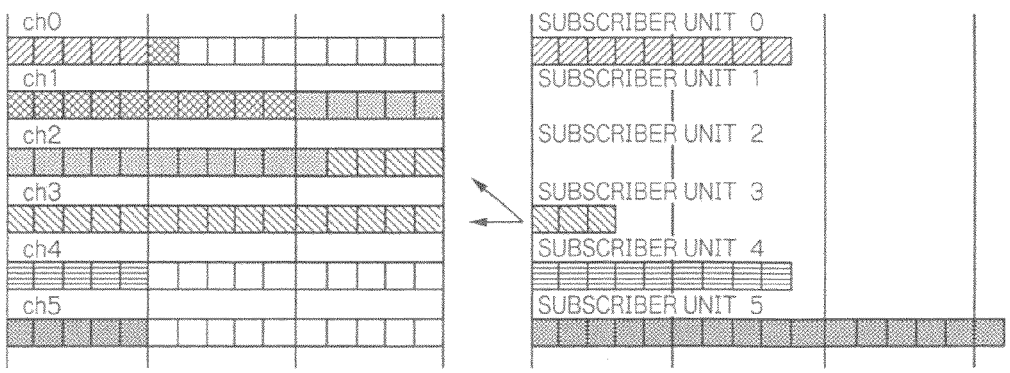
Figure 14:
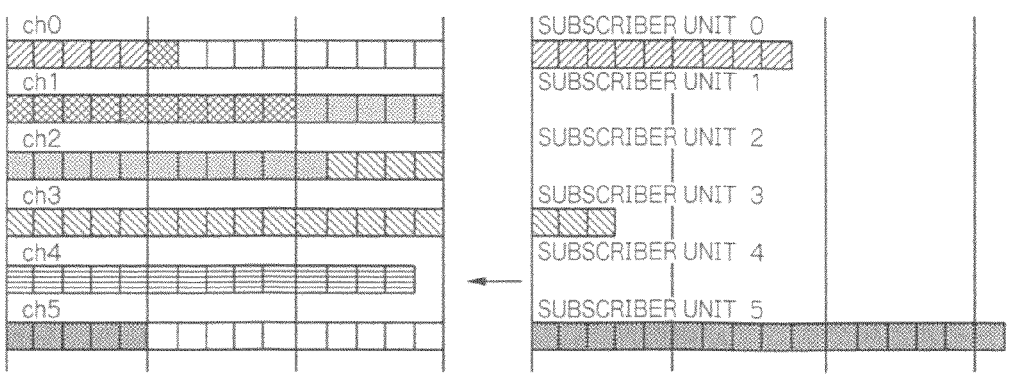
Figure 15:
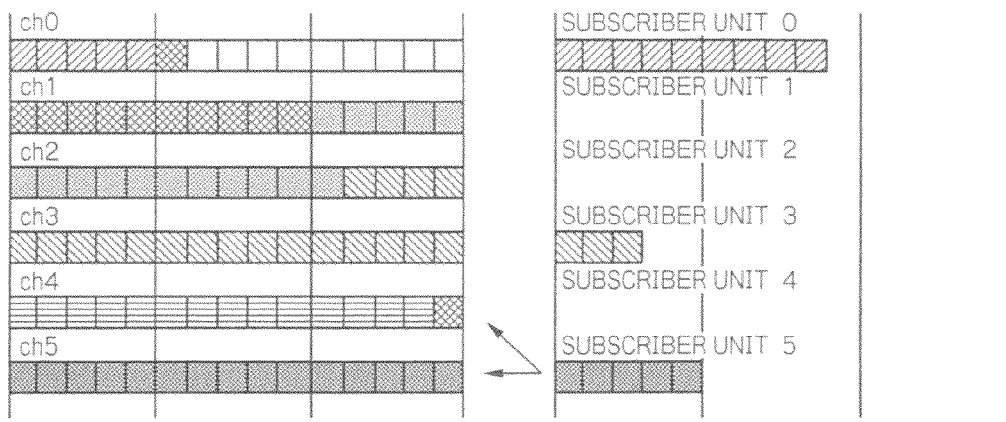
Figure 16:
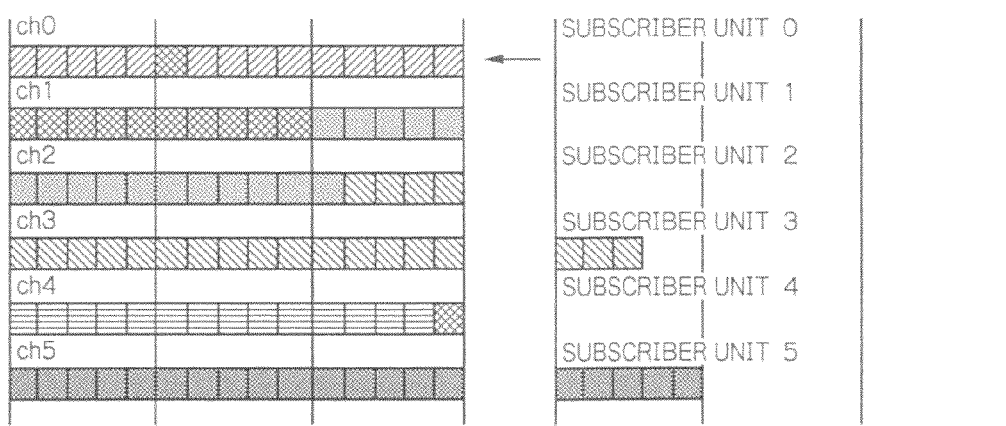

Subsequently, as shown in FIGS. 13 to 16, the similar operation is carried out each time incrementing the number of subscriber unit one by one. For example, in the case as shown in FIG. 12 where the subscriber unit #3 has 17 time slots of the requested yet unallocated bandwidth, four time slots and ten time slots are respectively allocated to the channels ch2 and ch3, and three time slots are unallocated as shown in FIG. 13. Next, in the case as shown in FIG. 13 where the subscriber unit #4 has nine time slots of the requested yet unallocated bandwidth, nine time slots are allocated to the channel ch4 as shown in FIG. 14. Moreover, in the case as shown in FIG. 14 where the subscriber unit #5 has 16 time slots of the requested yet unallocated bandwidth, one time slot and ten time slots are respectively allocated to the channels ch4 and ch5, and five time slots are unallocated as shown in FIG. 15. Furthermore, in the case as shown in FIG. 15 where the subscriber unit #0 has nine time slots of the requested yet unallocated bandwidth, nine time slots are allocated to the channel ch0 as shown in FIG. 16. In addition, in the case as shown in FIG. 16 where the subscriber units #3 and #5 respectively have three time slots and five time slots of the requested yet unallocated bandwidths, those slots are not transmitted yet. These requested yet unallocated bandwidths wait in a queue buffer for transmission in the next timing.

Next, as the eighth step, the bandwidths are allocated to the subscriber units #0 to 5, and then the result is outputted via the output interface 512 and is stored in the statistical information storage 522.

However, the actions according to the allowable requested value determiner 514, the guaranteed minimum bandwidth allocator 515, the prioritized subscriber searcher 521 and the statistical information storage 522 are not specifically restricted to those described above. In addition, this embodiment has been described with the exemplified case taken where the bandwidth is allocated in the order from a subscriber unit requesting the minimum amount. However, the allocation may be modified to another order in principle.

As described above, the bandwidth allocating device in accordance with the first embodiment can be used to allocate the transmission channel and the transmission period to each subscriber unit by the simple configuration and operation.

In the bandwidth allocating device in accordance with the first embodiment, the subscriber unit requesting the minimum bandwidth (the subscriber unit #1 in the first embodiment) first has a bandwidth allocated to first generate a broad free bandwidth. Namely, in the first embodiment, as shown in FIG. 11, five slots of a free bandwidth are generated in the channel ch1. Subsequently, the next subscriber unit (the subscriber unit #2 in the first embodiment) has a requested bandwidth allocated to the free bandwidth, and then, such an allocation is repeated in a cyclic manner, thereby enabling efficient use of the bandwidths.

In the above description, after allocation of the requested bandwidth to the guaranteed minimum bandwidth (FIG. 10), the bandwidth is exemplarily allocated from the requested yet unallocated bandwidth (in the right half of FIG. 10), particularly in the order from the subscriber unit requesting the minimum bandwidth (the subscriber unit #1 in FIG. 10). However, in the case of the subscriber units having different guaranteed minimum bandwidths, for example, the following processes may be proceeded to. First of the processes, the subscriber unit (A−1) has a requested bandwidth ($Q_{|A-1|1}$ time slots) temporarily allocated to a residual bandwidth ($R_{|A-1|1}$ time slots) in the channel ch(A−1). Then, the residual bandwidth at this moment is found as the sum (($R_{|A-1|2}+R_{A1}$) time slots) of the unused bandwidth ($R_{|A-1|2}$ time slots=$R_{|A-1|1}-Q_{|A-1|1}$) in the channel ch(A−1) and the unused bandwidth ($R_{A1}$ time slots) in the channel chA. Subsequently, the requested yet unallocated bandwidth ($Q_{A1}$ time slots) in the subscriber unit A is subtracted from this sum (($R_{(A-1|2}+R_{A1}$) time slots) to find the residual bandwidth ($R_{A2}$ time slots= ($R_{|A-1|2}+R_{A1})-Q_{A1}$) in the channel chA. At the end, the bandwidth is allocated in the order from the subscriber unit A having the maximum residual bandwidth ($R_{A2}$ time slots).

In the above processes, with respect to an estimation index "minimization of the sum of traffic incapable of being allocated in any subscriber unit", there may be the case where the optimum solution is not found. However, the highly efficient allocation is relatively enabled in a short time.

With respect to fairness between subscribers, even in the worst case, it is guaranteed that the subscriber unit A can use at least a whole bandwidth of the channel chA, thus the proper result being expected to be obtained.

Figure 17A:
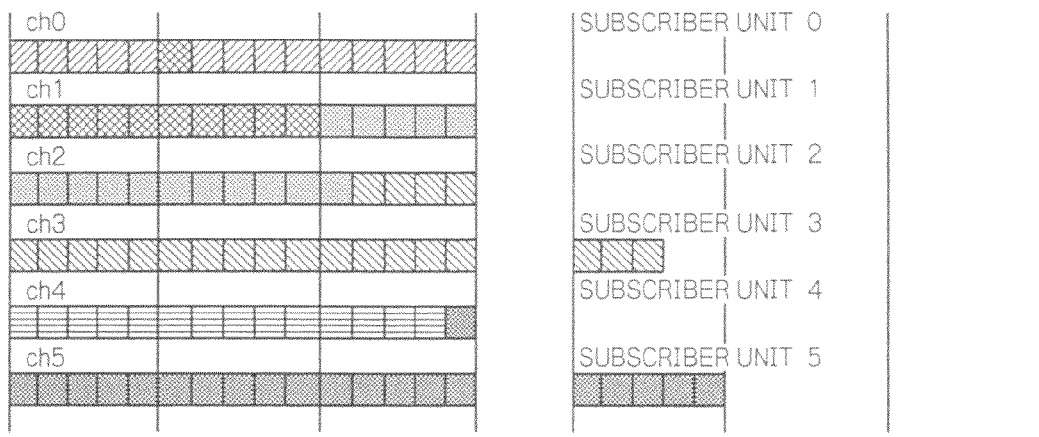
FIGS. 17A and 17B schematically show examples of relationship between requested yet unallocated bandwidths, on the right side, and used bandwidths on the left side, when the allocation of the minimum guaranteed bandwidths is completed, in the first embodiment.
Figure 17B:
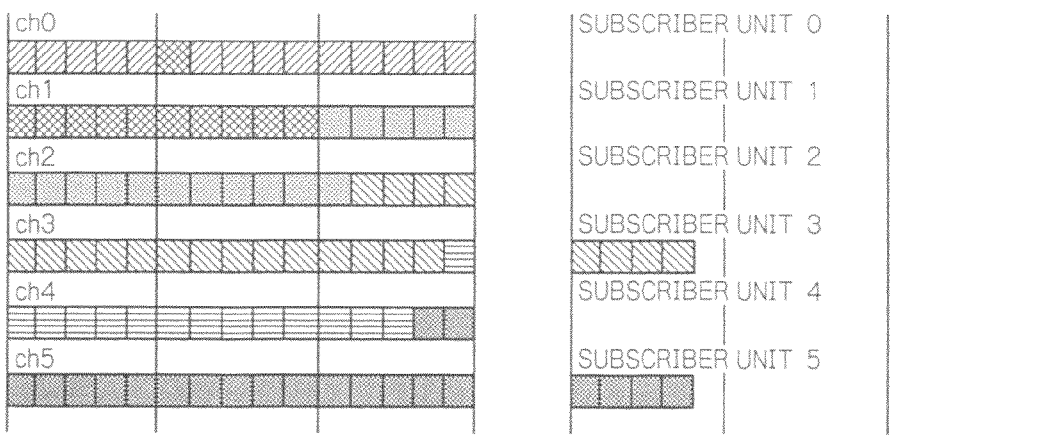

For understanding a variation of the first embodiment, FIGS. 17A and 17B show other examples of time slot tables, on the left side, and the requested bandwidths, on the right side, for the subscriber units. As shown in FIG. 17A or 16, in the first embodiment, the subscriber unit #3 uses the bandwidth consisting of 19 time slots in total and has the unallocated bandwidth consisting of three time slots while the subscriber unit #5 uses the bandwidth consisting of 16 time slots in total and has the unallocated bandwidth consisting of five time slots. These are changed as shown in FIG. 17B, that is, the subscriber unit #3 uses the bandwidth consisting of 18 time slots in total and has the unallocated bandwidth consisting of four time slots to generate one time slot of the free bandwidth. The free bandwidth is used by the subscriber unit #5 that uses the bandwidth consisting of 17 time slots in total and has the unallocated bandwidth consisting of four time slots. Thus, the difference between the bandwidths used by the subscriber units #3 and #5 are reduced from three time slots to one. The difference between the bandwidths not allowed to be allocated in the devices is reduced from two time slots to zero. In this way, the bandwidths are curtailed in the subscriber unit having a broad bandwidth allocated (the subscriber unit #5 in FIG. 17A), and then the curtailed bandwidths are accommodated to the subscriber unit having a narrow bandwidth allocated (the subscriber unit #3 in FIG. 17A), thereby shifting the allocated bandwidths to improve the fairness. The other example can be used together with a manner described below for further improving the bandwidth usability. Additionally, in FIGS. 17A and 17B, the subscriber unit A is assumed to use all the free bandwidths in the channels ch(A−1) and chA. However, the free bandwidths may be restrictively used.

Figure 18:
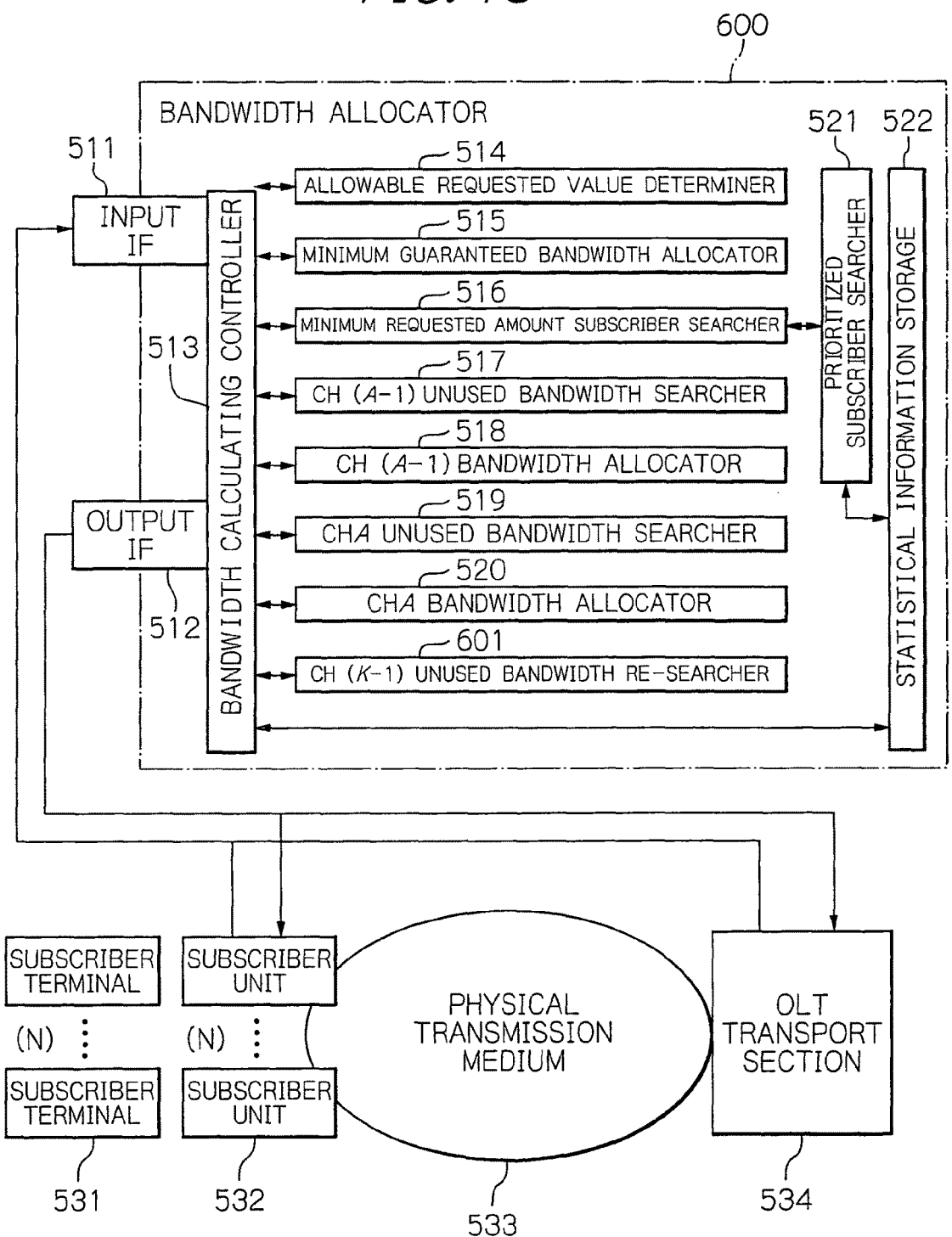
FIG. 18 is, like FIG. 8, a schematic block diagram showing the configuration of the bandwidth allocating device in accordance with a second embodiment of the present invention.

Now, the configuration of a second embodiment will be described below. FIG. 18 is a schematic block diagram showing the configuration of the bandwidth allocating device or bandwidth allocator 600 in accordance with the second embodiment of the present invention. As shown in FIG. 18, the bandwidth allocator 600 in accordance with the second embodiment may be the same as the bandwidth allocator 510 in accordance with the first embodiment except for further including a ch(K−1) unused bandwidth re-searcher 601. Like components or parts are designated with the same reference numerals throughout the description and accompanying drawings.

Moreover, as a premise, in the first embodiment, when the minimum guaranteed bandwidth is allocated from the all subscriber units, and then the bandwidth is allocated from the subscriber unit K in which the residual requested bandwidth is minimum, the bandwidth allocating device first subtracts the minimum guaranteed bandwidth from the whole bandwidth of the channel ch(K−1) to find an unused bandwidth, subtracts the requested but unallocated bandwidth of the subscriber unit (K−1) from the unused bandwidth and uses the resultant value as the bandwidth allocated in the channel ch(K−1) for the subscriber unit K. The bandwidth allocating device in the first embodiment allocates the requested yet unallocated bandwidth of the subscriber unit K, not allocated to the channel ch(K−1), to the unallocated bandwidth of the channel chK. However, in this allocation manner, the channel ch(K−1) may finally have an unallocated bandwidth left. This is caused since, in allocation to the subscriber unit (K−1) at the end of allocation of the bandwidths, the channel ch(K−2) may have an unallocated bandwidth left and the subscriber unit (K−1) may use the resource of the unallocated bandwidth. This remaining bandwidth finally caused in the channel ch(K−1) is wasted.

In the bandwidth allocator 600 of the second embodiment, following the operation described so far in the first embodiment, the ch(K−1) unused bandwidth re-searcher 601 searches for the unused bandwidth of the channel ch(K−1). If a bandwidth B is left, the bandwidth B is added to a bandwidth which is actually allocated when the bandwidth requested by the subscriber unit K is allocated to the channel ch(K−1), and then the resultant value is again used as the bandwidth allocated in the channel ch(K−1) for the subscriber unit K. Subsequently, the same operation as described above will be repeated.

FIGS. 19 to 33 schematically show the requested bandwidths, on the right side, and the subscriber units and time slot tables, on the left side, in the second embodiment.

Like FIGS. 9 to 16, the time slot tables have the lines of the numbers of channel ch0 to ch5 for use in the physical transmission medium 533 and the horizontal direction representing the time axis. The case where bandwidths are requested as shown in the right half of FIG. 19 will be described with reference to FIGS. 20 to 26 and 27 to 33. In the second embodiment, as shown in FIGS. 20 to 26, the first allocation of bandwidths starts. Now, the ch(K−1) unused bandwidth re-searcher 601 searches for the unused bandwidth in the channel ch(K−1), and then, in the case of no existence of the residual bandwidth, the allocation of bandwidths is the same as the first embodiment. The ch(K−1) unused bandwidth re-searcher 601 searches for the unused bandwidth in the channel ch(K−1), and then, in the case of existence of the residual bandwidth, the step progresses to the second allocation of bandwidths shown in FIGS. 27 to 33. FIGS. 20 to 26 show the case where the residual bandwidth can be found by the searching for the unused bandwidth in the channel ch(K−1) by the ch(K−1) unused bandwidth re-searcher 601.

Figure 19:
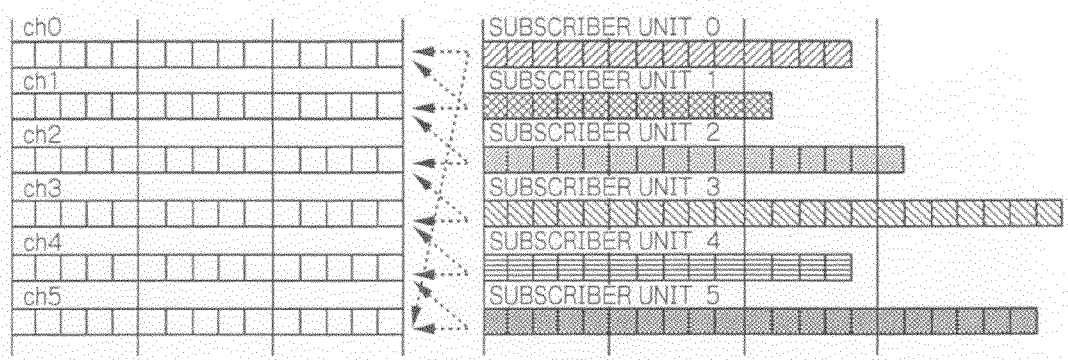
FIG. 19 schematically shows, like FIG. 9, time slot tables, on its left, and bandwidths, on its right side, requested by each subscriber unit in the second embodiment.

As shown in the right half of FIG. 19, the subscriber units #0 through #5 respectively have requested bandwidths consisting of 14, 11, 16, 22, 14 and 15 time slots. As shown in the left half of FIG. 9, 90 time slots are available, and since the bandwidths for any subscriber units are not allocated to the time slot tables yet, all the bandwidths are unused.

Figure 20:
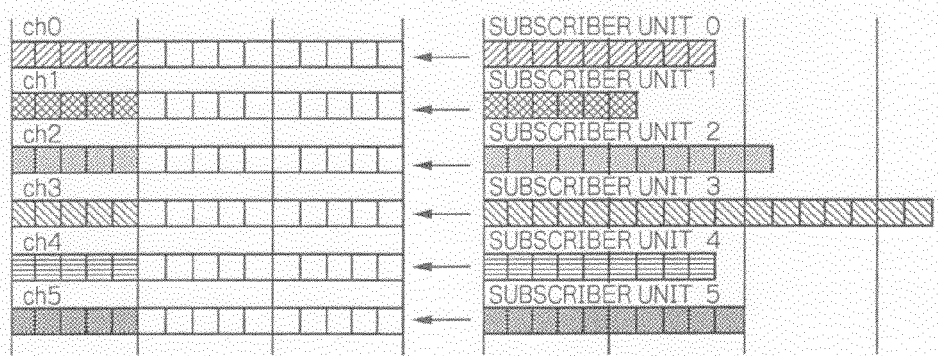
FIG. 20 schematically shows, like FIG. 10, the relationship between requested yet unallocated bandwidths on the right side and used and unused bandwidths on the left side in a first allocation of a minimum guaranteed bandwidth in the second embodiment.
Figure 21:
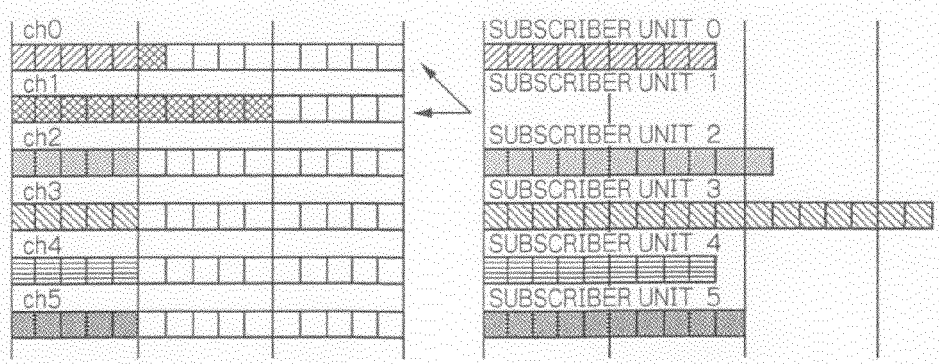
FIGS. 21 through 26 schematically show requested yet unallocated bandwidths on the right side, and used and unused bandwidths on the left side in the first allocation of bandwidths for confirming bandwidths unused in a subscriber unit K−1 and for the subscriber units K (=1), K+1 (=2), K+2 (=3), K+3 (=4), K+4 (=5) and K+5 (=0), respectively, in the second embodiment.
Figure 22:
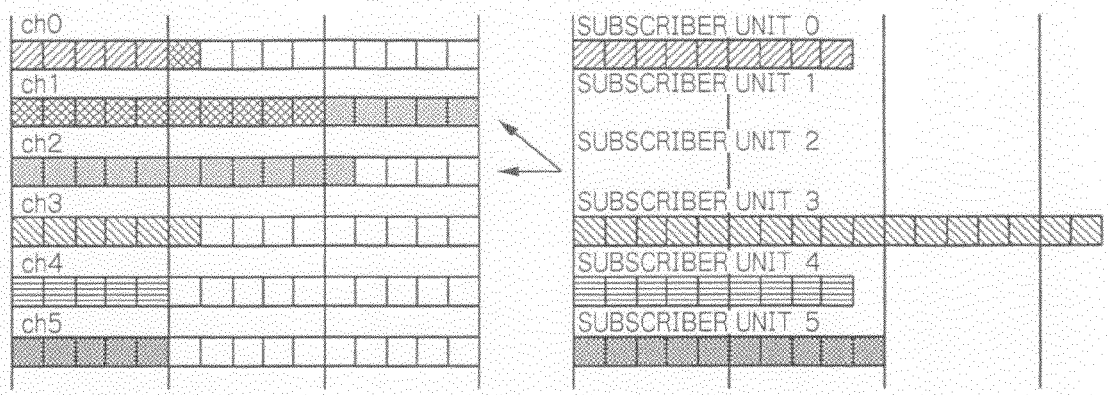
Figure 23:
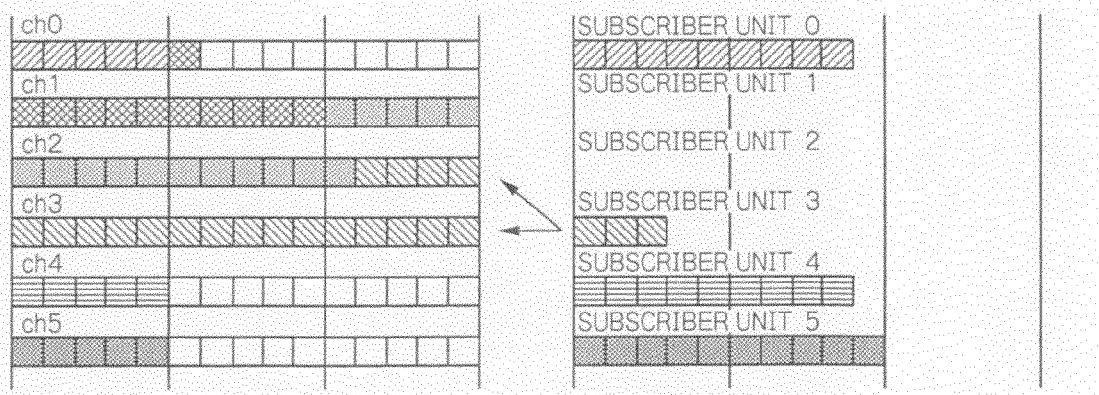
Figure 24:
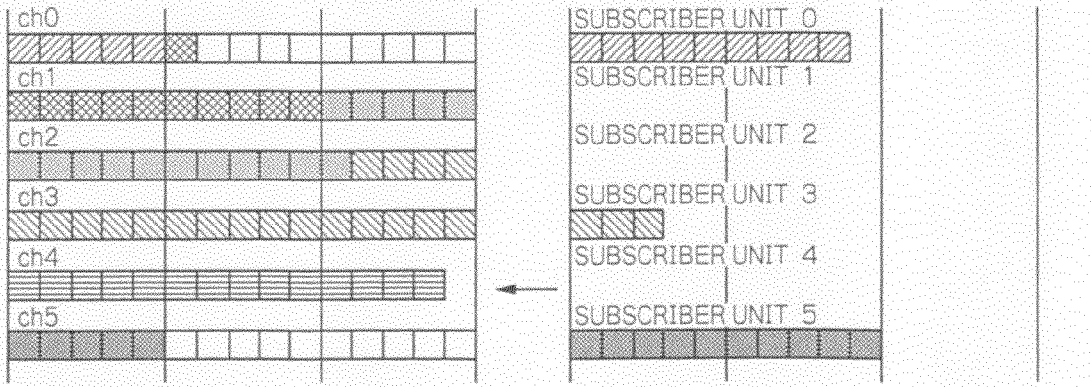
Figure 25:
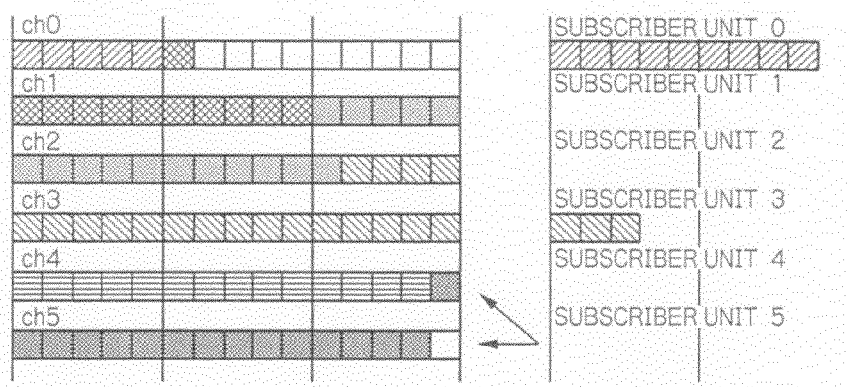

Next, as shown in FIG. 20, each channel has five time slots of a bandwidth allocated as the minimum guaranteed bandwidth. At this time, even if a requested bandwidth is less than five time slots, the five time slots of a bandwidth are allocated as the minimum guaranteed bandwidth. In addition, as shown in FIG. 21, the subscriber unit #1 has a requested bandwidth allocated to the channels ch0 and ch1. As shown in FIG. 22, the subscriber unit #2 has a requested bandwidth allocated to the channels ch1 and ch2, and then, as shown in FIG. 23, the subscriber unit #3 has a requested bandwidth allocated to the channels ch2 and ch3. Moreover, as shown in FIG. 24, the subscriber unit #4 has a requested bandwidth allocated to the channel ch4, and then, as shown in FIG. 25, the subscriber unit #5 has a requested bandwidth allocated to the channels ch4 and ch5. Furthermore, as shown in FIG. 26, the subscriber unit #0 has a requested bandwidth allocated to the channels ch5 and ch0.

Figure 26:
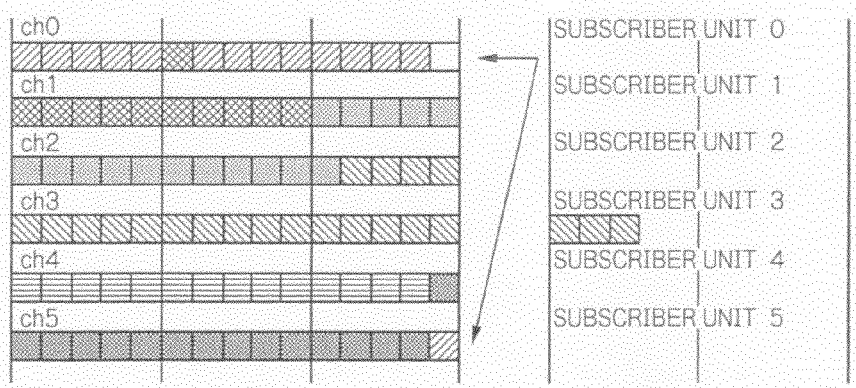

As shown in FIG. 26, in the example shown in FIGS. 19 to 26, the ch(K−1) unused bandwidth re-searcher 601 has one time slot as an unused bandwidth left in the channel ch(K−1), i.e. ch0. In this case, in the second embodiment, the processes shown in FIGS. 27 to 33 are used to reallocate bandwidths. In FIG. 26, the channel ch(K−1), i.e. ch0, is determined to have one unused bandwidth. As shown in FIGS. 27 to 33, when the subscriber unit K, i.e. the subscriber unit #1, again has a bandwidth allocated to the channel ch(K−1), in addition to one time slot of the bandwidth allocated first, a value obtained by adding one slot of the bandwidth left in FIG. 26, that is, two slots of the bandwidths are first allocated. This can eliminate the final unused bandwidth in the channel ch(K−1).

Figure 27:
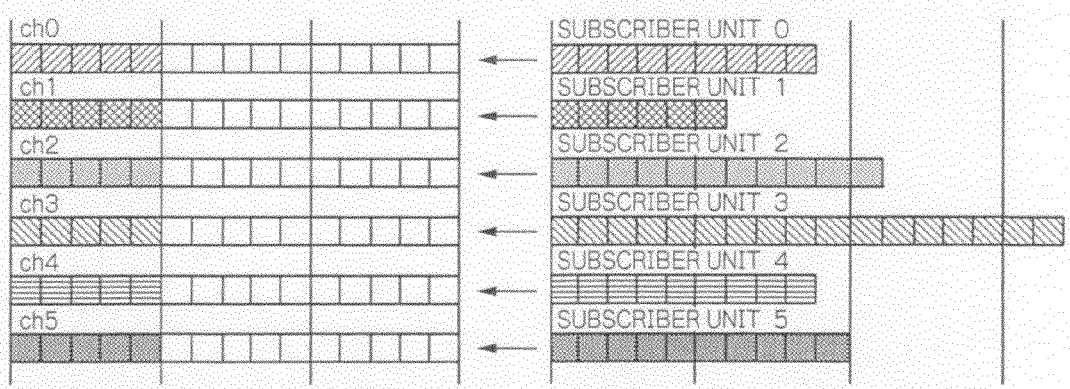
FIG. 27 schematically shows requested yet unallocated bandwidths on the right side, and used and unused bandwidths on the left side in a second allocation of the minimum guaranteed bandwidth in the second embodiment.
Figure 28:
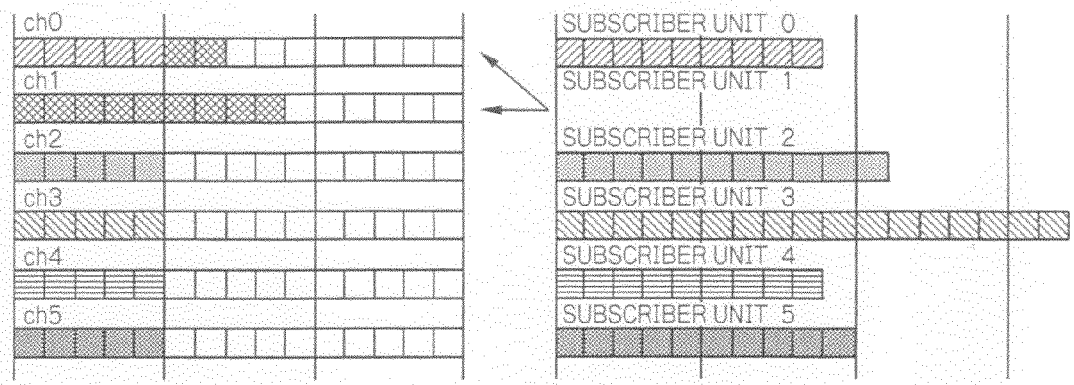
FIGS. 28 through 33 schematically show requested yet unallocated bandwidths on the right side, and used and unused bandwidths on the left side in the second allocation for the subscriber units K (=1), K+1 (=2), K+2 (=3), K+3 (=4), K+4 (=5) and K+5 (=0) in the second embodiment.
Figure 29:
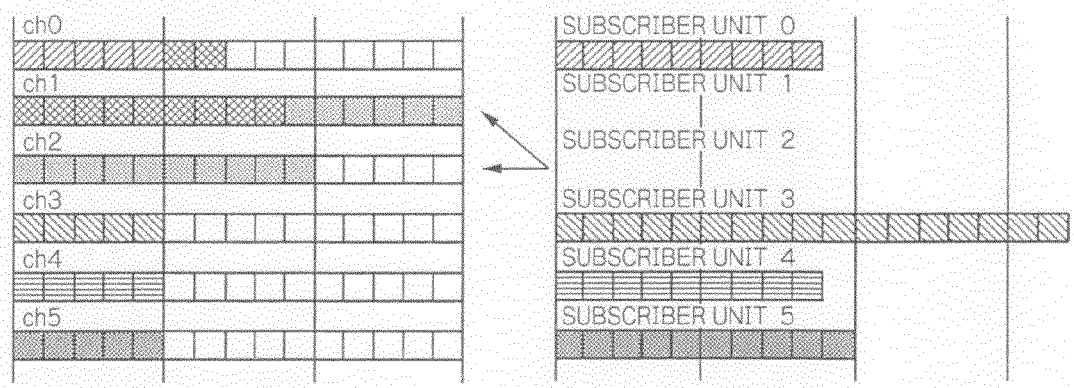
Figure 30:
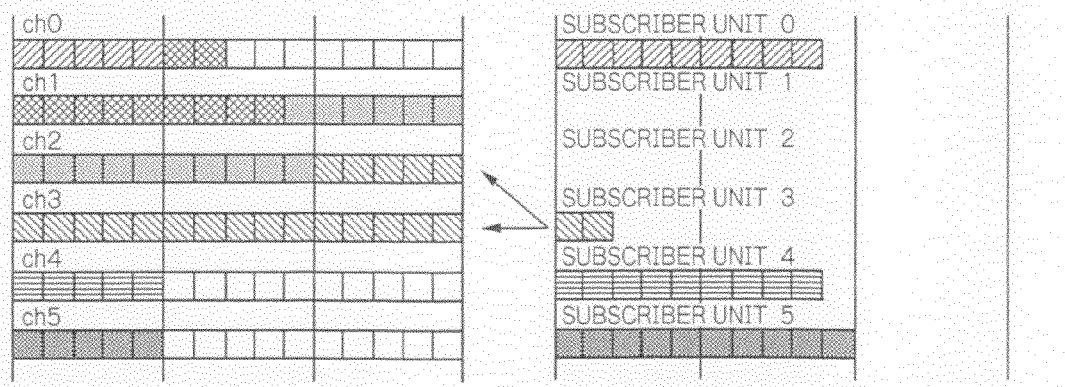
Figure 31:
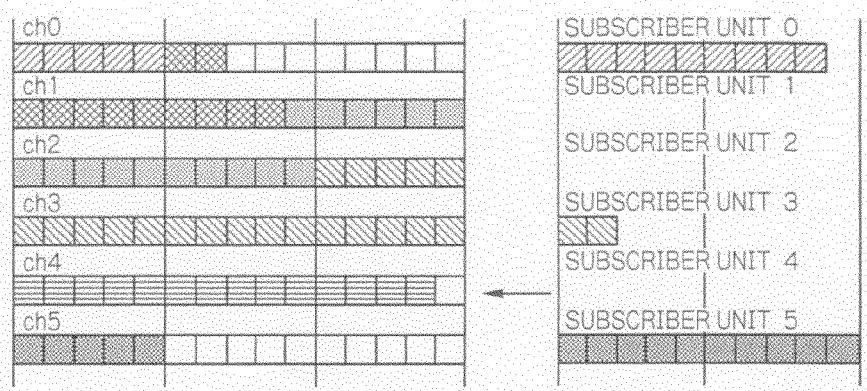
Figure 32:
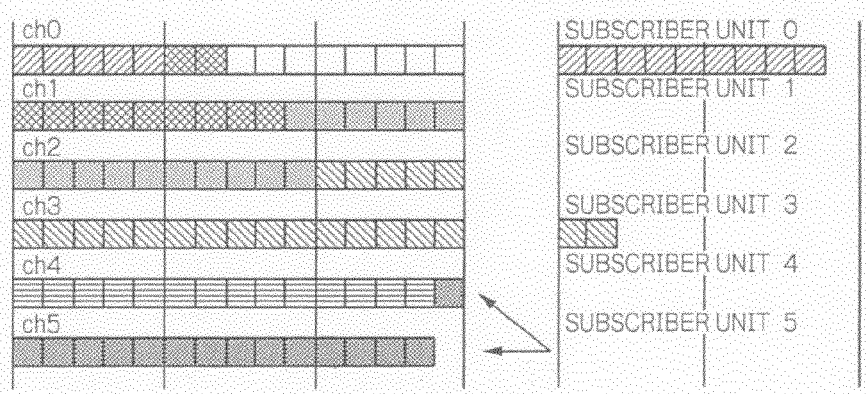
Figure 33:
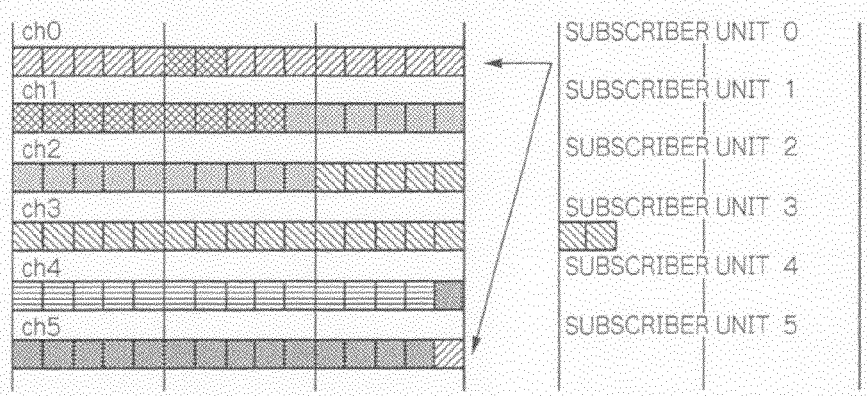

In this method, first, as shown in FIG. 27, the minimum guaranteed bandwidths are allocated, and next, as shown in FIG. 28, the subscriber unit #1 has a requested bandwidth allocated to the channels ch0 and ch1. At this time, two time slots of the bandwidth, of which one time slot is more than that in FIG. 21, are allocated to the channel ch0, and three time slots of the bandwidth, of which one time slot is less than that in FIG. 21, are allocated to the channel ch1. Next, as shown in FIG. 29, the subscriber unit #2 has a requested bandwidth allocated to the channels ch1 and ch2, and then, as shown in FIG. 30, the subscriber unit #3 has a requested bandwidth allocated to the channels ch2 and ch3. Moreover, as shown in FIG. 31, the subscriber unit #4 has a requested bandwidth allocated to the channel ch4, and then, as shown in FIG. 32, the subscriber unit #5 has a requested bandwidth allocated to the channels ch4 and ch5. Furthermore, as shown in FIG. 33, the subscriber unit #0 has a requested bandwidth allocated to the channels ch5 and ch0.

As described above, the bandwidth allocating device in accordance with the second embodiment can be used to further improve the bandwidth usability in addition to the superior advantages of the first embodiment. This allocating method can be used to obtain the more optimum solution with respect to the estimation index "minimization of the sum of traffic incapable of being allocated in any the subscriber units".

Figure 34:
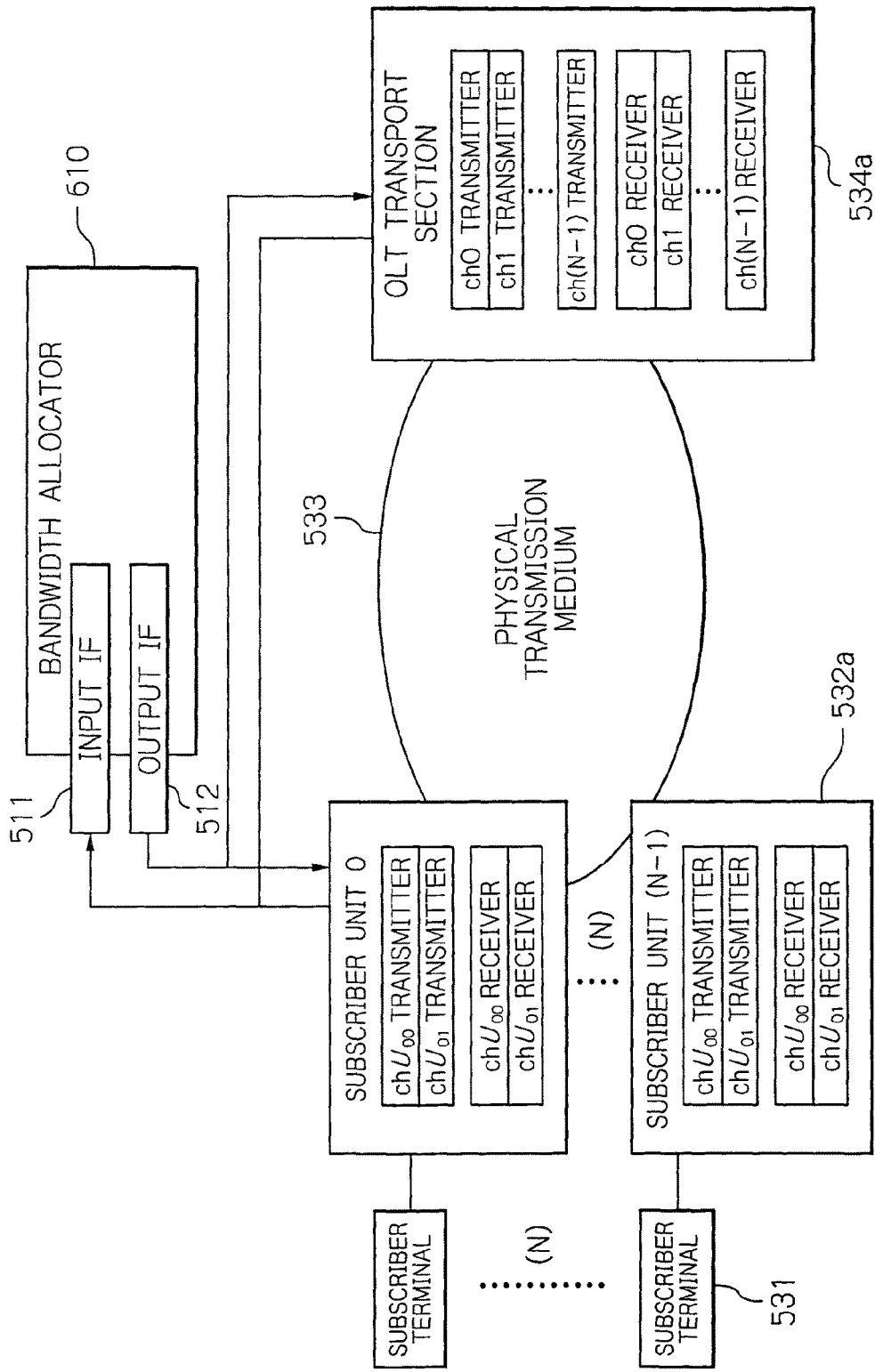
FIG. 34 is a schematic block diagram showing the configuration of a system for implementing a bandwidth allocating method in accordance with a third embodiment of the present invention.

Now, the configuration of a third embodiment will be described below. FIG. 34 is a schematic block diagram showing the configuration of a system for using the bandwidth allocating method in accordance with the third embodiment of the present invention. In the configuration of the third embodiment, the locations and number of channels of transmitter/receivers installed in subscriber units are different the other embodiments.

FIG. 35A shows a table useful for understanding the bandwidth allocation in case where two subscriber units share the resource of two channels with each other. FIG. 35A shows that the subscriber units #0 and #4 share the channels ch0 and ch4 with each other, the subscriber units #1 and #5 share the channels ch1 and ch5 with each other, the subscriber units #2 and #6 share the channels ch2 and ch6 with each other, and the subscriber units #3 and #7 share the channels ch3 and ch7 with each other.

FIG. 35B shows a table useful for understanding the bandwidth allocation in case where each subscriber unit uses two channels in a cyclic manner and shifts an existing free channel to share the channels in the first and second embodiments. As understood from FIG. 35B, the subscriber units #0 and #1 share the channel ch1, the subscriber units #1 and #2 share the channel ch2, the subscriber units #2 and #3 share the channel ch3, the subscriber units #3 and #4 share the channel ch4, the subscriber units #4 and #5 share the channel ch5, the subscriber units #5 and #6 share the channel ch6, the subscriber units #6 and #7 share the channel ch7, and the subscriber units #7 and #0 share the channel ch0. FIG. 35B also shows that eight subscriber units share the channels in a cyclic manner.

FIG. 35C shows a table useful for understanding the bandwidth allocating method in accordance with the third embodiment, eight subscriber units being divided into two groups each consisting of four subscriber units in which the channels are shared in a cyclic manner. In FIG. 35C, the subscriber units #0 to #3 are set as the first group and the subscriber units #4 to #7 are set as the second group. In the first group, the subscriber units #0 and #1 share the channel ch1, the subscriber units #1 and #2 share the channel ch2, the subscriber units #2 and #3 share the channel ch3, and the subscriber units #3 and #0 share the channel ch0. In the second group, the subscriber units #4 and #5 share the channel ch5, the subscriber units #5 and #6 share the channel ch6, the subscriber units #6 and #7 share the channel ch7, and the subscriber units #7 and #4 share the channel ch4. The case shown in FIG. 35C may be generalized into the following. When the number of the divided groups is represented by G and the number of the subscriber units included in a group number x is represented by Y(x), the channel ch for use in the A-th subscriber unit in the group number B is represented by the following expressions (1) and (2), where a subscriber unit number is in the range of 0 to (Y(B)−1):

$$\sum_{t=0}^{B-1} Y(t) + A \text{ and } \sum_{t=0}^{B-1} Y(t) + A + 1, \quad (1)$$

where $A \ne Y(B) - 1$ $$\sum_{t=0}^{B-1} Y(t) + A \text{ and } \sum_{t=0}^{B-1} Y(t), \quad (2)$$

where $A = Y(B) - 1$

FIG. 35D shows a table useful for understanding a variation of the third embodiment. In the variation, the subscriber units #0 and #2 share the channel ch2, the subscriber units #1 and #3 share the channel ch3, the subscriber units #2 and #4 share the channel ch4, the subscriber units #3 and #5 share the channel ch5, the subscriber units #4 and #6 share the channel ch6, the subscriber units #5 and #7 share the channel ch7, the subscriber units #6 and #0 share the channel ch0, and the subscriber units #7 and #1 share the channel ch1. Thus, FIG. 35D shows the other example in which eight subscriber units share the channels in a cyclic manner.

According to the third embodiment, the allocation can be implemented by exchanging a subscriber unit number with another subscriber unit in the same group or exchanging a used channel ch with another subscriber unit in the same group.

Now, the operation according to the third embodiment may be described in a similar way to the first or second embodiment. However, in the case of FIG. 35C, the bandwidths are shared only in the same group. Therefore, in the case of the number G of groups, the bandwidth allocating device calculates the allocation of the bandwidths G times in total in each group to output the result.

As described above, the bandwidth allocating device in accordance with the third embodiment can be used to obtain the following superior advantages in addition to those in the first and second embodiments.

For example, in a system including eight subscriber units, of which four are preliminarily known to be heavy traffic users communicating over a predetermined traffic value and the remaining four are preliminarily known to be light traffic users communicating not exceeding the predetermined traffic value, if all the subscriber units are not grouped to be contained in one group, then a higher bandwidth usability could be attained. However, the light users would have bandwidths of their own default channels ch often used by the heavy users. The light users, even though occasionally wanting to use broader bandwidths, would possibly not use bandwidths exceeding those of the default channels very often since the heavy users use the bandwidths.

Therefore, if the fairness is considered more important than the bandwidth usability, four subscriber units as the heavy traffic users can be grouped into one group and the remaining four subscriber units as the light traffic users can be grouped into the other group, thereby ensuring the fairness.

By contrast, in order to improve the above-described bandwidth usability, in respect of channel allocation, the light users are preferably located before and after the heavy users. Thus, with a higher probability, the bandwidths of the heavy users can be absorbed by the free bandwidths of the light users.

In addition, where the number of the heavy users is represented by Y(h) and the number of the light users is by Y(l), the subscriber units are not grouped to give subscriber unit numbers #0 to (Y(h)−1) to the heavy users and subscriber unit numbers (Y(h)−1) to (Y(h)+Y(l)−1) to the light users, thus being located collectively. This also provides the similar superior advantages.

Figure 36:
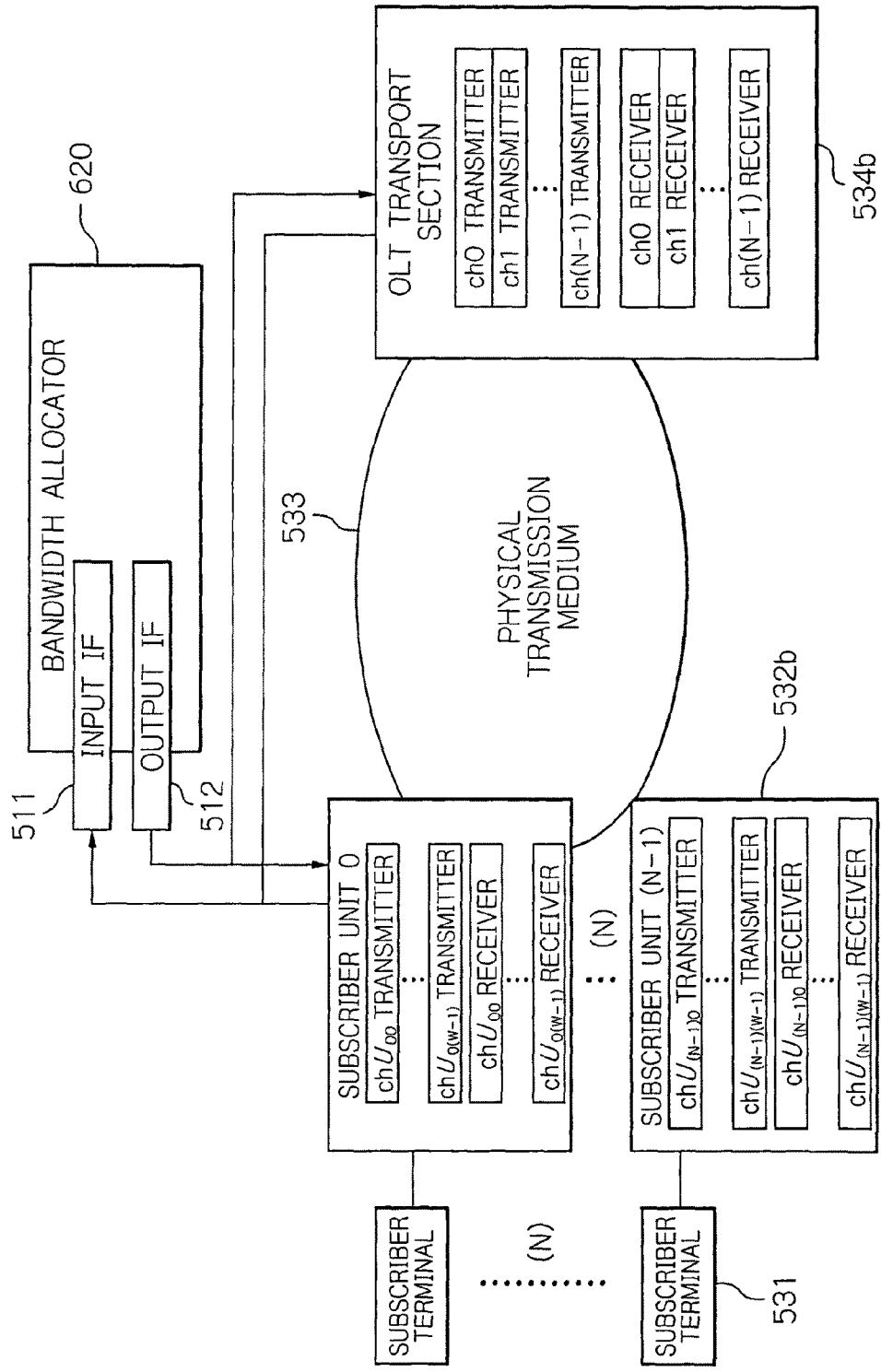
FIG. 36 is a schematic block diagram showing the configuration of a system for implementing a bandwidth allocating method in accordance with a fourth embodiment of the present invention.

Now, the configuration of a fourth embodiment of the present invention will be described below with reference to FIG. 36, which shows, in a schematic block diagram, the configuration of a system for using the bandwidth allocating method in accordance with the fourth embodiment. FIG. 36 shows a bandwidth allocator 620 having its configuration similar to the bandwidth allocators in the first, second and third embodiments. As seen from the figure, the fourth embodiment may be the same as the first to third embodiments except for each subscriber unit 532b having three or more transmitter/receivers, consisting of a corresponding number of $chU_{00}$ to $chU_{(w-1)0}$ transmitters and a corresponding number of $chU_{00}$ to $chU_{(w-1)0}$ receivers, and an OLT transport section 534b as a central office device having three or more transmitter/receivers, consisting of a corresponding number of ch0 to ch(N−1) transmitters and also a corresponding number of ch0 to ch(N−1) receivers.

In the fourth embodiment, the subscriber units 532b communicate with the OLT transport section 534b over the channels which are provided by the transmitter/receivers in the following fashion. In case where a given subscriber unit a uses a set of communication channels CHa, the set is represented by CHa={chA1, chA2, chA3, . . . , chAw}, where w is the number of the used channels. Moreover, in case where a transmitter/receiver having a given channel chb is installed for a set of subscriber units Sb, the set is represented by Sb={Sb1, Sb2, . . . }. Then, in case where a function for finding the number of members in a given set X is referred as Fset(X), the transmitter/receivers are provided so as to have channels satisfying an expression (3):

$$\text{Max}\left(\sum_{j=0}^{n-1} Fset(CHm)\right) \quad (3)$$

$$CHm = \{m \mid m \in Sk\} \text{ and } Sk = \{k \mid k \in chj\}$$

The present invention is not specifically restricted to the bandwidth allocating methods and devices having the above-described techniques, but may be applied to a communication network capable of at least partially practicing such a bandwidth allocating method or device.

Figures 37A, 37B:
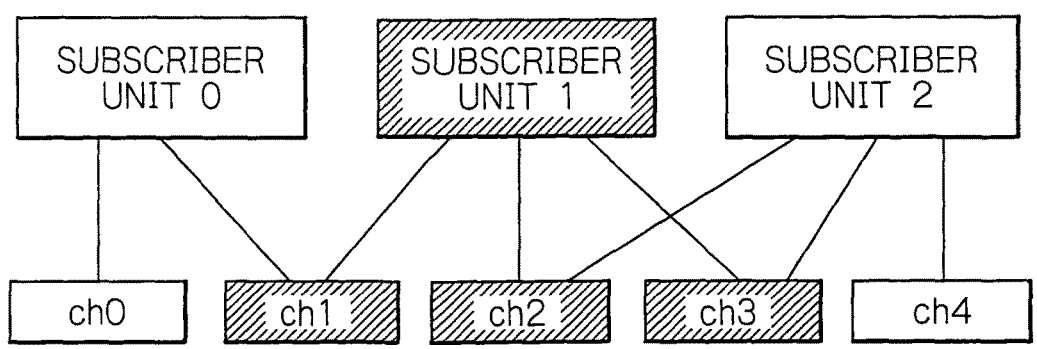
FIG. 37A shows a table useful for understanding a comparative example of bandwidth allocation.
FIG. 37B is a schematic diagram useful for understanding the comparative exemplified allocation of the channels.

More specifically, for each subscriber unit 532b provided with the transmitter/receivers using communication channels used by other transmitter/receivers of subscriber units, the number of the other transmitter/receivers is found to locate the channels so as to maximize the sum of the numbers for all the subscriber units. This will be specifically described below. FIG. 37A shows a table useful for understanding the bandwidth allocation for comparing with the forth embodiment. In the table of FIG. 37A, each column corresponds to a subscriber unit number, and each line or horizontal row corresponds to a channel number. A circle indicates a channel of the transmitter/receiver installed in a subscriber unit. FIG. 37B shows that the subscriber unit #1 uses channels shared with the other subscriber units #0 and #2, the relationship therebetween being indicated by lines. In this channel location, described will be an exemplified case where the subscriber unit #1 requests the transmission of 300%, i.e. three channels, to the channel bandwidth and the subscriber unit #0 requests the transmission of 101%, that is, the transmission of 401% in total. Since the subscriber unit #1 requests the transmission to occupy all the bandwidths of the channels ch1 to ch3, 100% of the bandwidth requested by the subscriber unit #0 could be contained in the channel ch0. However, the remainder, 1%, even when any other subscriber units request the transmission of 0%, could not be transmitted.

By contrast, in the channel location in accordance with the fourth embodiment shown in FIGS. 38A and 38B, even when the subscriber unit #1 requests the transmission of 300% to the channel bandwidth and the subscriber units #0 and #2 requests the transmission of 200%, hence the transmission of 700% in total, all the requests can be satisfied in the case of any other subscriber units requesting the transmission of 0%. In the channel location of this embodiment, when a given subscriber unit A transmits a large amount of data and another subscriber unit uses channels shared with the subscriber unit A, the more channels not shared with the subscriber unit A the other subscriber unit has, the higher possibility of being saved into other channels the traffic has, thereby facilitating the receipt of the transmission request. According to this embodiment, in the devices having the transmitter/receivers in FIGS. 38A and 28B, when the traffic is equally allocated to the possessed channels to flock to some channels, the remaining unoccupied channels are used to transmit the traffic, thereby improving the usability of the network.

In order to find a solution satisfying the expression (3), the processes as described below may be carried out. The processes will be described to take an exemplary case where the number of the subscriber units is eight, the total number of the used channels is eight, and the number of the channels for use in the subscriber unit is three. First, as shown in FIG. 39, a table is provided such that, like FIG. 37A, each column corresponds to a subscriber unit number, and each line or horizontal row corresponds to a channel number. In this table, the channels for use in the subscriber unit are set in sequence.

First, on the diagonal line of the table, default channels [1] to [8] of respective subscriber units are set.

Next, with respect to the subscriber unit #0, channels not being set and subscriber units not sharing channels are found to allocate the used channels [9] and [10]. In case of the subscriber unit #0, the used channels may be set unconditionally.

In addition, the allocation to the subscriber unit #1 is performed. In order to disperse bandwidths to be allocated, a channel subsequent to an already allocated bandwidth is searched for with priority. Subsequently, the channel ch2 is first nominated, but is already shared by the subscriber unit #0 with the channel ch1. Therefore, this is eliminated, and the channel ch3 is selected to be shared with the subscriber units #2 and 3 not sharing any channels yet. This is represented by [11].

Subsequently, in a similar operation the channels for use in subscriber units will be determined. As described above, when the number of the channels being already set in the subscriber unit exceeds an allowable value, or the subscriber unit already shares another channel or the number of the subscriber units allowed to use a given channel exceeds the allowable number, i.e. three in this example, channels may be not set.

Other searching processes will be described. First, for example, after the default channels are set in the table, and then in the range of the number of channels available for each subscriber unit, the used channels are set at random numbers to be set as a temporary solution. Next, the channels are set at random numbers again. If the resultant latter setting has a better sharing state than the temporary solution, the old temporary solution is discarded to set the new solution as the temporary solution. Such a searching is continued until the logically optimum solution is obtained or a predetermined period of time passes, and then the best of the solutions obtained by searching is applied.

Figure 40:
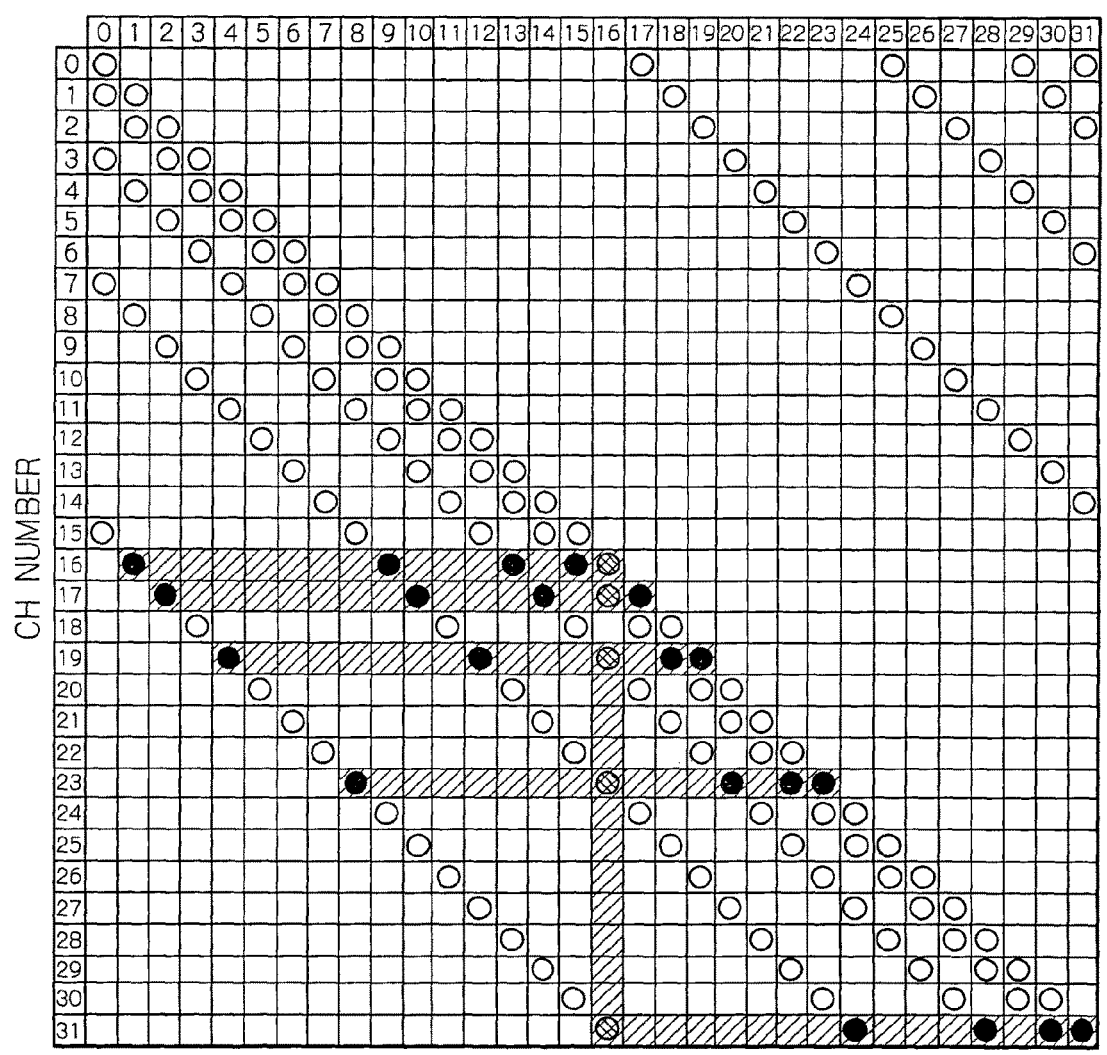

Another table as shown in FIG. 40 may be utilized to establish a similar network. In FIG. 40, the subscriber unit A uses the channels chA and ch(A−1) while the subscriber unit A and (A−1) share the bandwidth of the channel ch(A−1). The network has such a cyclic relationship for sharing or includes the allocation of the channels logically equivalent to the above-described allocation. When the subscriber unit uses two communication channels, the subscriber unit A uses the communication channels chA and ch(A+1). When the subscriber unit uses three communication channels, the subscriber unit A uses the communication channels chA, ch(A+1) and ch(A+1+2). When the subscriber unit uses four communication channels, the subscriber unit A uses the communication channels chA, ch(A+1), ch(A+1+2) and ch(A+1+2+4). When the subscriber unit uses five communication channels, the subscriber unit A uses the communication channels chA, ch(A+1), ch(A+1+2), ch(A+1+2+4) and ch(A+1+2+4+8). In a generalized form, when the subscriber unit uses X communication channels, where X is a positive integer more than unity, the subscriber unit A uses the communication channels chA, ch(A+1), . . . , and ch(A+$\{2^{(X-1)}\}$−1). The network has such a configuration or includes a channel location equivalent to this configuration. That is, when the number of usable channels is increased and totals X, a channel ch(A+{2^(X-1)-1}) is newly added for subscriber number A.

Figures 41, 42:
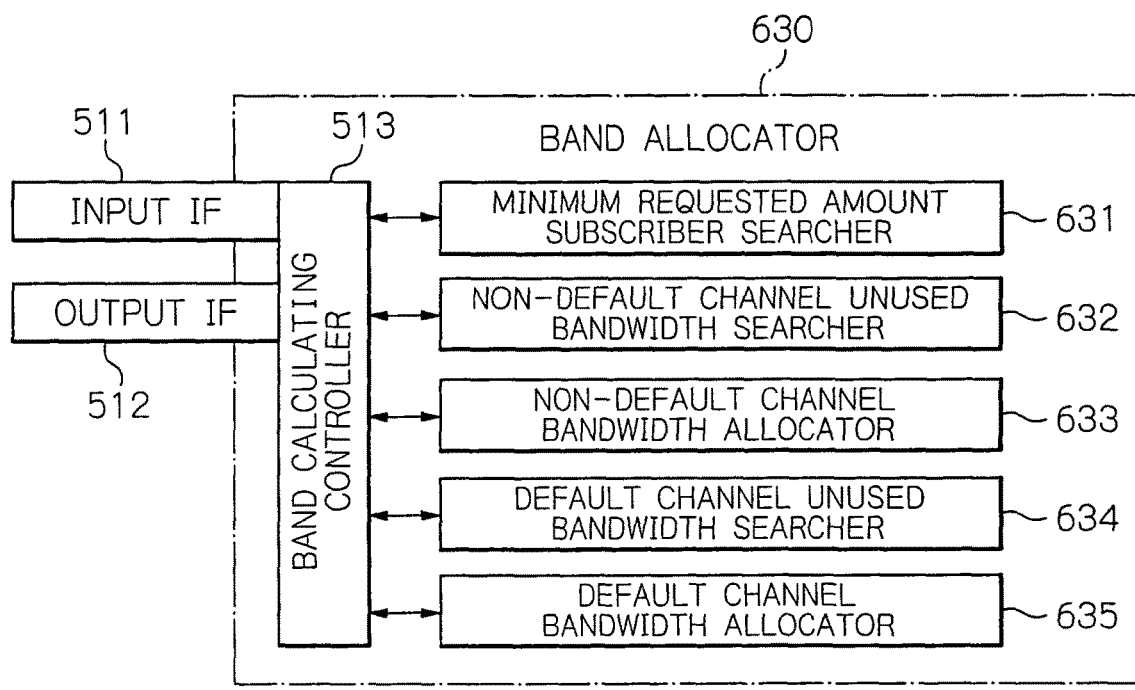
FIG. 41 is a schematic block diagram showing the configuration of a device performing a first example of bandwidth allocating method in accordance with the fourth embodiment.
FIG. 42 shows a table useful for understanding a bandwidth allocation of the first example of the fourth embodiment.
Figure 43:
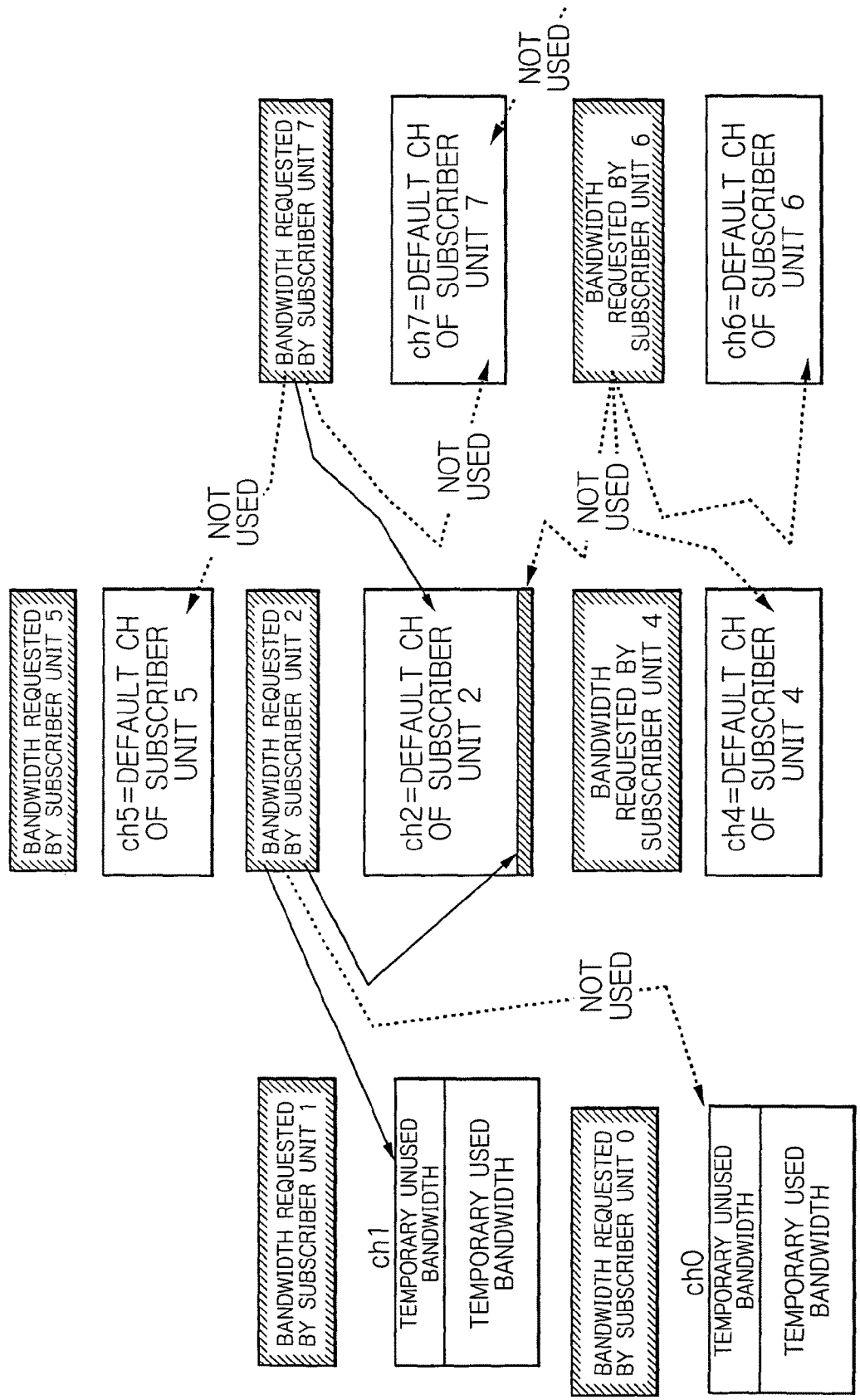
FIG. 43 is a schematic diagram useful for understanding the relationship between required bandwidths and channels searched for in the first example of the fourth embodiment.

Now, the operation according to the forth embodiment will be described as the bandwidth allocating method or algorithm used in the bandwidth allocating device located in the network configured above. In a first example of the forth embodiment, the methods described in the first and second embodiments are generalized so as to be adapted to increase the channels. The first example will be described with reference to FIGS. 41, 42 and 43. FIG. 41 a schematic block diagram showing the configuration of a device performing the first example of the fourth embodiment. FIG. 42 shows a table useful for understanding communication channels available for each subscriber unit in the first example. FIG. 43 is a schematic diagram useful for understanding the relationship between required bandwidths and channels searched for in the first example.

First, the minimum requested amount subscriber searcher 631 searches the plurality of subscriber units for the subscriber unit K having the minimum requested bandwidth.

Next, when the subscriber unit K has a default channel chK, a non-default channel unused bandwidth searcher 632 searches for another subscriber unit having a non-default channel other than the default channel as a default channel and a bandwidth requested by the other subscriber unit, thereby finding a free bandwidth, referred to as a "temporary free bandwidth", at the moment. FIGS. 41, 42 and 43 show an exemplified case where the subscriber unit #2 has the minimum requested bandwidth.

The subscriber unit #2 has the channel ch2 as a default channel and the channels ch0 and ch1 as non-default channels. From the bandwidths of the channels ch0 and ch1 as the non-default channels, respective requested bandwidths are subtracted to find unused bandwidths, referred to as a "temporary unused bandwidth". In FIG. 43, temporary used bandwidths for ch0 and ch1 indicate bandwidths requested by subscriber units #0 and #1 using ch0 and ch1 as default channels, respectively. In addition, the channel ch2 is a non-default channel of the subscriber units #6 and #7.

In the channels ch0 and ch1, the temporary unused bandwidth of the channel ch1 is broader than that of the channel ch0. The non-default channel bandwidth allocator 633 allocates only the temporary unused bandwidth in the bandwidth requested by the subscriber unit #2 to the channel ch1. The channel ch0 is not used at this moment. Then, a default channel unused bandwidth searcher 634 searches for the unused bandwidth in the channel ch2 and a default channel bandwidth allocator 635 allocates to the channel ch2 the settable bandwidth in the other bandwidth requested by the subscriber unit #2. After the bandwidth requested by the subscriber unit #2 is processed as described above, an unallocated bandwidth is left which is not allocated in this bandwidth-allocating process.

Next, the non-default channel unused bandwidth searcher 632 searches for subscriber units allowed to use the channel ch2 as a non-default channel to find the subscriber units #6 and #7 and their bandwidths. The result is transferred to the non-default channel bandwidth allocator 633. Then, in both bandwidths, the narrower bandwidth requested by the subscriber unit 7 is allocated to the unused bandwidth in the channel ch2. The residual bandwidth, after the default channel unused bandwidth searcher 634 finds the unused bandwidth in the channel ch7 as a default channel, is allocated thereto by the default channel bandwidth allocator 635. That is, when there are two subscriber units in which the non-default channel is the channel ch7, one of the two devices, which has narrower requested bandwidth, may allocate a bandwidth to the channel ch7. The above-described operation is repeated. During the repetition, when there are no bandwidths requested by subscriber units to be allocated after one cycle of process has done for the plurality of subscriber units, the current state is set as the initial state. Then, the step returns to the above-described process that the minimum requested amount subscriber searcher 631 searches the plurality of subscriber units for the subscriber units K having the minimum requested bandwidth. In this way, until the requested bandwidth cannot be allocated, the above-described operation is repeated to allow the allocation.

In the above-described operation, when the subscriber unit A having the minimum requested bandwidth has a bandwidth allocated, the bandwidth allocated to a non-default bandwidth is a temporary unused bandwidth. However, similarly to the second embodiment, there is also an allocating manner further improving the bandwidth usability in which values obtained from the final solution are added to the preceding temporary, unused bandwidth and the calculation is repeated again.

Now, a second example of the forth embodiment will be described. First, bandwidths requested by all the subscriber units are equally allocated to the available channels temporarily without distinguishing a default channel from a non-default channel. Next, with respect to the requested bandwidths exceeding the bandwidths of the channels, checking the existence of traffic capable of being shifted one time to a free bandwidth to be saved, and then the existence of traffic capable of being shifted two times to be saved is checked for all the cases. This operation, until an allowable period of time Tmax passes, is performed by incrementing the number of times of shifting to check all the cases. Alternatively, this termination condition may not be set as an allowable period, but by means of some other indexes.

With the fourth embodiment, in addition to the advantages of the first to third embodiments, even when one subscriber unit can use three or more channels, bandwidths can be allocated, accomplishing a higher bandwidth usability for the bandwidth allocation.

Figure 44:
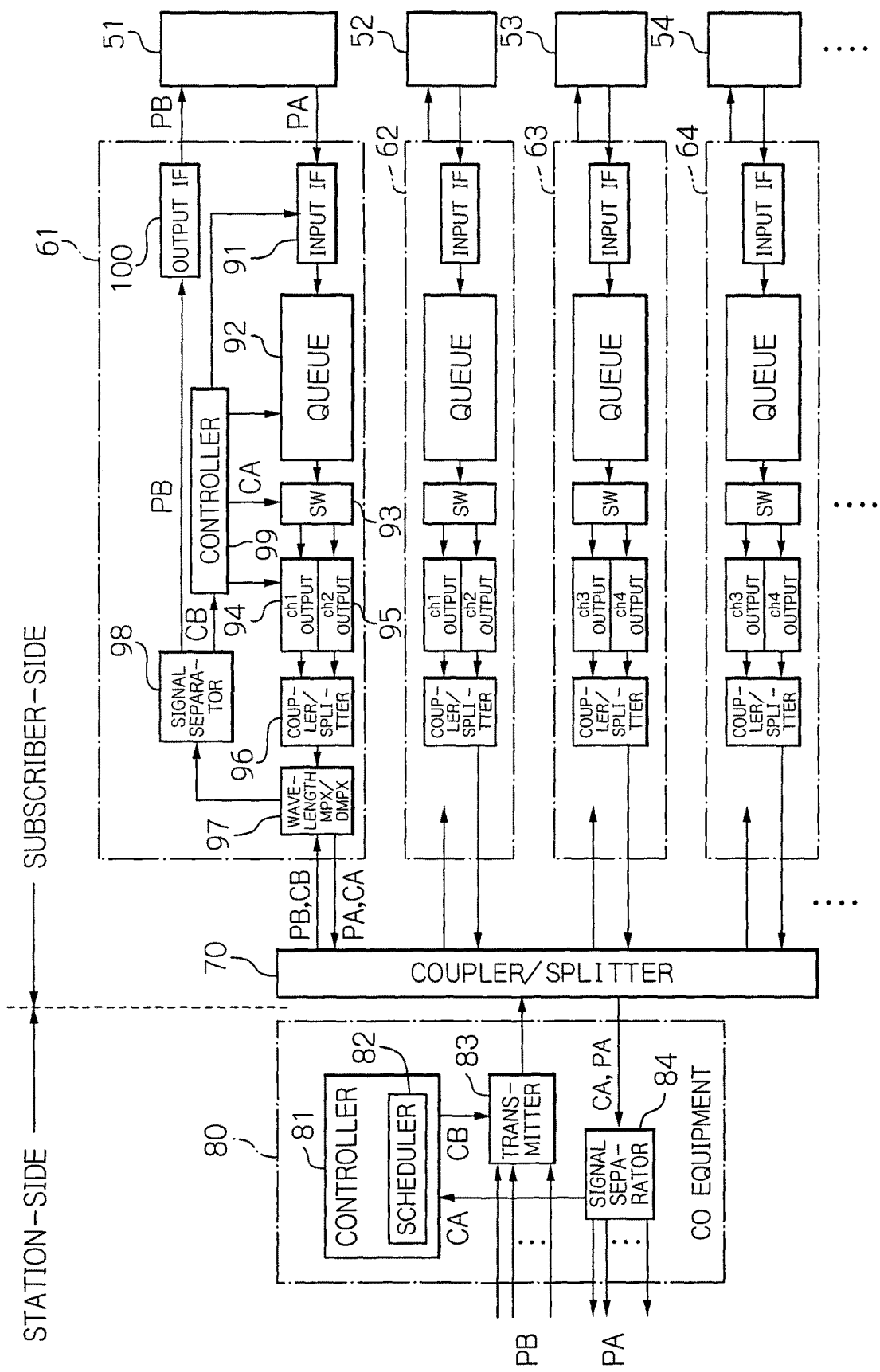
FIG. 44 is a schematic block diagram showing the configuration of a dynamic bandwidth allocating device, including subscriber terminal devices and a central office device, in accordance with a first reference example of the present invention.

Now, the reference examples of the present invention will be described below. FIG. 44 is a schematic block diagram showing the configuration of a dynamic bandwidth allocating device in accordance with a first reference example of the present invention. FIG. 44 shows a system transmitting information PA, as traffic or in the form of packet, from a plurality of subscriber terminals 51 to 54, such as personal computers, to a central office device 80 through respective subscriber units 61 to 64, such as network devices, and an optical coupler/splitter 70. The dynamic bandwidth allocating device in accordance with the first reference example mainly includes respective subscriber units 61 to 64, and a controller 81 of the central office device 80. The controller 81 may be a control device located in a place different from the central office device 80 or may be located in any place of the subscriber premises.

Each of the subscriber units 61 to 64 has an input interface (IF) 91, a queue 92, a switch (SW) 93, signal output sections 94 and 95 of channels CH1 and CH2, a coupler/splitter 96 and a wavelength multiplexer/demultiplexer (MPX/DMPX) 97, which are interconnected as shown. Each of the subscriber units 61 to 64 further has a signal separator 98, a controller 99 and an output interface 100, which are interconnected as illustrated. For example, the packet PA outputted from the subscriber terminal 51 is inputted to the switch 93 through the queue 92, and is inputted to either the signal output section 94 of the channel CH1 or the signal output section 95 of the channel CH2 by the switch 93. Then, a signal of the selected channel is sent to the coupler/splitter 70 through the coupler/splitter 96 and the wavelength multiplexer/demultiplexer 97. The coupler/splitter 70 also receives control data CA, as a packet including the control data, generated in the controller 99. Through the coupler/splitter 70, the wavelength multiplexer/demultiplexer 97 receives a packet PB and control data CB, as a packet including the control data, of the controller 99, which are separated in the signal separator 98 to send the packet PB to the subscriber terminal 51 through the output interface 100. The control data CB outputted from the signal separator 98 is inputted to the controller 99. The controller 99 generates control data on the basis of the control data CB and sends the generated data to the signal output section 94 of the channel CH1, the signal output section 95 of the channel CH2, the switch 93, the queue 92 and the input interface 91.

The central office device 80 has the controller 81 including a scheduler 82, a transmitter 83 and a signal separator 84, which are interconnected as depicted. A signal inputted to the signal separator 84 through the coupler/splitter 70 is separated into the packet PA and the control data CA. Then, the packet PA is outputted and the control data CA is sent to the controller 81. The transmitter 83 receives the packet PB and the control data CB from the controller 81. Then, the packet PB and the control data CB are inputted to the wavelength multiplexer/demultiplexer 97 through the coupler/splitter 70. The other subscriber units 62, 63 and 64 also may have a configuration similar to the subscriber unit 61, and therefore, from FIG. 44, the inside configuration of the subscriber units 62, 63 and 64 is partially omitted. Signals from the other subscriber terminals 52, 53 and 54 are also transmitted similarly to the signals from the subscriber terminal 51.

In the system shown in FIG. 44, each of the subscriber units 61 to 64 transmits to the controller 81 a bandwidth requesting signal requesting a bandwidth for transmitting a packet to the central office device 80 at least once. The bandwidth requesting signal may be transmitted preliminarily one or more times. Alternatively, the bandwidth request may be manually inputted from the subscriber unit or control device. Next, the controller 81 permits transmission by the minimum guaranteed bandwidth preliminarily determined for each of the subscriber units 61 to 64. Here, the range of the maximum available-for-transmission bandwidth is defined by subtracting the sum of the minimum guaranteed bandwidths of the plurality of subscriber units 61 to 64 from the bandwidth available for transmission by all the plurality of subscriber units 61 to 64. The controller 81 generates the control data CB for allocating a bandwidth allowed to be used by each of the subscriber units 61 to 64 so as to maximize, according to predetermined rules, the bandwidth available for transmission of a packet by each of the subscriber units 61 to 64 in the range while maintaining the fairness of the subscriber units. Next, the controller 81 transmits the control data CB toward each of the subscriber units 61 to 64 to thereby report a bandwidth available for transmission by each of the subscriber units 61 to 64. Next, each of the subscriber units 61 to 64 transmits the packet PA by the bandwidth allowed by the controller 81.

A step for generating the control data CB is performed by using a plurality of pairs, shown in FIG. 45 described below, of first and second information maintaining means provided for each of the subscriber units 61 to 64 in the controller 81, third information maintaining means, shown in FIG. 45 also described below, provided in the controller 81 so as to be shared with the plurality of subscriber units 61 to 64 and control means, shown in FIG. 45 also described later. Each of the first, second and third information maintaining means can output a fixed amount of information, as in the form of token, from an output section at a fixed time interval and to output, when the maintained information exceeds a predetermined amount, the exceeding or maintained information from another output section for overflow.

The step for generating the control data CB includes the substeps of: inputting information corresponding to the bandwidth requesting signal to the first information maintaining means in each of the pairs; outputting a fixed amount of information from the output section of the first information maintaining means in each of the pairs at a fixed time interval to input the outputted information to the second information maintaining means; outputting a fixed amount of information from the output section of the second information maintaining means in each of the pairs at a fixed time interval; outputting information from the output section for overflow of the second information maintaining means to the third information maintaining means in each of the pairs; and transmitting the control data based on the information outputted from the output sections of the second and third information maintaining means to the subscriber units 61 to 64 by the controller 81.

The controller 81 includes, for example, a timing signal generator for generating a signal defining the timing for transmission of the packet PA from each of the subscriber units 61 to 64 and the control data CB includes information about the timing and the period for transmission of the packet PA from each of the subscriber units 61 to 64.

The controller 81 may have, for example, means for determining at least one of the level of importance and the allowable delay time of a packet transmitted from each of the subscriber units 61 to 64, and means for determining the priority of transmission of the packet PA to be transmitted from the subscriber units 61 to 64 according to the determined level of importance and/or the allowable delay time of a packet by the controller 81.

The controller 81 also may have, for example, means for determining at least one of the level of importance and the restoration possibility by error correction of a packet transmitted from each of the subscriber units 61 to 64 and means for discharging the information from the output sections for overflow of the first, second and third information maintaining means in the order of ascending determined levels of the importance or descending restoration possibility by error correction of a packet by the controller 81.

Figure 45:
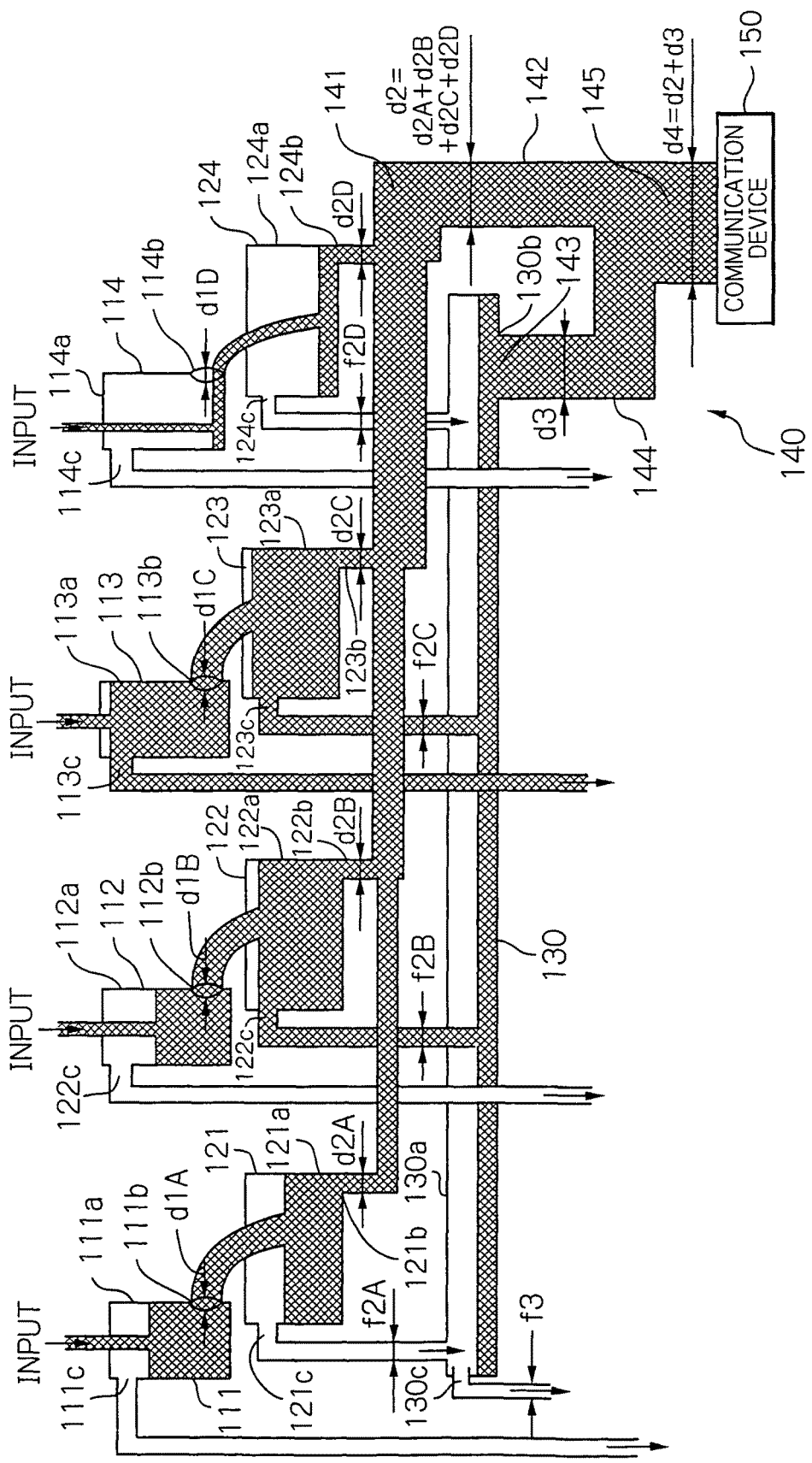
FIG. 45 conceptually shows how the dynamic bandwidth allocating device operates in accordance with the first reference example by using the leaky bucket algorithm.

FIG. 45 is a schematic diagram useful for understanding the operation of the dynamic bandwidth allocating device in accordance with the first reference example by using the leaky bucket algorithm. FIG. 45 can be used for understanding the operation of the controller 81 in FIG. 44 and corresponds to the configuration of FIG. 46 described below. FIG. 45 also corresponds to the operation of the subscriber units 61 to 64 based on the control data CB generated by the controller 81. However, in the first reference example, the subscriber units 61 to 64 use the timing and the period for transmission of the packet to allocate the bandwidth for each channel. Therefore, with respect to the drawings, the configuration shown in FIG. 45 may not correspond to the configuration of the subscriber units 61 to 64 shown in FIG. 44 one-to-one. When the following description with reference to FIG. 45 is directed to the operation of the controller 81 in FIG. 44, information inputted to a "bucket with a hole" corresponding to each of information maintaining means is a token. However, when the following description with reference to FIG. 45 is directed to the operation of the subscriber units 61 to 64 in FIG. 44, information inputted to a "bucket with a hole" as each information maintaining means is a packet, i.e. traffic, actually flowing from the subscriber to the central office.

In FIG. 45, the configuration for each of the subscribers #1 to #4 has information maintaining means 101 (102 to 104) including a pair of first and second information maintaining means 111 (112 to 114) and 121 (122 to 124), the third information maintaining means 130 provided as a configuration for each subscriber, and information merging means 140 provided as a shared configuration.

In FIG. 45, the information maintaining means is represented by a "bucket with a hole", information, which may be a token in describing the controller 81 or a packet for describing the subscriber units 61 to 64, is represented by "water", and an available-for-transmission bandwidth for the information outputted from the information maintaining means is represented by the size of the "hole" of the "bucket with a hole".

The dynamic bandwidth allocating device in accordance with the first reference example is configured to include first "buckets with a hole" (maximum bandwidth limiting queues) 111 to 114 representing the first information maintaining means provided for each of the subscriber terminals #1 to #4, second "buckets with a hole" (minimum bandwidth guaranteeing queues) 121 to 124 provided for each of the subscriber terminals #1 to #4, a third "bucket with a hole" 130 shared by all the subscriber terminals #1 to #4, first and second merging sections 141 and 144, a first pipe line 142 for connecting the first merging section 141 to the second merging section 144, a second pipe line 143 for connecting the third "bucket with a hole" 130 to the second merging section 144, and a third pipe line 145 from the second merging section 144 to a communication device 150. The first and second merging sections 141 and 144 may also be implemented into a single merging section. The first merging section 141, the first and second pipe lines 142 and 143, and the second merging section 144 may compose information merging means 140 shown in FIG. 44.

Information representing a bandwidth requested for transmission by each subscriber is inputted to the first "buckets with a hole" 111 to 114. The first "buckets with a hole" 111 to 114 have "holes" 111b to 114b having sizes of d1A, d1B, d1C and d1D in the bottom, which is configured so as to enable a fixed amount of information to flow to the second "buckets with a hole" 121 to 124, respectively, per unit time. The sizes of d1A, d1B, d1C and d1D of the bottom "holes" 111b to 114b represent the maximum transmittable amount of information per unit time, or transmission rate, from the first "buckets with a hole" 111 to 114 to the second "buckets with a hole" 121 to 124, respectively. The first "buckets with a hole" 111 to 114 have "holes" 111c to 114c, respectively, for flow of overflowing information, which is for discarding information in the first reference example, at the top. Since the sizes of the holes are sufficiently large, overflowing "water" in the case of any input can be discarded therefrom. The sizes of d1A, d1B, d1C and d1D of the bottom holes 111b to 114b, respectively, may be equal to each other or may be different.

The second "buckets with a hole" 121 to 124 also have holes in the bottom and the top so that "water" to be outputted to the first merging section 141 flows from the bottom "holes" 121b to 124b, and "water" overflowing from the top holes 121c to 124c flows to the third "bucket with a hole" 130. The sizes of d2A, d2B, d2C and d2D of the bottom holes 121b to 124b are substantially equal to the minimum guaranteed bandwidths of the subscribers (subscriber terminals #1 to #4), respectively. Since the top "holes" 121c to 124c have a sufficiently large size, whole overflowing "water" is outputted therethrough. The sizes of d2A, d2B, d2C and d2D of the bottom holes 121b to 124b may be equal to each other, or may be different.

The third "bucket with a hole" 130 also has holes in the bottom and the top so that "water" to be outputted to the second merging section 144 flows from the bottom hole 130b, and overflowing "water" flows out, which will be discarded in the first reference example, of the top hole 130c. The size of the bottom "hole" 130b is represented by d3 in the figure. Since the top "hole" 130c has a sufficiently large size, whole overflowing "water" can be outputted therethrough.

"Water" flowing out of the bottom holes 121b to 124b of the second "buckets with a hole" 121 to 124 is merged in the first merging section 141, and flows into the second merging section 144 over the first pipe line 142. Since the first pipe line 142 in the bottom of the first merging section 141 has a thickness d2=d2A+d2B+d2C+d2D, in the case of existence of the more second "buckets with a hole", d2=d2A+d2B+d2C+d2D+, the "water" from the second "buckets with a hole" 121 to 124 flows into the second merging section 144 without deficiency and excess by this mechanism. Therefore, whole "water" outputted from the bottom "holes" of the second "buckets with a hole" 121 to 124 is always outputted to the second merging section 144.

The second merging section 144 is configured to merge "water" from the bottom "hole" 130b of the third "bucket with a hole" 130 and from the first merging section 141 to input the merged "water" to the upstream-side communication device 150 such as a transmission device or a router over the third pipe line 145. When the second pipe line 143 from the third "bucket with a hole" 130 to the second merging section 144 has a thickness d3, the third pipe line 145 from the second merging section 144 to the communication device 150 has a thickness d4 equal to (d2+d3), which is equal to the transfer performance of the communication device 150. Therefore, whole "water" inputted to the first merging section 141 can be outputted from the communication device 150. The thickness d3 of the second pipe line 143 is found as (d4−d2). Accordingly, this is a residual bandwidth obtained by distracting the minimum guaranteed bandwidths of all the subscribers from the transfer performance of the communication device 150. The minimum guaranteed bandwidths d2A, d2B, d2C and d2D of all the subscriber terminals are totally inputted to the communication device 150, all the subscribers sharing and using the residual bandwidths.

Figure 46:
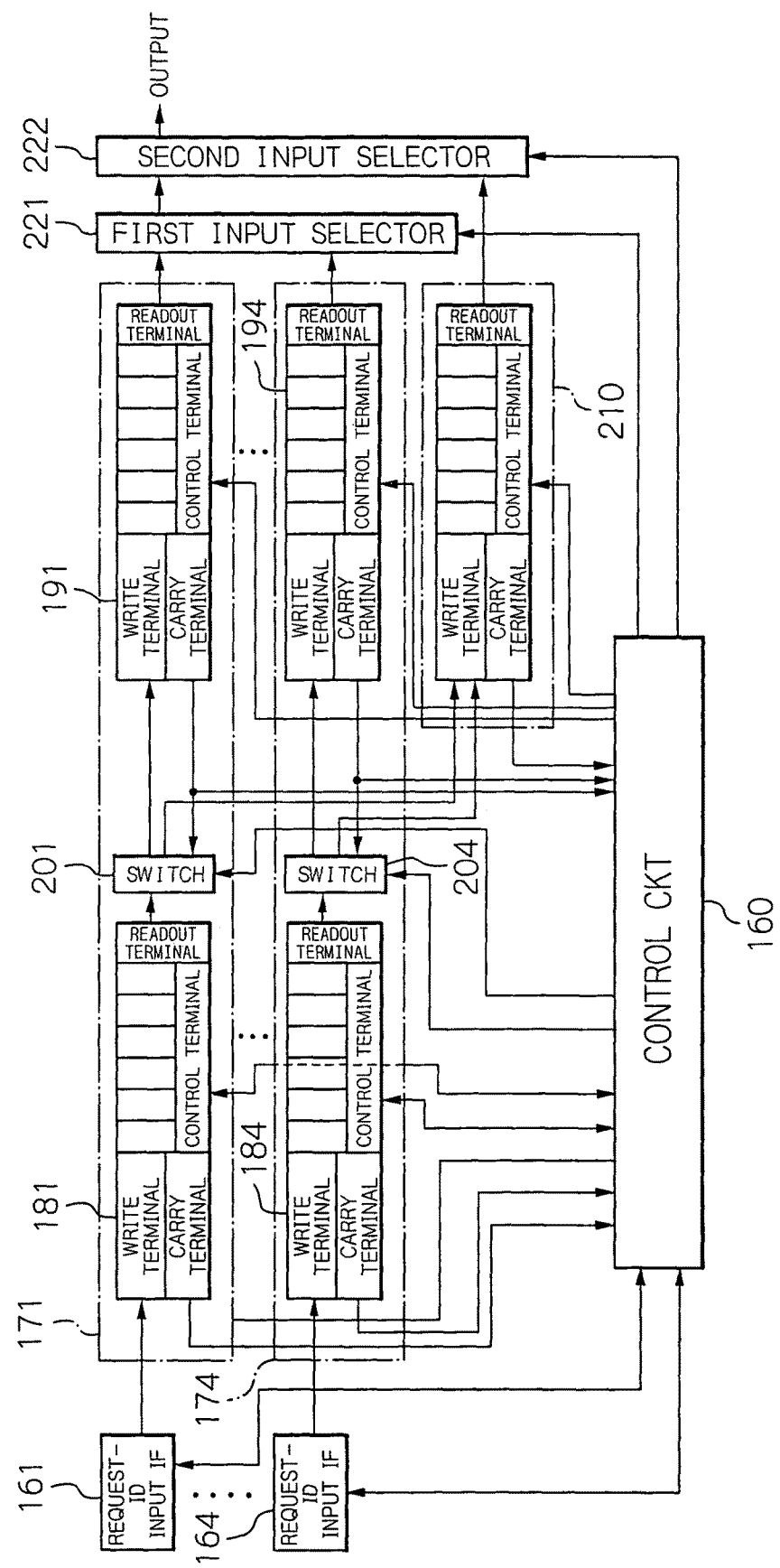
FIG. 46 is a schematic block diagram showing the configuration of a timing signal generator in the dynamic bandwidth allocating device in accordance with the first reference example.

Now, FIG. 46 is a schematic block diagram showing the configuration of the controller 81 of the central office device 10 in the dynamic bandwidth allocating device in accordance with the first reference example. The controller 81 can be implemented by, for example, an electronic circuit as shown in FIG. 46. The controller 81 serving as the central office device 10 functionally has a configuration corresponding to the subscriber terminal device in which traffic actually flows, in other words, a device for allocating a bandwidth. However, in the controller 81 as the central office device 10, traffic does not flow.

The first "buckets with a hole" 111 to 114 of the subscriber terminal device shown in FIG. 45 correspond to the first FIFO (First-In First-Out) memories 181 to 184 as the central office device shown in FIG. 46, and the second "buckets with a hole" 121 to 124 of the subscriber terminal device shown in FIG. 45 correspond to the second FIFO memories 191 to 194 as the central office device shown in FIG. 46, respectively. In addition, the third "bucket with a hole" 130 of the subscriber terminal device shown in FIG. 45 corresponds to the third FIFO memory 210 as the central office device shown in FIG. 46, and the first and second merging sections 141 and 144 of the subscriber terminal device in FIG. 45 correspond to a first and a second input selector 221 and 222 serving as the central office device shown in FIG. 46, respectively. The first and second input selectors 221 and 222 may also be implemented by a single input selector. Request-ID input interfaces 161 to 164 and a control circuit, or timing signal generator, 160 use the FIFO memories and the input selectors to output control data.

In the configuration shown in FIG. 45, the token representing the transmission request from each subscriber is inputted from the top of the first "buckets with a hole" 111 to 114. The tokens inputted from the top of the first "buckets with a hole" 111 to 114, when being equal to or less than declared peak rates, or the maximum transmittable amounts of information, d1A to d1D, are sent to the second "buckets with a hole" 121 to 124 through the bottom "holes" 111b to 114b of the first "buckets with a hole" 111 to 114, respectively. Whenever tokens inputted from the top of the first "buckets with a hole" 111 to 114 are more than the peak rates for a long period, some of the tokens inputted to or maintained in the first "buckets with a hole" 111 to 114 will be discarded from the top "holes" 111c to 114c of the first "buckets with a hole" 111 to 114, respectively.

Tokens equal to or less than the minimum guaranteed bandwidths d2A, d2B, d2C and d2D in the tokens inputted to the second "buckets with a hole" 121 to 124 are totally sent through the bottom holes 121b to 124b and through the first and second merging sections 141 and 144 to the communication device 150. When tokens inputted from the top of the second "buckets with a hole" 121 to 124 are more than the minimum guaranteed bandwidths for a long period, some of the tokens inputted to the second "buckets with a hole" 121 to 124 are sent from the top "holes" 121c to 124c of the second "buckets with a hole" 121 to 124, respectively, to the third "bucket with a hole" 130.

When the total of tokens sent from all the subscribers to the third "bucket with a hole" 130 is equal to or less than a residual bandwidth obtained by subtracting the minimum guaranteed bandwidth (the thickness of the first pipe line 142) d2 from a bandwidth (the thickness of the third pipe line 145) d4 transmittable by the communication device 150, i.e. (d4−d2), the sent tokens are sent to the communication device 150. Tokens more than this, after maintained for a fixed period, are discarded from the top hole 130c of the third "bucket with a hole" 130.

In addition, two "holes" are provided at the top of the second "buckets with a hole" 121 to 124, one of the "holes" being connected to the third "bucket with a hole" 130, the other being used for discarding. The size of the former "hole" can be adjusted to thereby limit the size of the token sendable by the residual bandwidth. This configuration is the same as that of FIG. 50 described below except for a flow rate monitor.

Next, the operation of the subscriber terminal device will be described, for example, in the case of control by the controller 81 shown in FIG. 46. The device shown in FIG. 46 is a central office device located in a central office. In the device in FIG. 46, an actual user packet does not flow. The device in FIG. 46 determines whether to allow transmission for the request for a bandwidth (request-ID) from the subscriber in response to an inquiry about a bandwidth from the central office device, and reports the result to the subscriber terminal.

Request-IDs inputted through the request-ID input interfaces 161 to 164 in FIG. 46 from the respective subscribers are inputted on the write terminals to the first FIFO memories 181 to 184. Now, one request-ID represents a bandwidth having a certain fixed length. Instead of such a configuration, an alternative way may be adapted to store information on a bandwidth having its length variable to calculate the total.

When there are any request-IDs already stored in the first FIFO memories 181 to 184, a currently written request-ID is stored in the storage location immediately following the location having already stored a request-ID. When no request-ID is stored, a currently written request-ID is stored in the top storage location of the first FIFO memory. The control circuit 160 transfers request-IDs stored in the top storage location of the first FIFO memories 181 to 184 through switches 201 to 204 to the storage location following the location having already stored a request-ID of the second FIFO memories 191 to 194 at a fixed time interval, deletes the information transferred from the first FIFO memories 181 to 184, and shifts subsequent information one by one forward. It is to be noted that information represented by {transfer cycle [/sec]}×{one request-ID} [Byte] is the maximum available passband, or maximum passable bandwidth. However, the second FIFO memories 191 to 194, when totally occupied, send a carry signal to the first FIFO memories 181 to 184 and the control circuit 160. In this case, any request-IDs are not transferred to the first FIFO memories 181 to 184. Similarly, by control data from the control circuit 160, a request-ID in the top location is periodically read out from the second FIFO memories 191 to 194 to be outputted through the first and second input selectors 221 and 222. The outputted request-ID is sent to each subscriber unit (61 to 64, FIG. 44). Then, information corresponding to the request-ID is allowed to be transmitted from the subscriber terminal to the central office device. The minimum guaranteed band is represented by {Transfer cycle [/sec] from the second FIFO memory to the input selector}×{traffic [Byte] represented by one request-ID}.

In the case of the first FIFO memories 181 to 184 having the large storage capacity, when the second FIFO memories 191 to 194 are first occupied, the carry signals are sent to the first FIFO memories 181 to 184. Accordingly, request-IDs transmittable to the second FIFO memories 191 to 194 are equal to the minimum guaranteed bandwidths read out from the first FIFO memories 181 to 184, respectively. Presently, when the first FIFO memories 181 to 184 are also occupied to almost cause overflow, the carry signal is sent to the control circuit, and a request-ID in the top location is sent to the third FIFO memory 210. A readout rate to the third FIFO memory 210 may be set by, for example, allocating the same rate to all the subscribers or a higher rate to a subscriber unit having a broader minimum guaranteed bandwidth, which may be determined according to the operation policy of a system provider. The third FIFO memory 210, since shared with all the subscriber units, may be already occupied by request-IDs from other subscriber units. When the third FIFO memory 210 is also occupied, the carry signal is sent to the first FIFO memories 181 to 184 of all the subscriber units. Then, the first FIFO memories 181 to 184, since occupied, cannot receive a request-ID any more. Accordingly, a bandwidth request is determined to be rejected by the control circuit 160. Obviously, the request-ID cannot enter the FIFO memory. The amount of information outputted from the third FIFO memory 210 through the second input selector 222 is represented as {whole bandwidths}−{Σ(minimum guaranteed bandwidths of all subscriber units)}.

As described above, the dynamic bandwidth allocating method or device in accordance with the first reference example is used to allow the allocation of a bandwidth for communication by designating the minimum guaranteed bandwidth and the maximum passable bandwidth for a bandwidth desired to be transmitted by each subscriber by a simple configuration. Also, the subscribers can use the performance of the shared transmission medium without wasting.

Now, variations of the first reference example of the present invention will be described below. As shown in FIG. 46, the configuration of the dynamic bandwidth allocating device described above may be implemented by electronic circuitry. However, the entirety or part of the device may be implemented by software on a computer. This can also be applied to a second or other reference examples described later on.

In the above description, a token sent from the second "bucket with a hole" to the third "bucket with a hole" or a token discarded from the first and third "buckets with a hole" is the latest token entering the "bucket with a hole", i.e. queue. However, depending on the characteristics of a packet in communication, it is applicable to select a token to be discarded. Specifically, depending on the ordering of the priority of a token in order to reduce the transfer delay time, it may be applied to determine, among the tokens previously entering the "bucket with a hole" (queue), a token to be discarded and a token to be sent to the subsequent stage.

In general, information to which FEC (Forward Error Correction) is applied has a probability to be restored. Therefore, as another way, such information may be selected to be discarded.

In order to avoid tokens meant for a specific destination being exclusively discarded, tokens to be discarded may also be determined by random numbers.

Alternatively, depending on the level of importance of traffic, traffic to be discarded may be determined.

The above-described manners for discarding tokens, or traffic in subscriber units, can also be applied to all the following examples.

Figure 47:
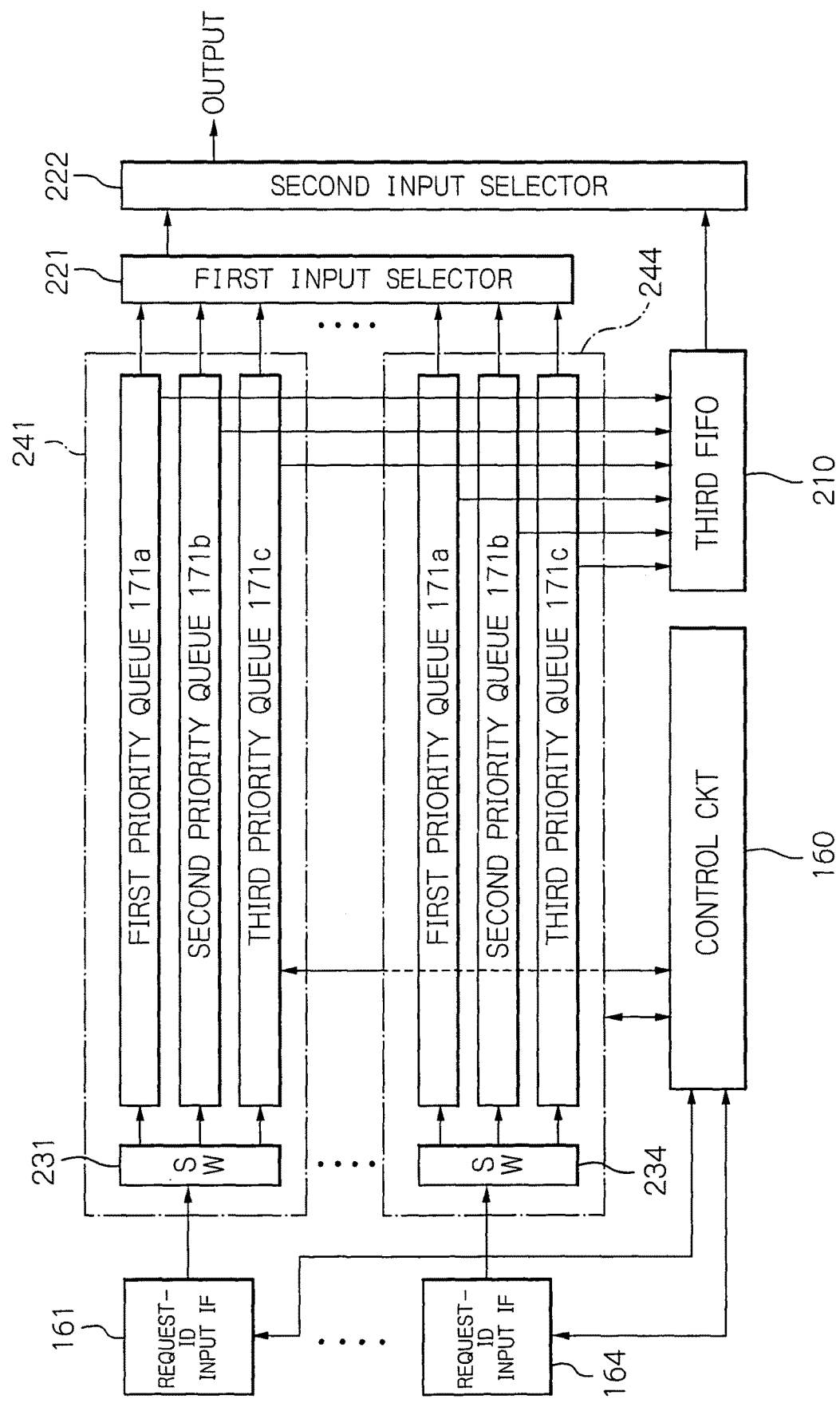
FIG. 47 is a schematic block diagram showing the configuration of a timing signal generator in a dynamic bandwidth allocating device in accordance with a variation of the first reference example.

FIG. 47 is a schematic block diagram showing the configuration of a dynamic bandwidth allocating device in accordance with a variation of the first reference example, which corresponds to a variation of the configuration of FIG. 46 as described above. In the exemplified configuration shown in FIG. 47, a plurality of priority classes are provided for packets. In the figure, a first circuit for subscriber 241 has first to third circuits for priority queue 171a, 171b and 171c as a plurality of means provided so as to correspond to the ordering of priority of a packet, while a fourth circuit for subscriber 244 has first to third circuits for priority queue 174a, 174b and 174c. Although not shown in the figure, the other circuits for subscriber may also have a similar configuration. First to third priority queues have a priority in the descending order. Each of the first to third circuits for priority queue includes a configuration similar to, for example, the circuit for subscriber shown 171 shown in FIG. 46. Thus, the circuits for subscriber 241 to 244 selected by switches 231 to 234 are provided with the plurality of priority queues corresponding to the classes. In that manner, the queues are provided in the descending order of priority through the selectors 221 and 222, and the number of times of reading out the queues by the selectors is differentiated according to the ordering of priority of the priority queue. FIG. 47 includes lines conveying a flow of information, or tokens in the case of FIG. 46, but not those conveying control data. The flow of the control data could be indicated by the connections shown in FIG. 46.

In addition, the first and second selectors 221 and 222 are not always necessary. Therefore, another configuration may also be used such that information from readout terminals of the second and third FIFO memories is used without modification. The selectors or switches 221 and 222 may have a plurality of outputs connected to a transmission channel/timing allocating circuit. The transmission channel/timing allocating circuit can be implemented by a fourth reference example described below.

Figure 1:
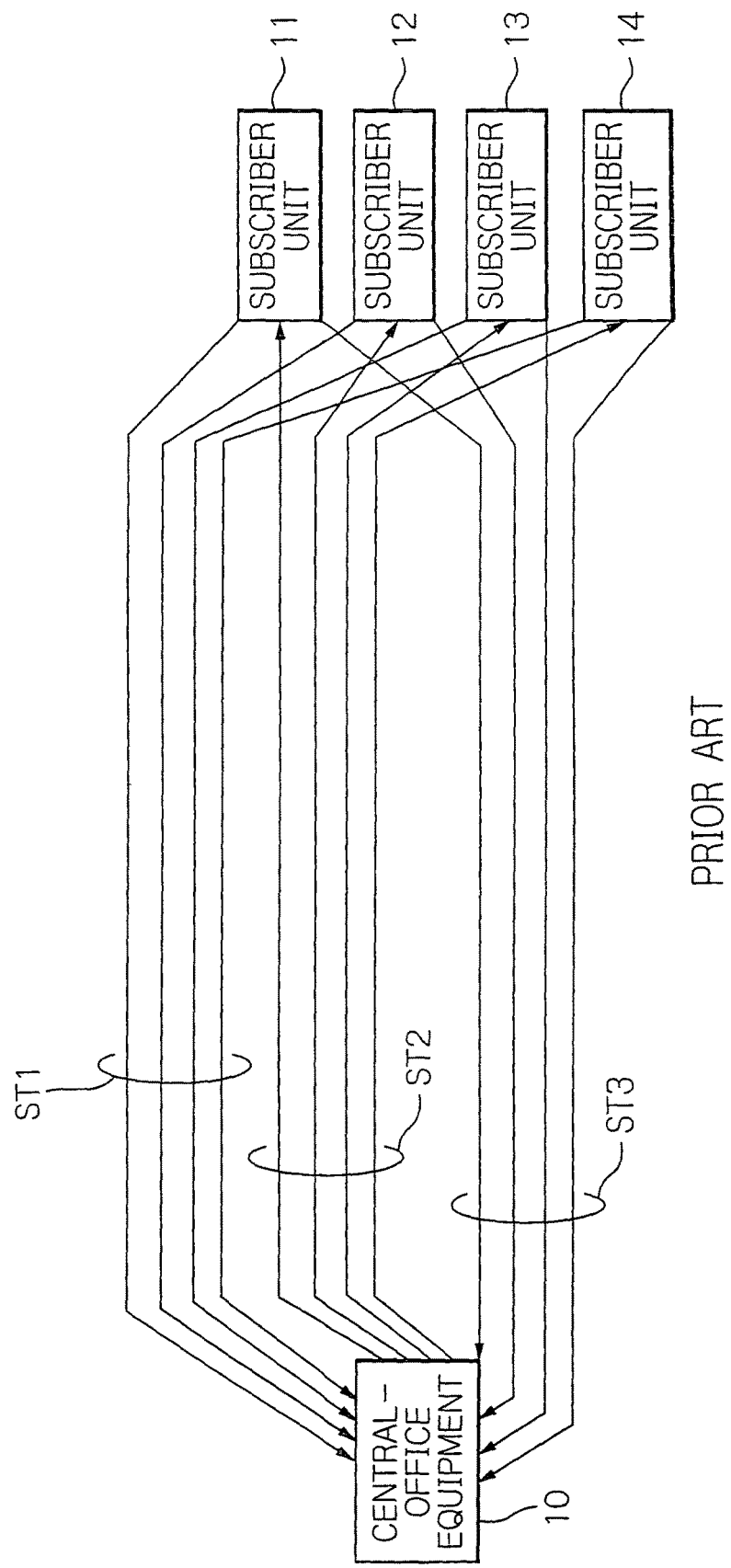
FIG. 1 is a schematic system diagram useful for understanding an exemplified allocation of a bandwidth for communication between central-office equipment and subscriber terminals through subscriber units, e.g. network devices.
Figure 2:
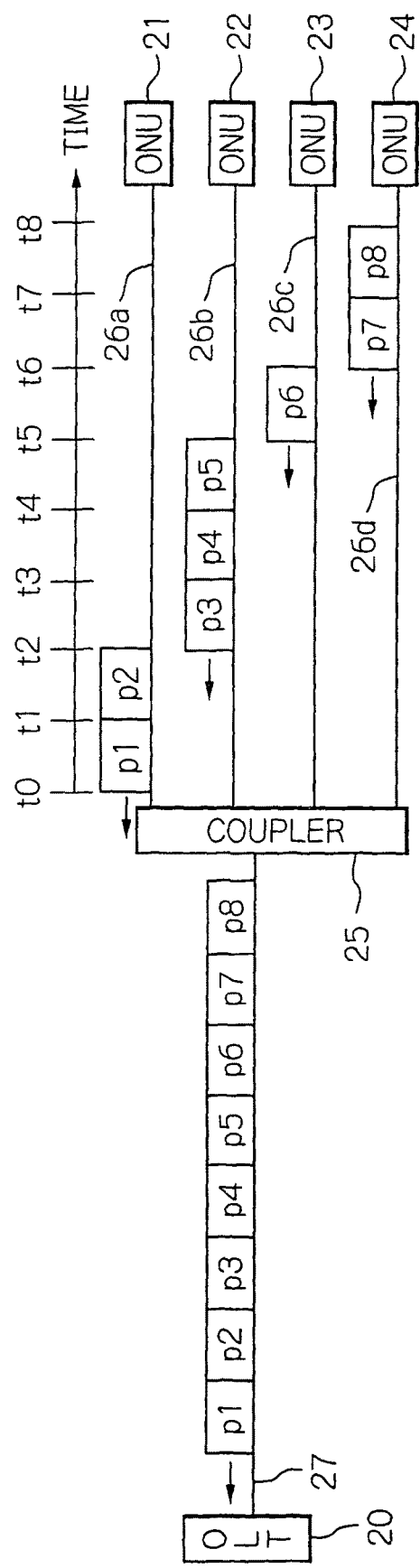
FIG. 2 is a schematic diagram useful for understanding an optical access network as an actual example of the prior art system shown in FIG. 1.
Figure 3:
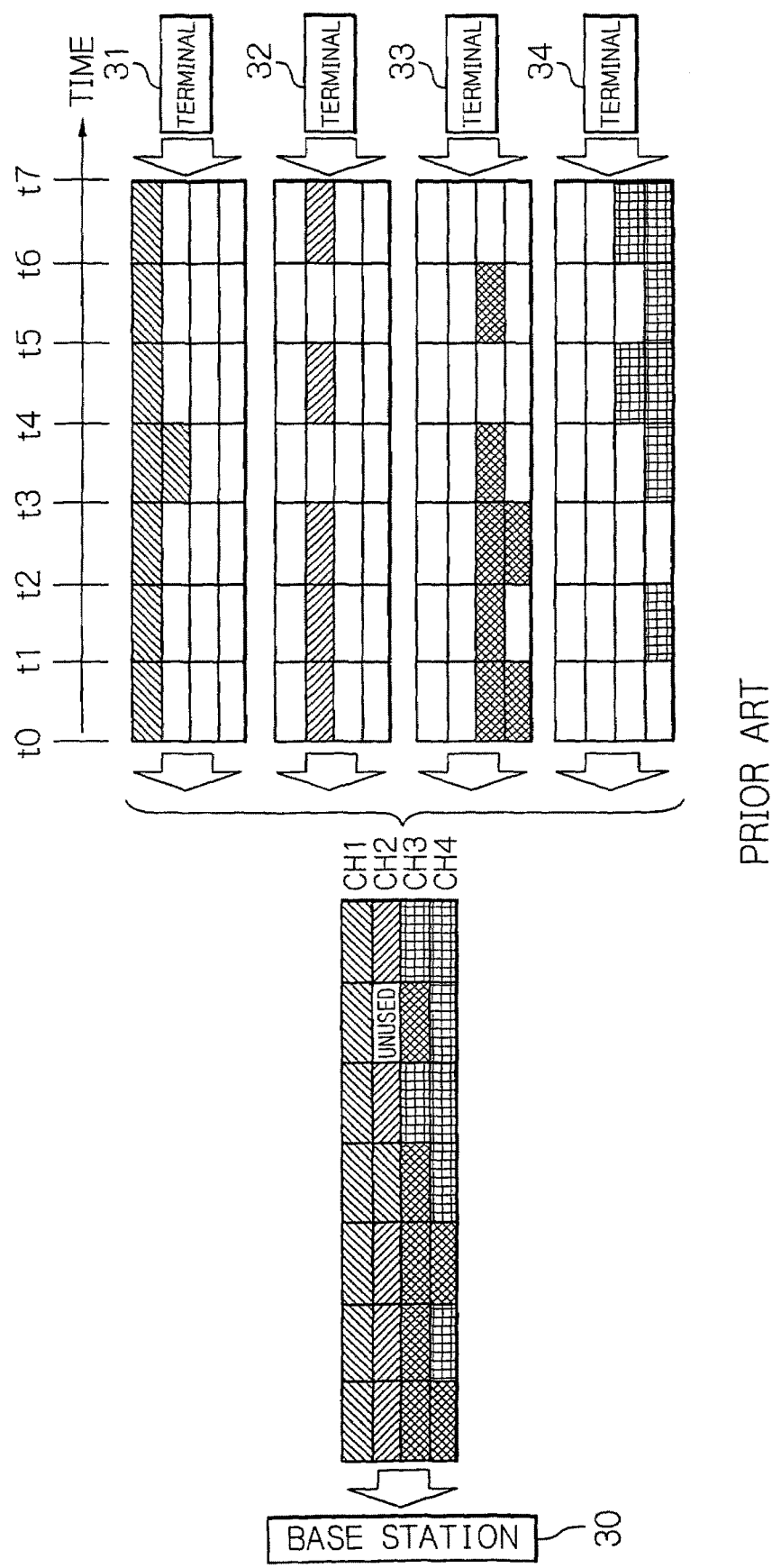
FIG. 3 is a schematic diagram useful for understanding a CDMA radio access system as another example of the prior art shown in FIG. 1.
Figure 4:
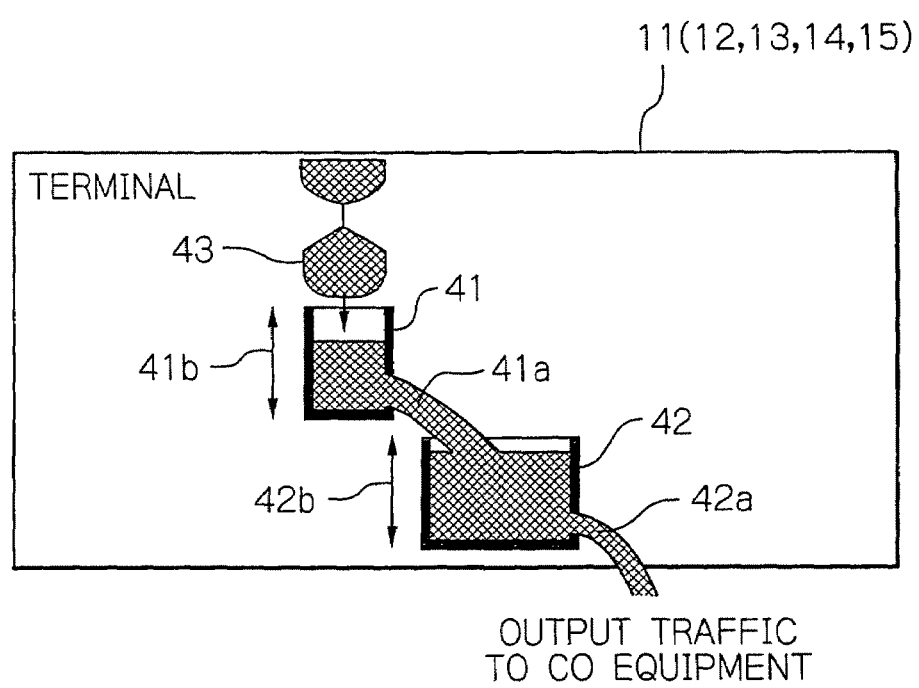
FIG. 4 conceptually shows how the UPC works in the leaky bucket system.
Figure 5:
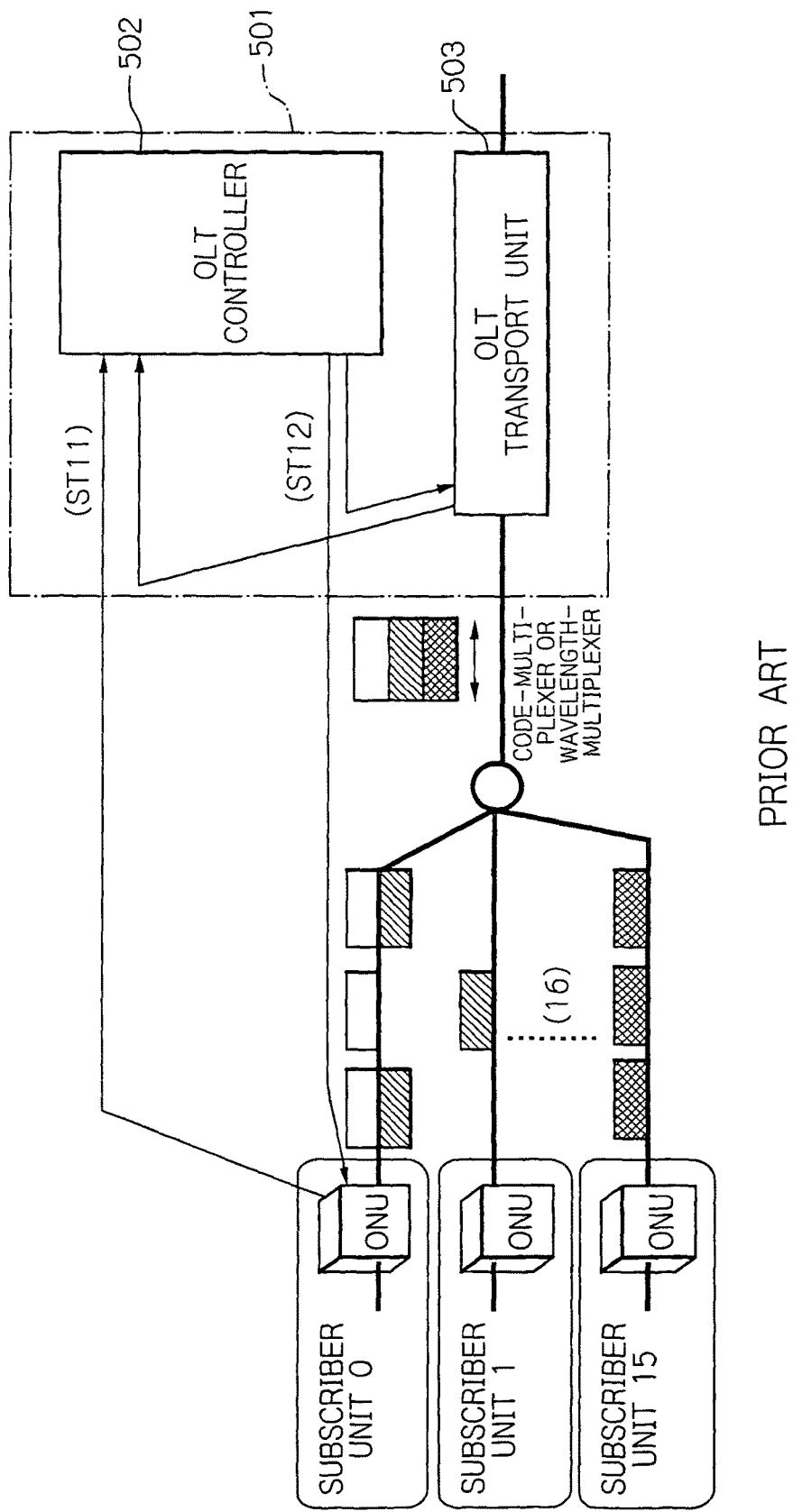
FIG. 5 is a schematic diagram useful for understanding a dynamic allocation of a bandwidth in a next-generation PON system.
Figure 6:
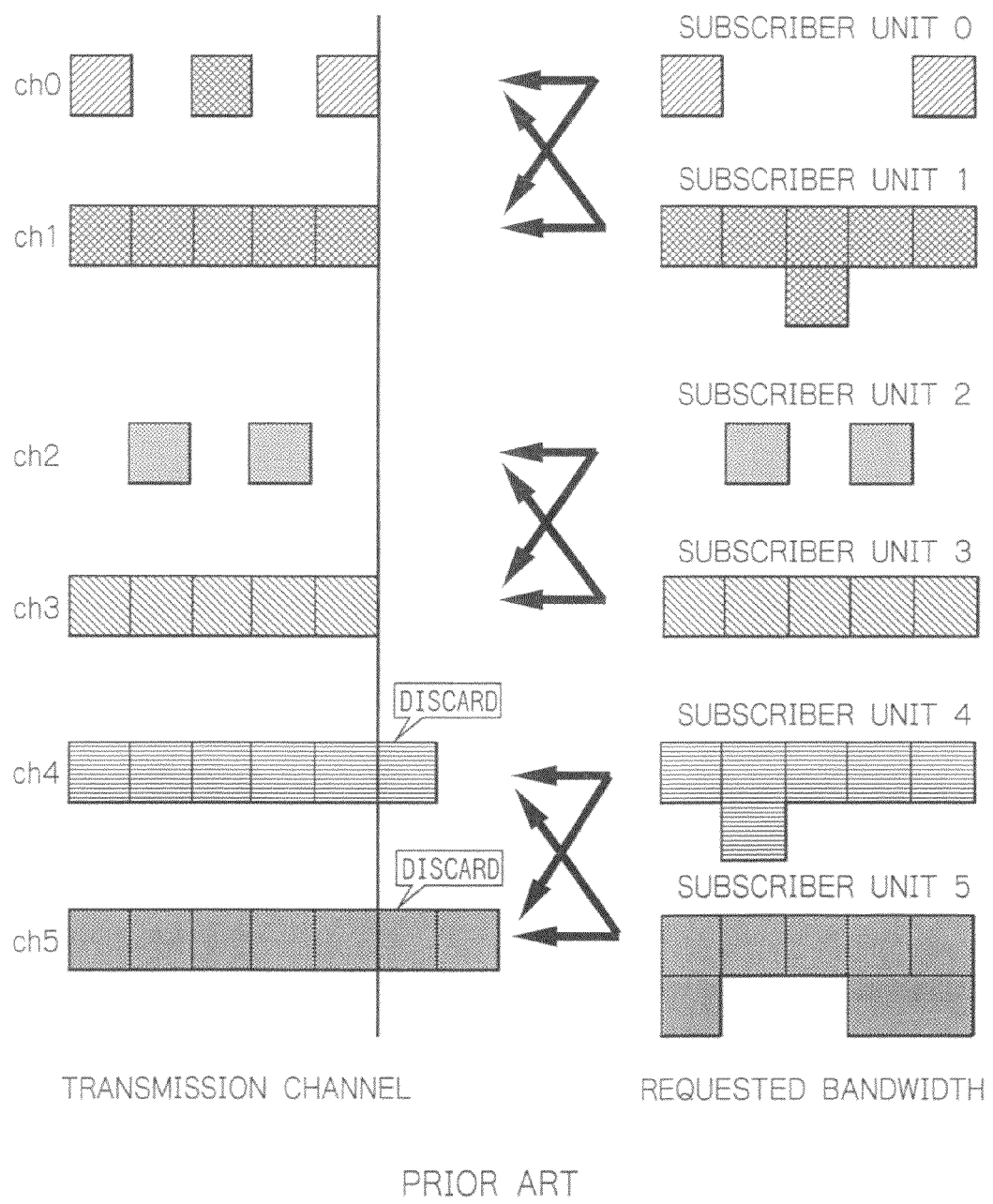
FIG. 6 schematically shows the transmission channels and the requested bandwidths in a communication system sharing two channels by two subscriber units.

Now, a second reference example of the present invention will be described below. Since the general configuration of a dynamic bandwidth allocating device in accordance with the second reference example may be similar to that in accordance with the first reference example, the second reference example will be described with reference to FIG. 5.

Figure 48:
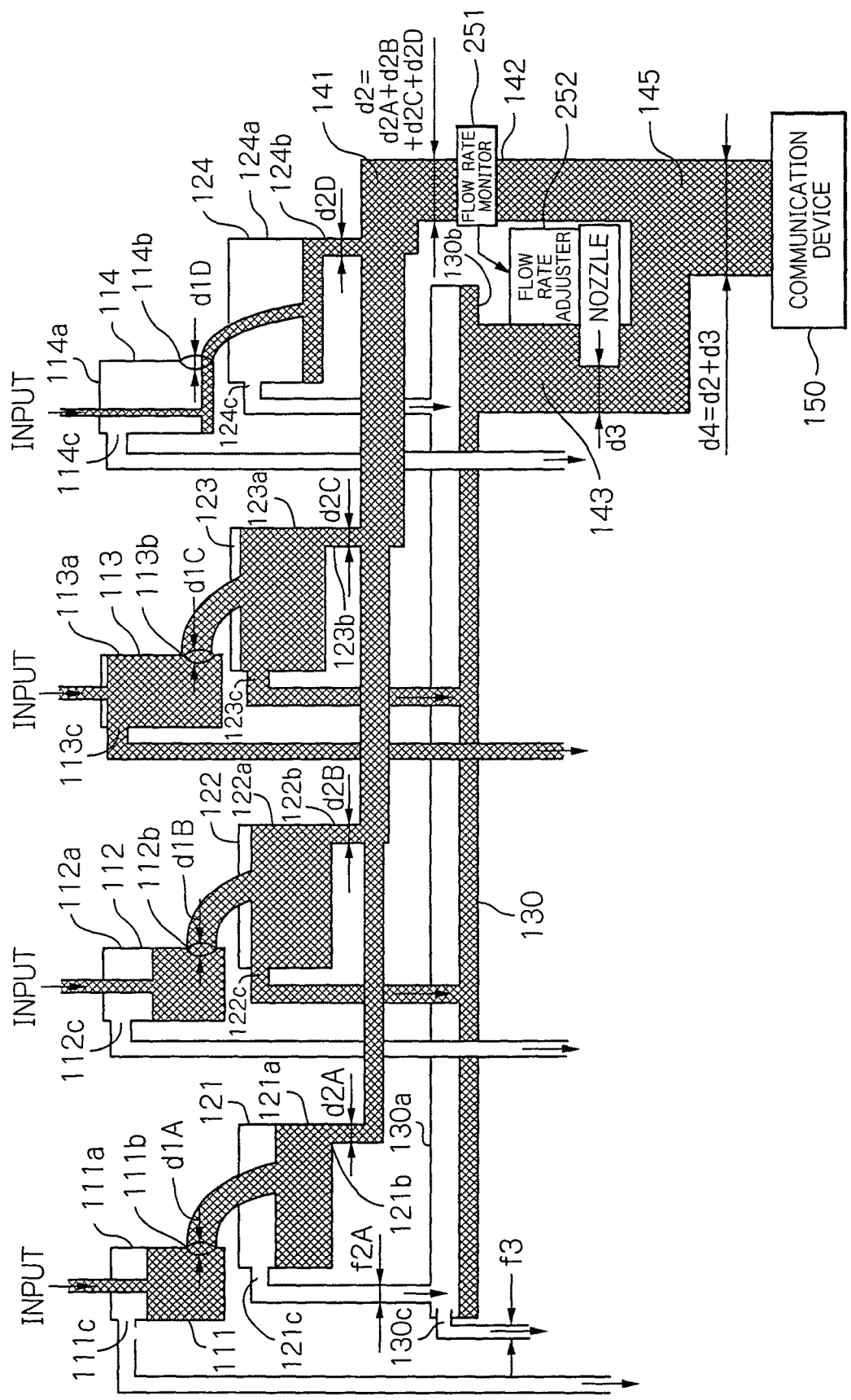
FIG. 48 conceptually shows, like FIG. 45, how a dynamic bandwidth allocating device operates in accordance with a second reference example by using the leaky bucket algorithm.

FIG. 48 is a schematic diagram useful for understanding the operation of the dynamic bandwidth allocating device in accordance with the second reference example by using the leaky bucket algorithm. The second reference example is configured so that the first merging section 141 is connected to the second merging section 144 by the first pipe line 142 provided with a flow rate monitor 251 while the third "bucket with a hole" 130 is connected to the second merging section 144 by the second pipe line 143 provided with a flow rate adjuster 252. In this configuration, information on the flow rate measured by the flow rate monitor 251 or control data based on the information about the flow rate is sent to the flow rate adjuster 252.

Figure 49:
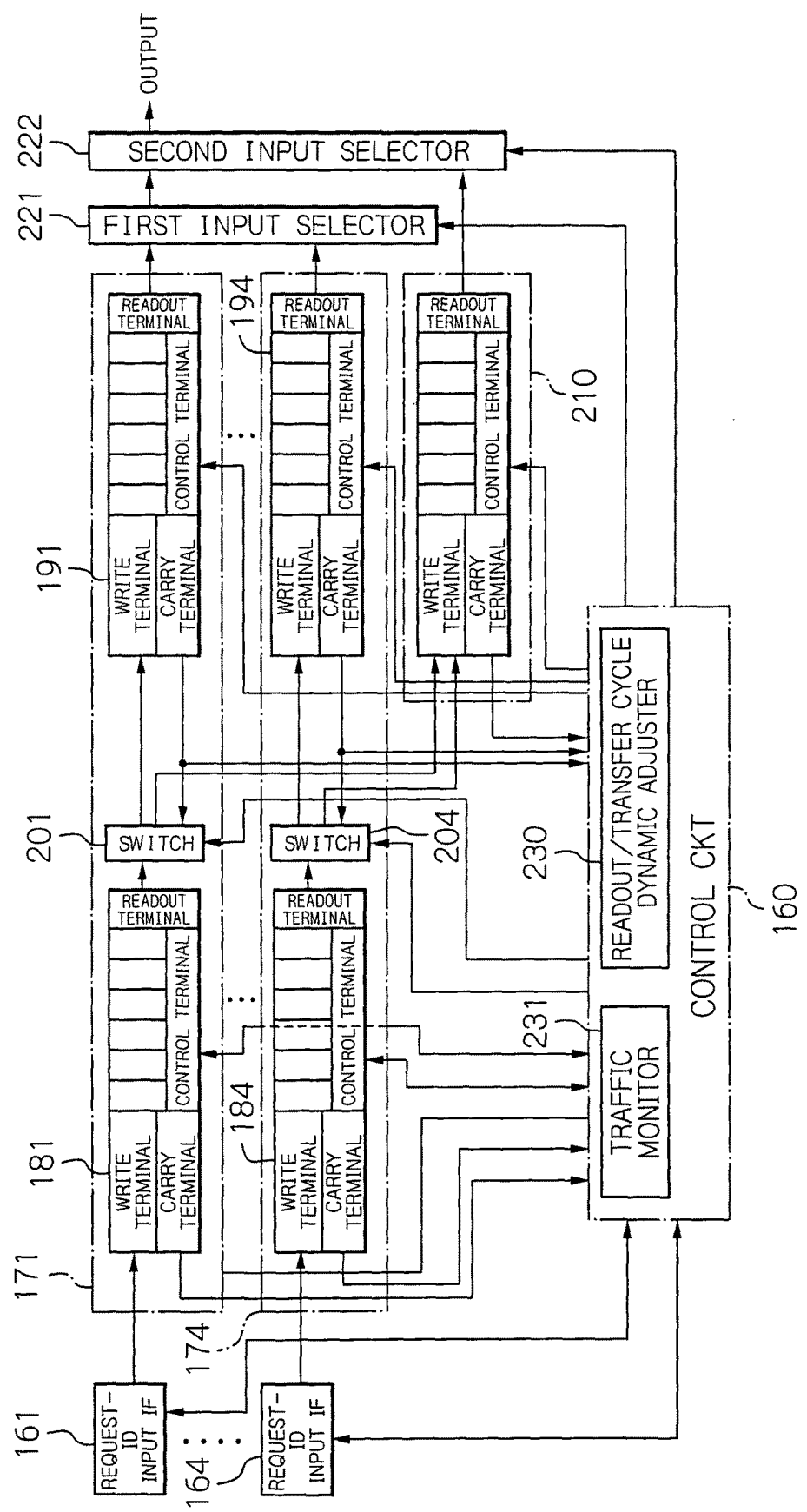
FIG. 49 is a schematic block diagram showing the configuration of a timing signal generator in the dynamic bandwidth allocating device in accordance with the second reference example.

The configuration model in FIG. 48 can be implemented as a central office device by an electronic circuit as shown in FIG. 49. In the configuration of FIG. 49, tokens or traffic information inputted to the request-ID input interfaces 161 to 164 are sent to a traffic monitor 231 in the control circuit 160 to monitor the traffic, thereby working as the flow rate monitor 251 shown in FIG. 48. A readout/transfer cycle dynamic adjuster 230 controls the readout and transfer timing for information from the second FIFO memories 191 to 194 and the third FIFO memory 210 by the input selectors 221 and 222, thereby functioning as adjusting the nozzle diameter by the flow rate adjuster 252.

In the second reference example, the flow rate monitor 251 measures the flow rate of the information flowing over the first pipe line 142 guaranteeing the minimum guaranteed bandwidth, and sends information about the flow rate to the flow rate adjuster 252. Then, when information flowing on the first pipe line 142 is less than the set minimum guaranteed bandwidth, the difference is obtained as a residual bandwidth to open the nozzle of the flow rate adjuster 252 set on the second pipe line 143 by the difference. The nozzle diameter of the flow rate adjuster 252 is adjusted so that the sum of the flow rates of information in the first and second pipe lines 142 and 143 is always substantially equal to or less than an available-for-transmission bandwidth d4 of a communication device.

The operation shown in FIGS. 48 and 49 has been described as the operation of the controller 81 of the central office device 80. The transmission of a packet or traffic from the subscriber units 61 to 64 to the central office device may operates in a similar fashion on the basis of control data CB from the controller 81.

As described above, by using the dynamic bandwidth allocating method and device in accordance with the second reference example, in addition to the advantages of the first reference example, when the transmission bandwidth of the subscriber unit is equal to or less than the minimum guaranteed bandwidth, a free bandwidth caused by the difference from the minimum guaranteed bandwidth can also be used to accomplish more efficient transfer of packets.

Usually, from the measurement of the flow rate of information by the flow rate monitor 251 to a change in level of opening of the nozzle of the flow rate adjuster 252, at least short delay time is caused. After the flow rate monitor 251 confirms an increase in flow rate, even if the nozzle of the flow rate adjuster 252 is rapidly throttled, the transmission of tokens of the minimum guaranteed bandwidth could be delayed.

In order to prevent this, there is a manner, for example, that the flow rate adjuster 252 adjusts the opening to a slightly smaller size such that delay caused prevents the information preventing the flow on the first pipe line 142 from being conducted over the second pipe line 143.

In an alternative configuration, until information flows out which accumulates in the second "bucket with a hole" due to a delay in throttling the nozzle of the flow rate adjuster 252, the nozzle of the flow rate adjuster is further throttled so as to be less than the value corresponding to {d4−(flow rate in the first pipe line 142)}, and then the thickness d3 of the pipe line throttled by the nozzle is set again so as to be equal to the value corresponding to {d4−(flow rate in the first pipe line 142)}.

Figure 50:
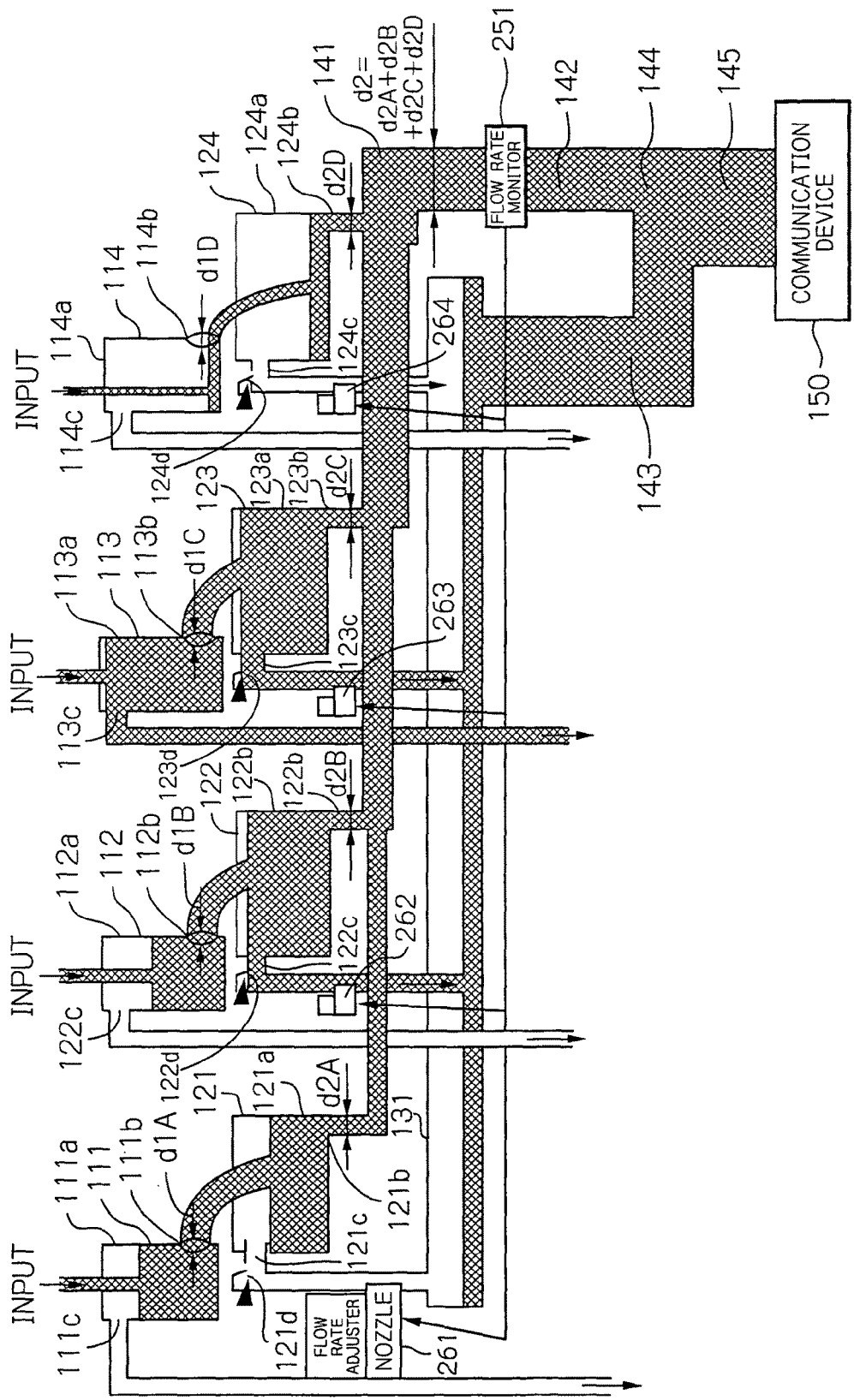
FIG. 50 conceptually shows, like FIG. 45, how a dynamic bandwidth allocating device operates in accordance with a variation of the second reference example by using the leaky bucket algorithm.

FIG. 50 is a schematic diagram useful for understanding a dynamic bandwidth allocating device in accordance with a variation of the second reference example by using the leaky bucket algorithm. As seen from FIG. 50, the dynamic bandwidth allocating device may be the same as FIG. 48 except for including additional holes 121d to 124d for overflow in the second information maintaining means 121 to 124, and flow rate adjusters 261 to 264 for changing the maximum passable amount of information according to a value measured by the flow rate monitor 251 between the second information maintaining means 121 to 124, respectively, and the third information maintaining means 131 instead of the flow rate adjuster 252. The system shown in FIG. 50 can also provide the advantages similar to those of the system shown in FIG. 48. In the system shown in FIG. 50, instead of sending traffic overflowing from the second "bucket with a hole" through the third "bucket with a hole" to the second merging section, the flow rate adjuster is provided in the middle of each pipe line to adjust the level of opening while overflowing traffic is allowed to be discarded. This can differentiate the priorities of using the residual bandwidths for respective users.

The second reference example may be the same as the first reference example except for the above description.

Now, a third reference example of the present invention will be described below. Since the general configuration of a dynamic bandwidth allocating device in accordance with the third reference example may be similar to that in accordance with the first reference example, the third reference example will also be described with reference to FIG. 5.

Figure 51:
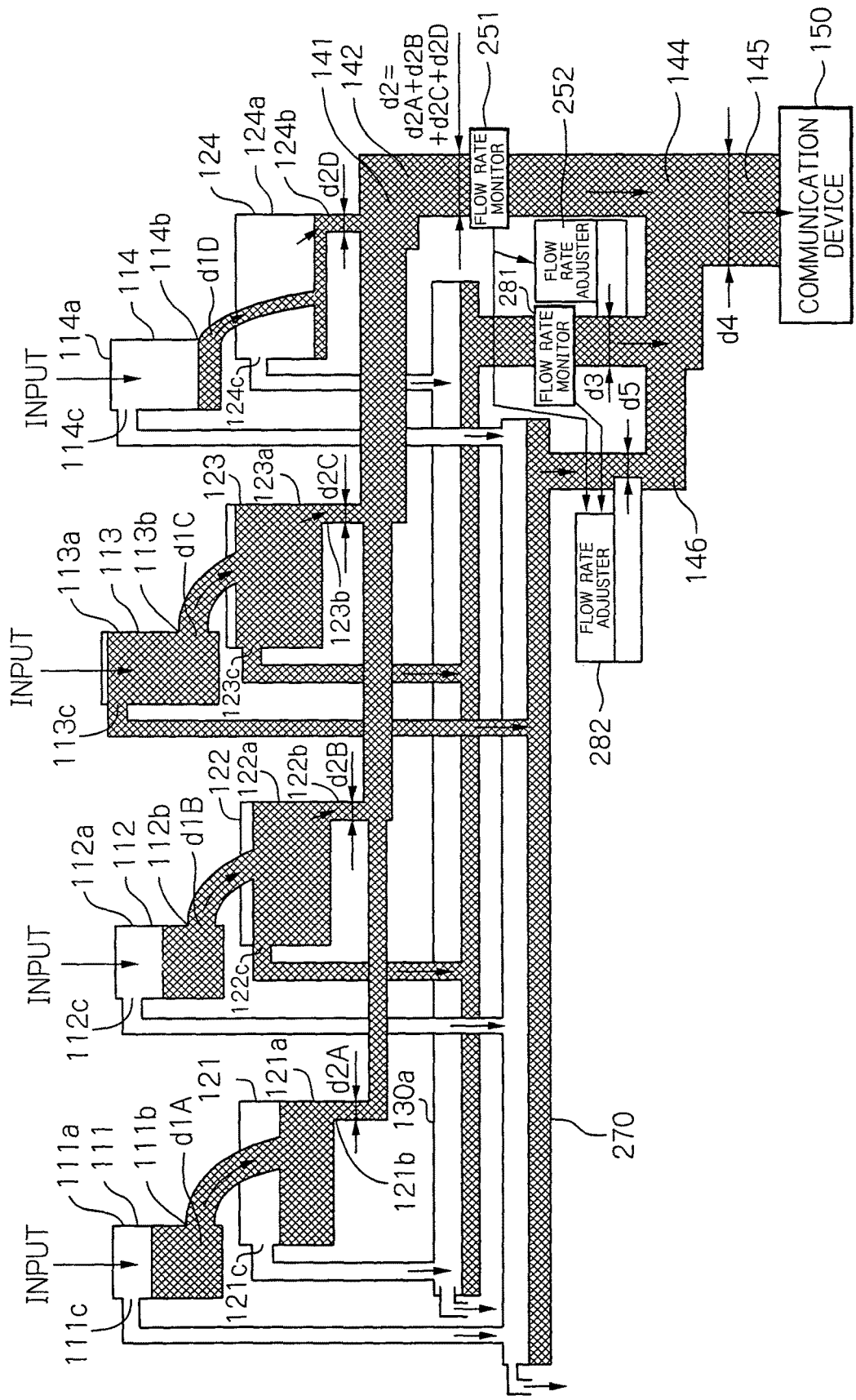
FIG. 51 also conceptually shows, like FIG. 45, how a dynamic bandwidth allocating device operates in accordance with a third reference example by using the leaky bucket algorithm.

FIG. 51 is a schematic diagram useful for understanding the operation of the dynamic bandwidth allocating device in accordance with the third reference example by using the leaky bucket algorithm. The third reference example is configured so that the first merging section 141 is connected to the second merging section 144 by the first pipe line 142 provided with a flow rate monitor 251 while the third "bucket with a hole" 130 is connected to the second merging section 144 by the second pipe line 143 provided with a flow rate adjuster 252. In this configuration, information about the flow rate measured by the flow rate monitor 251 or control data based on the information about the flow rate is sent to the flow rate adjuster 252. In addition, the third "bucket with a hole" 130 is connected to the second merging section 144 by the first pipe line 142 provided with a flow rate monitor 281 while a fourth "bucket with a hole" 280 is connected to the second merging section 144 by a pipe line provided with a flow rate adjuster 282. In this configuration, information about the flow rate measured by the flow rate monitor 281 or control data based on the information about the flow rate is sent to the flow rate adjuster 282.

In the third reference example, from "holes" for overflow provided at the top of the first "buckets with a hole" 111 to 114 and the third "bucket with a hole" 130, tokens are discarded to be led to a fourth "bucket with a hole" 270. A "hole" for output is provided in the bottom of the fourth "bucket with a hole" 270 to lead the output over a fourth pipe line 146 to the second merging section 144. In addition to the flow rate monitor 251 provided in the first pipe line 142, the second pipe line 143 is provided with the flow rate monitor 281 while in addition to the flow rate adjuster 252 in the second pipe line 143, the fourth pipe line 146 is provided with the flow rate adjuster 282.

Figure 52:
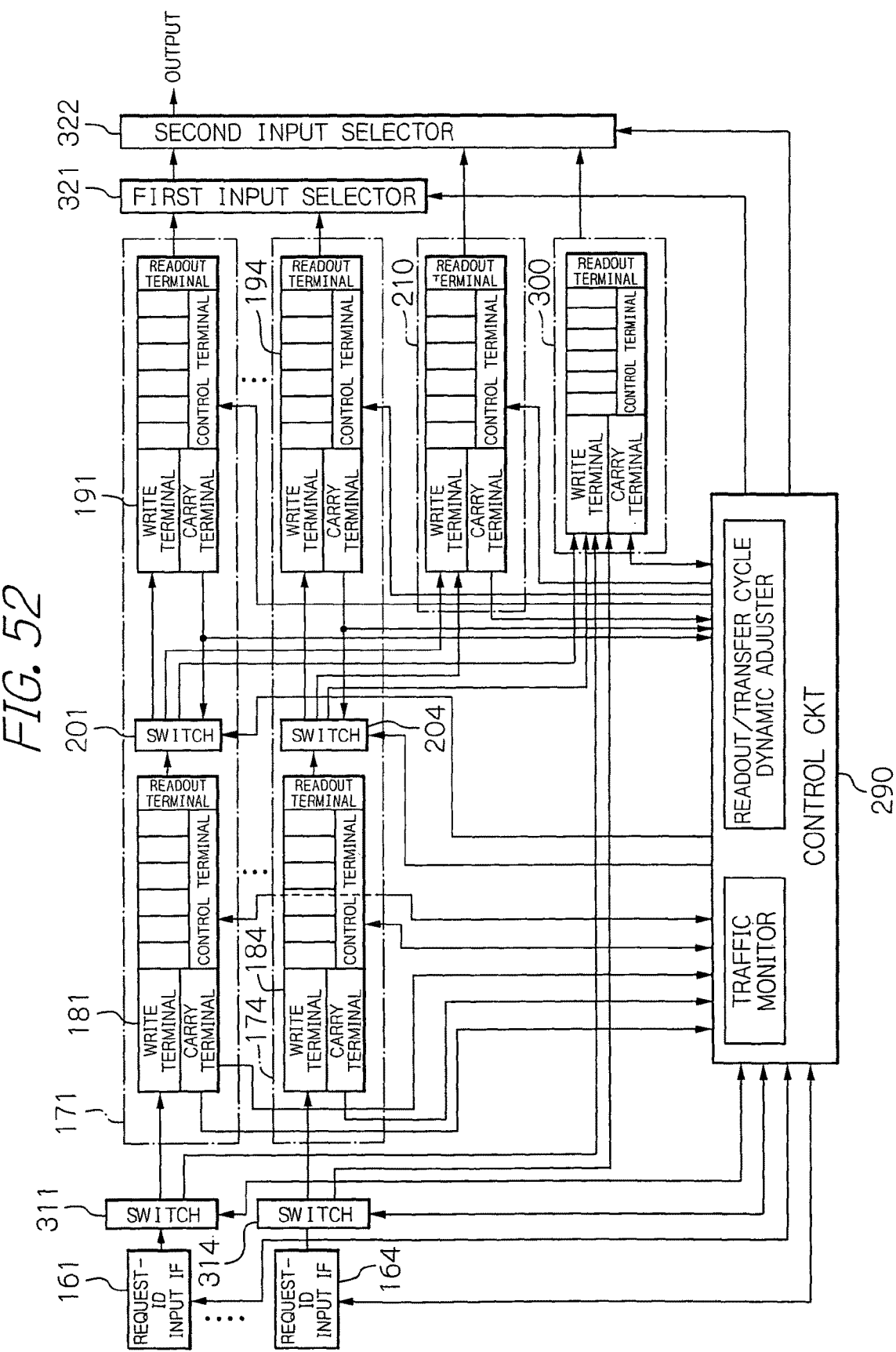
FIG. 52 is a schematic block diagram showing the configuration of a timing signal generator in the dynamic bandwidth allocating device in accordance with the third reference example.

In the case of implementing the above configuration model by an electronic circuit, for example, a central office configuration shown in FIG. 52 is applicable. Specifically, in addition to the configuration of the second reference example, a fourth FIFO memory corresponding to the fourth "bucket with a hole" 270 is installed, and in order to transfer information to the fourth FIFO memory in the case of overflow from the first and third FIFO memories, a switch is added in the preceding stage of the first FIFO memory while the number of the outputs of the switch in the subsequent stage of the first FIFO memory is increased to be led to the fourth FIFO memory also.

The operation of the model of the above third reference example may almost be the same as the second reference example, but the following operation is added. The nozzle of the flow rate adjuster 282 is usually closed. Therefore, tokens inflowing from the first "buckets with a hole" 111 to 114 and the third "bucket with a hole" 130 are usually discarded. However, when the total of tokens flowing on the first and second pipe lines 142 and 144 is less than the maximum available-for-transmission bandwidth d4, the level of opening of the nozzle of the flow rate adjuster 282 is increased in the range of a traffic flowing into the second merging section 144 being equal to or less than the value d4. In the operation of this model, similarly to the second reference example, on the basis of traffic information measured in the request-ID input interface section and tallied by the traffic measurement section, the readout/transfer cycle dynamic adjuster controls readout and transfer timing from the memory while directing a request-ID almost overflowing from the first and third FIFO memories to be transferred to the fourth FIFO memory so as to save the request-ID.

As described above, by using the dynamic bandwidth allocating method and device in accordance with the third reference example, in addition to the advantages of the first and second reference examples, information discarded in conventional arts does not have to be discarded, but can be used. The similar advantages could be provided by increasing the size of the first "bucket with a hole". However, the sizes of all the first "buckets with a hole", or queues, would need to be increased to thereby decrease the efficiency in the use of memories, which would be problematic. The third reference example permits the similar saving by implementating smaller queues.

The third reference example may be the same as the first and second reference examples except for the points described above.

Figure 53:
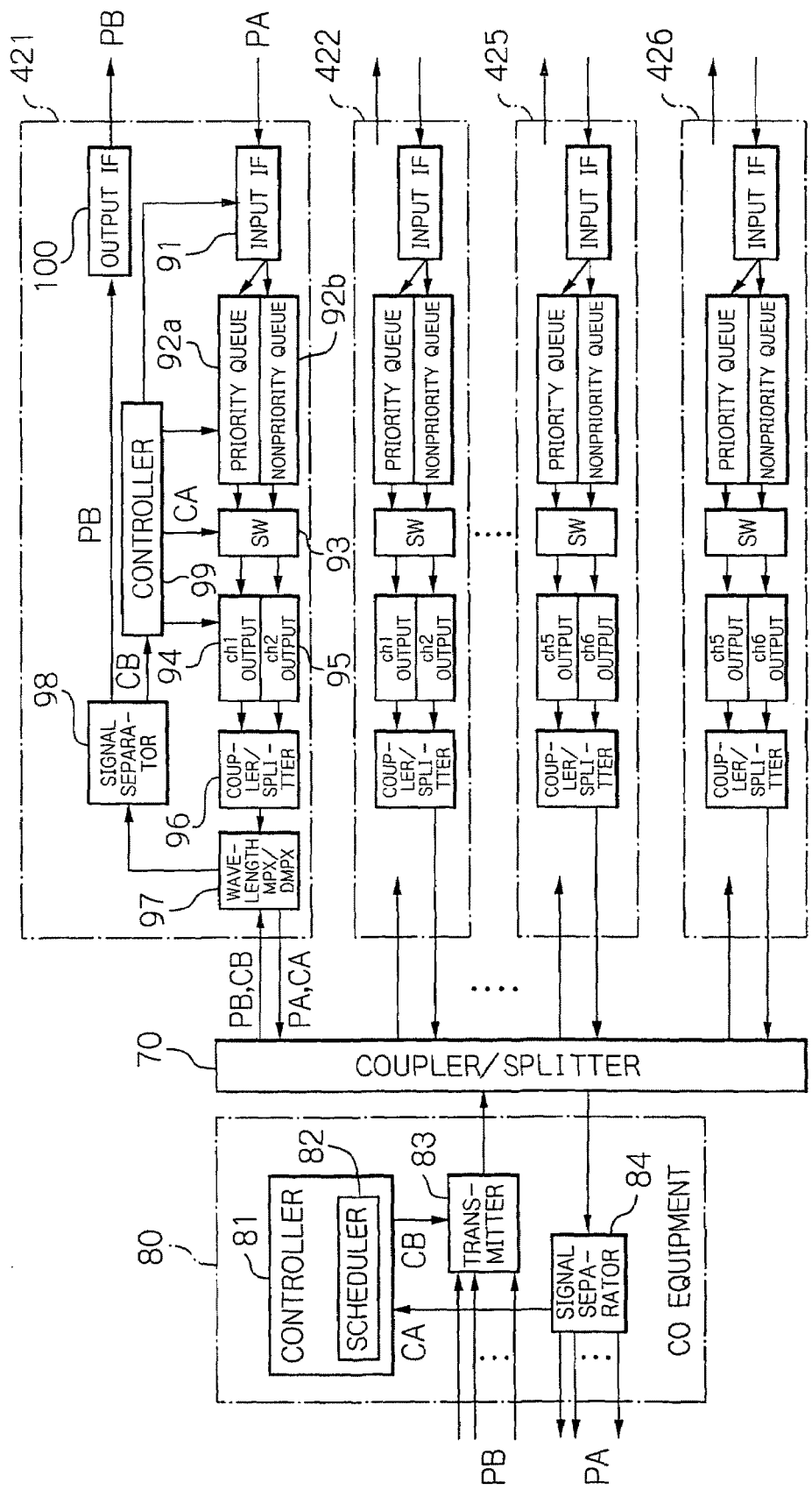
FIG. 53 is a schematic block diagram showing the configuration of a dynamic bandwidth allocating device for a fourth comparative reference example.
Figure 54:
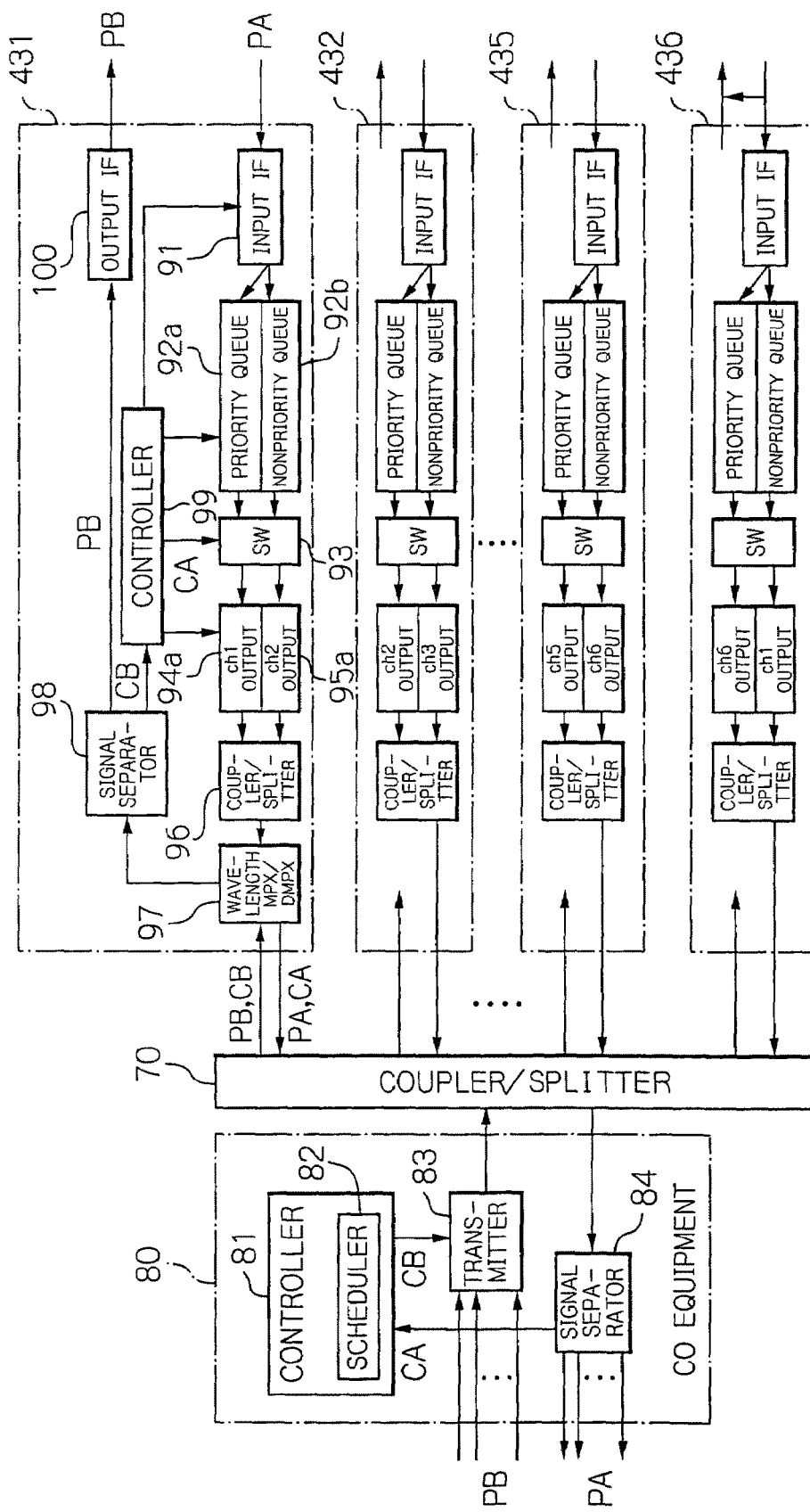
FIG. 54 is a schematic block diagram showing the configuration of a dynamic bandwidth allocating device in accordance with the fourth reference example.

Now, a fourth reference example of the present invention will be described below. FIG. 53 is a schematic block diagram showing the configuration of a dynamic bandwidth allocating device comparative with the fourth reference example. FIG. 54 is a schematic block diagram showing the configuration of a dynamic bandwidth allocating device in accordance with the fourth reference example.

FIGS. 53 and 54 illustrate systems for transmitting information PA, as traffic or in the form of packet, from a plurality of subscriber terminals, not shown, to a central office device 80 through respective subscriber units, i.e. network devices, 421 to 426 or 431 to 436 and a coupler/splitter 70.

Each of the subscriber units 421 to 426 of the comparative example shown in FIG. 53 has an input interface 91, a priority queue 92*a*, a nonpriority queue 92*b*, a switch (SW) 93, a signal output section 94 of a channel CH1, a signal output section 95 of the channel CH2, a coupler/splitter 96, a wavelength multiplexer/demultiplexer 97, a signal separator 98, a controller 99 and an output interface 100. Each of the subscriber units 431 to 436 of the fourth reference example shown in FIG. 55 has an input interface 91, a priority queue 92*a*, a nonpriority queue 92*b*, a switch (SW) 93, a signal output section 94*a* of a channel CH1, a signal output section 95*b* of the channel CH2, a coupler/splitter 96, a wavelength multiplexer/demultiplexer 97, a signal separator 98, a controller 99 and an output interface 100. However, the priority queue 92*a* and the nonpriority queue 92*b* may be implemented by a single queue 92 as shown in FIG. 44.

In the plurality of subscriber units (six units in FIG. 53) of the comparative example as shown in FIG. 53, the first and second subscriber units 421 and 422 have the queue 92*a* or 92*b* for holding a packet, and the first channel (signal output section of the channel CH1) and the second channel (signal output section of the channel CH2) as channels for transmission of the packet outputted from the queue 92*a* or 92*b*; the third and fourth subscriber units 423 and 424 have the queue 92*a* or 92*b* for maintaining a packet, and a third channel (signal output section of the channel CH3) and a fourth channel (signal output section of the channel CH4) as channels for transmission of the packet outputted from the queue 92*a* or 92*b*; and the fifth and sixth subscriber units 425 and 426 have the queue 92*a* or 92*b* for maintaining a packet, and a fifth channel (signal output section of the channel CH5) and a sixth channel (signal output section of the channel CH6) as channels for transmission of the packet outputted from the queue 92*a* or 92*b*.

In the comparative example of FIG. 53, a signal to be sent from the subscriber unit to the central office is first inputted from the input interface (IF) 91 to the device. Next, the input interface 91 determines whether or not the inputted packet should be prioritized, and sends the prioritized packet to the priority queue 92*a* and the non-prioritized packet to the nonpriority queue 92*b*.

A packet inputted to the queue 92*a* or the nonpriority queue 92*b* is read out at output timing in order, and outputted through the switch (SW) 93 from the signal output section 94 of the channel CH1 or the signal output section 95 of the channel CH2. The important point is that the x-th and (x+1)-th subscriber units share the x-th and (x+1)-th channels with each other, where x is an odd number. For example, at a timing of transmission as the minimum guaranteed bandwidth, the first and second subscriber units output a packet one by one from the signal output sections 94 and 95 of the channels CH1 and CH2, respectively. However, at a timing other than transmission as the minimum guaranteed bandwidth, when a plurality of packets have to be sent to the first subscriber unit and no packets have to be sent to the second subscriber unit; the first subscriber unit reads out two packets from either the priority queue 92*a* or the nonpriority queue 92*b* or from the both queues, and transmits two packets through the coupler/splitter 96 and the wavelength multiplexer/demultiplexer 97 from both the signal output section 94 of the channel CH1 and the signal output section 95 of the channel CH2 at the same time, and the second subscriber unit does not transmit any packets. This prevents a waste of a bandwidth caused by no transmission of the second subscriber unit. In addition, a sent packet may also be first read out from a packet in the priority queue 92*a*, and then be read out from the nonpriority queue 92*b* in the case of no packets staying in the priority queue 92*a*, which is a preferred control.

By contrast, in the fourth reference example, as shown in FIG. 54, where k is a natural number not exceeding N, where N is an integer more than 2, the k-th subscriber unit of the plurality of subscriber units (six devices in FIG. 54, but at least three devices are sufficient) has the queue 92*a* or 92*b* for holding a packet, and a signal output section 94*a* of a k-th channel and a signal output section 95*a* of a (k+1)-th channel as channels for transmission of the packet outputted from the queue 92*a* or 92*b*. The k-th subscriber unit in the first to (N−1)-th devices has means (switch 93) for selecting the k-th or (k+1)-th channel as a channel for transmission of a packet based on control data. The N-th subscriber unit has means for selecting the N-th or first channel as a channel for transmission of a packet based on the control data. FIG. 54 illustrates the case of N=6, but N may take other values, of course. As described above, the configuration of the fourth reference example is similar to that of the comparative example, but channels available for transmission by the subscriber x are set to the signal output sections of the channels CHx and CH(x+1). However, the subscriber N (N=6) transmits a packet through the signal output sections of the channel CH(N) and CH1. In this way, channels available for transmission are allocated by shifting one by one in a cyclic manner.

In FIG. 54, for example, the packet PA outputted from the subscriber terminal is inputted to the switch 93 through the queue 92*a* or 92*b* and is inputted to either the signal output section 94*a* of the channel CH1 or the signal output section 95*a* of the channel CH2 by the switch 93. Then, a signal of the selected channel is sent to the coupler/splitter 70 through the coupler/splitter 96 and the wavelength multiplexer/demultiplexer 97. The coupler/splitter 70 also receives control data CA generated in the controller 99. Through the coupler/splitter 70, the wavelength multiplexer/demultiplexer 97 receives a packet PB and control data CB, which are separated by the signal separator 98 to send the packet PB to the subscriber terminal 51 through the output interface 100. The control data CB outputted from the signal separator 98 is inputted to the controller 99. The controller 99 generates control data based on the control data CB and sends the generated data to the signal output section 94*a* of the channel CH1, the signal output section 95*a* of the channel CH2, the switch 93, the queues 92*a* and 92*b*, and the input interface 91.

The central office device 80 has the controller 81 including a scheduler 82, a transmitter 83 and a signal separator 84. A signal inputted to the signal separator 84 through the coupler/splitter 70 is separated into the packet PA and the control data CA. Then, the packet PA is outputted, and the control data CA is sent to the controller 81. The transmitter 83 receives the packet PB and the control data CB from the controller 81. Then, the packet PB and the control data CB are inputted to the wavelength multiplexer/demultiplexer 97 through the coupler/splitter 70. However, from FIG. 54, part of the inside configuration following the subscriber unit 432 is omitted.

Now, the operation of the fourth reference example will be described with reference to FIG. 54. The controller 81 of the central office device 80 sends an inquiry signal for a requested bandwidth toward the subscriber unit. This signal is encoded to a code of a channel allocated to each subscriber unit by the transmitter 83, and is time-multiplexed with similarly-encoded user data to be sent to the subscriber unit. These down-going signals toward the subscriber unit are distributed to the respective subscriber units by the coupler/splitter 70. This down-going optical signal is sent to the signal separator 98 by the wavelength multiplexer/demultiplexer 97 provided so as not to send the down-going optical signal to the coupler/splitter-side sending an up-going signal. The signal separator 98 separates and selects a signal including a code toward itself in the sent signals from signals toward other subscriber units. Next, the control data CB and the user data PB are separated from each other to output the user data PB from the output interface 100. The control data CB is sent to the controller 99, which inputs a control packet representing the state of a queue to the priority queue 92a. The control packets are sent together with the user data to the central office device 80, and are separated for the respective subscriber units in the signal separator 84. Then, the user packet PA is sent to the upstream-side communication device, and the control packet CA is sent to the controller 81. The controller 81 calculates at which timing and from which channel each subscriber unit has to transmit an up-going packet by the scheduler 82 on the basis of information of the control packet CA sent from each subscriber unit. The result of the calculation is stored in the control packet CB and is sent to the subscriber unit. The subscriber unit operates the switch 93, and the queues 92a and 92b on the basis of information about a channel and a timing available for transmission, and transmits an up-going signal through the determined transmission channel and at the determined timing.

Figure 55:
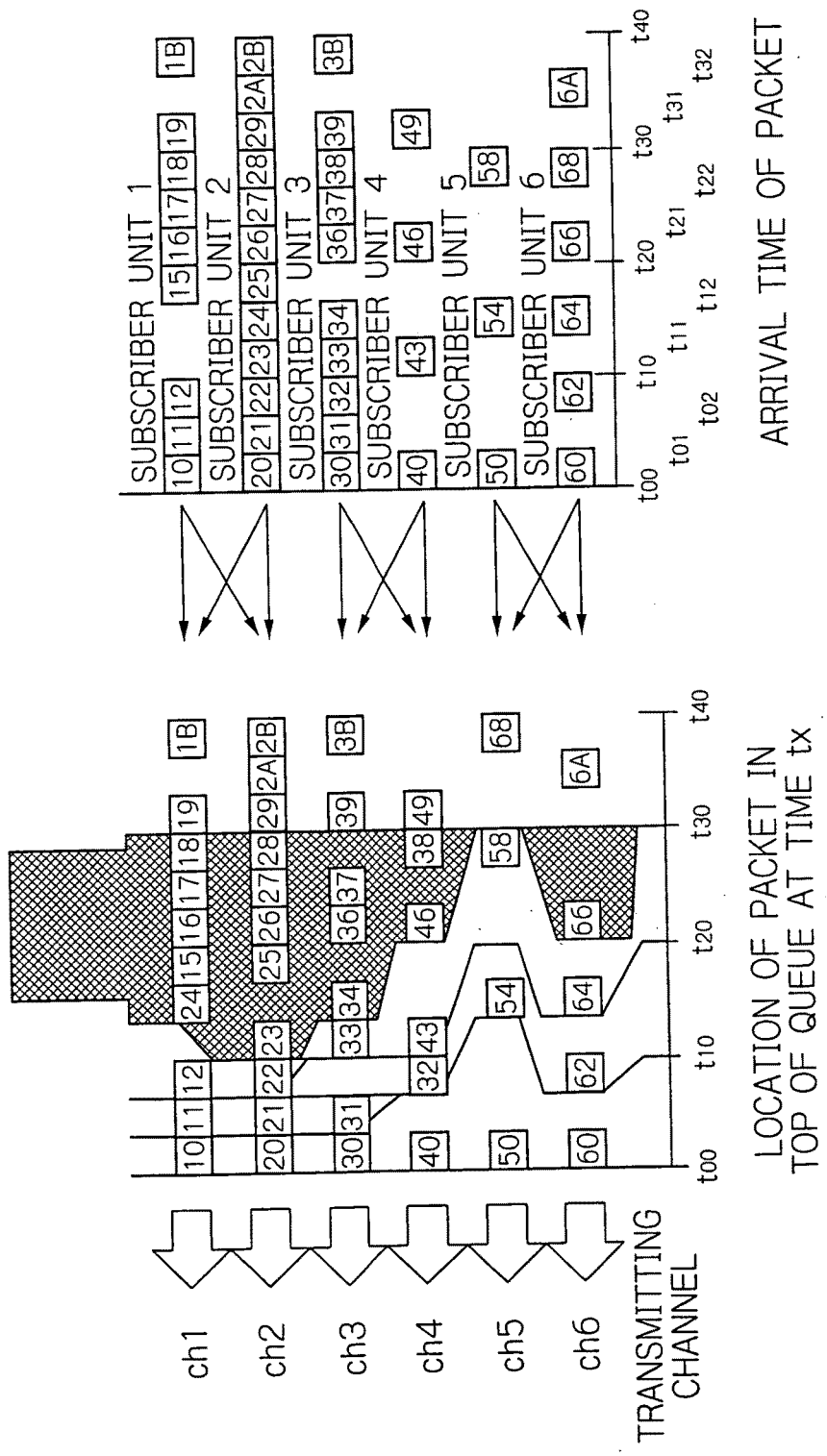
FIG. 55 is a schematic diagram useful for understanding the operation of the dynamic bandwidth allocating device in the comparative example shown in FIG. 53.
Figure 56:
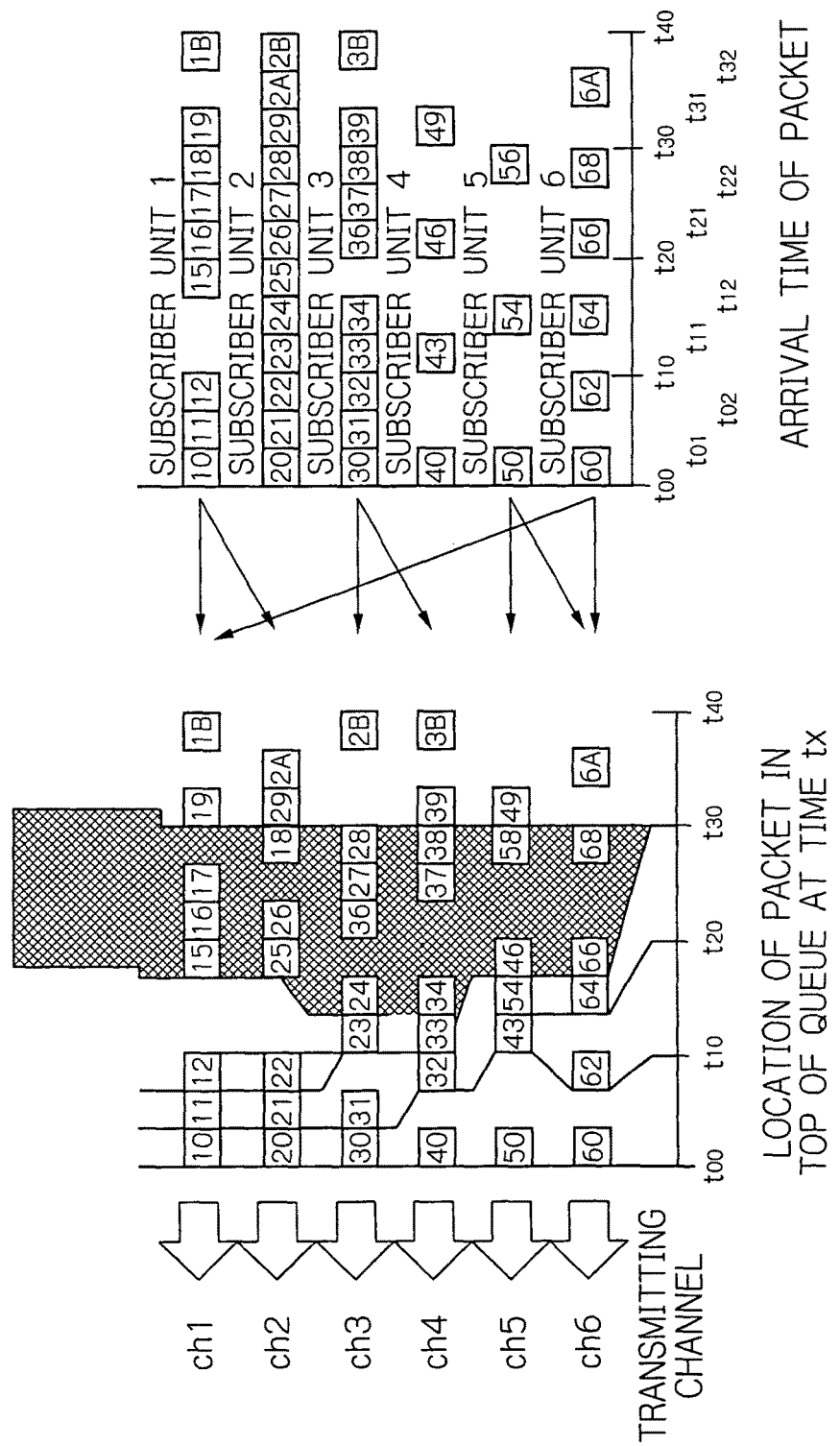
FIG. 56 is a schematic diagram useful for understanding the operation of the dynamic bandwidth allocating device in accordance with the fourth reference example.

Now, the transmission channel and timing for the up-going packet, and the state of inside of the queues at that time in the fourth reference example will be described while compared with the comparative example with reference to FIGS. 55 and 56. It is assumed that all the packets shown in FIGS. 55 and 56 are nonpriority packets, and in this time zone, no priority packets exist. In addition, it is assumed that this subscriber unit can accept an input up to a threefold rate of the transmission channel, and a packet not transmitted waits in the queue 92b to be transmitted. In the case of the present invention, packets are assumed to arrive at subscriber-side interfaces 91 of the respective subscriber units as shown in the right part of FIG. 55. For example, in the first subscriber unit, the up-going signal arrives at timings t00, t01, t02, t12, t20, t21, t22, t30 and t32. The arriving packets are sent on the channels shown in the left part of FIG. 55. For example, the packets '20' to '23' as packets transmitted from the second subscriber unit are transmitted on the channel CH2, and the packets '24' and '25' are transmitted from the channels CH1 and CH2 at the same timing. When the packet 24 arrives at the second subscriber unit, since the second subscriber unit has more packets waiting for transmission than those of the first subscriber unit and no packets arrive at the first subscriber unit, the controller 81 stops transmission at t30 for the first subscriber unit, and instead directs the second subscriber unit to transmit packets over both the channels CH1 and CH2. The area of diagonal checkered pattern shown in the left half of FIGS. 55 and 56 indicates a range where packets accumulate in the queue at time t30. In addition, right half of FIGS. 55 and 56 illustrates packets having arrived at the ONU subscriber-side input interface of an appropriate subscriber unit. According to this operation, a subscriber unit, when another subscriber unit sharing channels has a small amount of transmission, uses a shared channel more often to thereby prevent a packet from overflowing from a transmission queue of the subscriber unit.

The fourth reference example shown in FIG. 54 is also adapted to output packets with priority from a subscriber unit having more packets accumulated in its nonpriority queue 92b to thereby prevent a packet from overflowing from the queue. However, the fourth reference example is different from the comparative example of FIG. 53 in the state of sharing buffers. In the comparative example, two subscriber units are set in pair, and share two channels with each other. Therefore, when one subscriber unit has much traffic with the other also having much traffic, packets tend to rapidly be accumulated in the queues and hence to overflow. However, in the fourth reference example, rather than two fixed subscriber units sharing the same two channels with each other, the subscriber unit having a subscriber number k shares one channel with the subscriber unit having a subscriber number (k−1) and the other channel with the subscriber unit having a subscriber number (k+1). Therefore, for example, when the channels of the first, second, third and fourth subscriber units are packed and the channels of the fifth and sixth subscriber units are free, the traffic of the first to fourth packed subscriber units can be shifted little by little to be allocated to the fifth and sixth subscriber units. For example, in the channels CH2 and CH3, the packets '23' and '33' are shifted by one channel to be transmitted. In the channel CH4 suffering from this repercussion, the packet '43' is shifted to free the channel CH5 to be thereby controlled so as to make it easy to accept an input from the channel CH3. According to this control, for example, at a time slot t30, compared with the comparative example in which two subscriber units accumulate five packets as the maximum, only four packets at most are accumulated in a queue in the present invention. At the timing t40, seven packets as the maximum exist in the comparative example, and five packets exist in the present invention. As described above, the buffer overflow from the queue is prevented.

As described above, the present invention is used to thereby accomplish the efficient use of the bandwidths and prevent the packet from overflowing from the queue. However, for this aim, the mechanism of the scheduler 82 for determining at which timing and from which channel each subscriber unit has to output a packet is important. Four solutions for efficiently using a bandwidth will be described below.

A first solution is to determine, when a packet to be transmitted is arrived, the maximum values of the queue length of queues in cases where a default channel and another channel of the k-th subscriber unit are utilized for transmitting the arriving packet and switches a channel for use in the transmission of the packet so as to make the maximum value of the queue length smaller. In FIG. 54, the default channel is set by an output on the side of a channel number being equal to a subscriber number. In addition, as another reference example, one subscriber unit may reserve three channels, in which one or two channels may be set as default, and the remaining two or one channel may be used for shifting.

A second solution is to determine the input times of the oldest packets left in the queues in cases where a default channel and another channel of the k-th subscriber unit are utilized for transmitting an arriving packet and switches a channel for use in the transmission of the packet so as to leave the newer input time. In other words, in order to send the packet arriving at the device, it is determined whether older packets can be more outputted over the default channel or the shifted channel. Thereby, the allocation allowing older packets to be more outputted prevents the older packets from being accumulated.

A third solution is to determine, when determining the maximum values of the queue lengths to be equal between the two cases above, the input times of the oldest packets left in the queues in cases where a default channel and another channel of the k-th subscriber unit are utilized for transmitting the arriving packet and switches a channel for use in the transmission of the packet so as to leave the newer input time. This solution may be formed by combining the first and second solutions. For example, allocation is first performed such as to minimize the maximum values of queue lengths, and then, in the case of both the values equal to each other, allocation is performed such that older packets can be more outputted. Conversely, allocation is performed such as to more output older packets, and then, in the case of bringing the same results by both shifting and not shifting, allocation is performed such as to minimize the maximum value of queue length. In addition, when the maximum values of the queue lengths are equal, the input times of the oldest packets left in the queues may be determined in cases where a default channel and another channel of the k-th subscriber unit are utilized for transmitting the arriving packet to switch a channel for use in the transmission of the packet so as to leave the newer input time.

A fourth solution is to compare the numbers of packets arriving at the respective queues of all the subscriber units and prioritizes transmission from the subscriber unit accumulating the most packets to allocate channels. This solution does not perform allocation immediately after a packet arrives, but checks the subsequent accumulation after a while, and then performs allocation so as to use bandwidths most efficiently. The fourth solution may be combined with the first to third solutions.

As described above, the dynamic bandwidth allocating method or device in accordance with the fourth reference example, even when having the smaller number of channels available for communication implemented in a subscriber terminal in a transmission system sharing communication channels, can efficiently use bandwidths and provide efficient transmission.

In addition, the central office device in the fourth reference example may not be restricted to that described in terms of the first to third reference examples.

Figure 57:
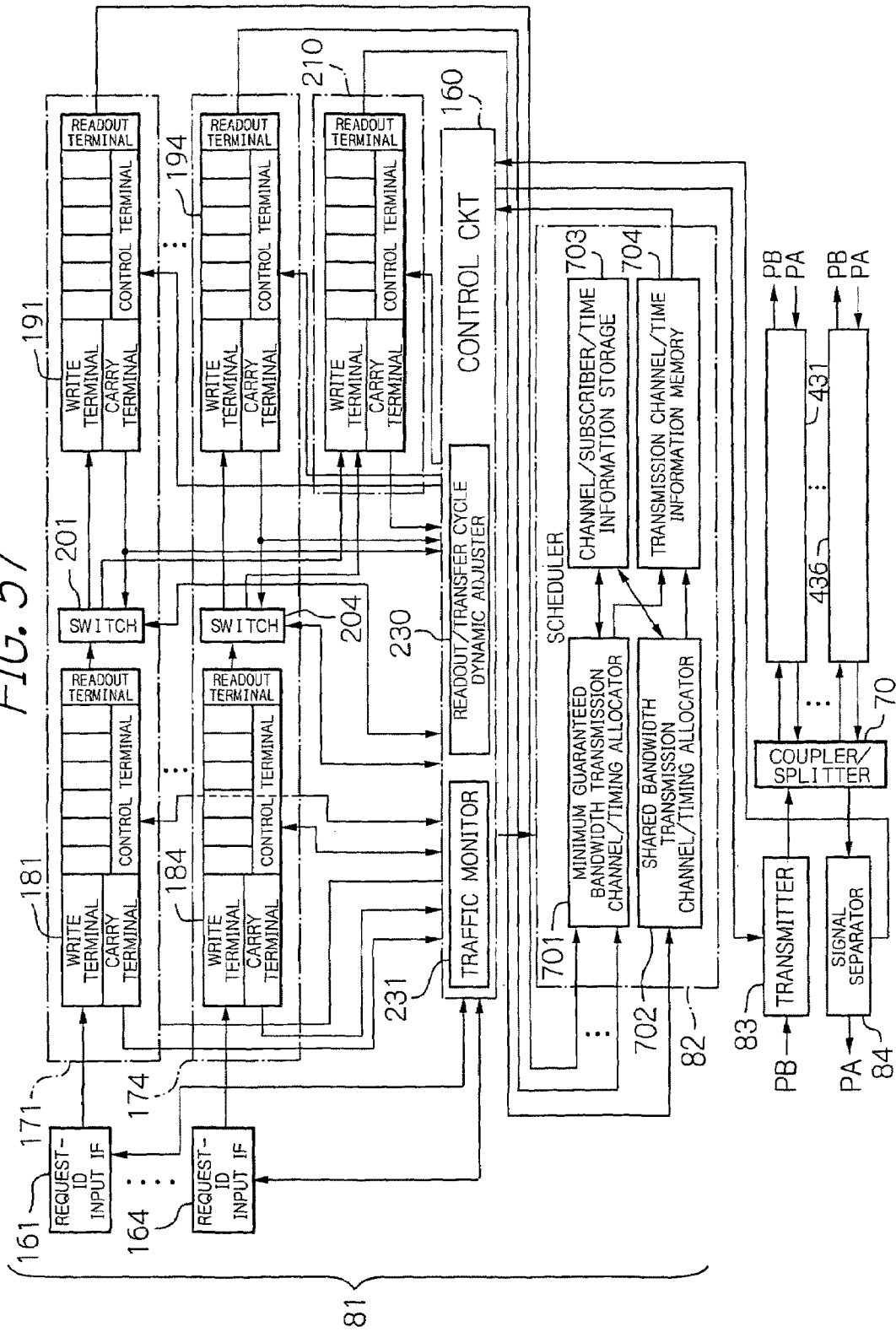
FIG. 57 is a schematic block diagram showing the configuration of a dynamic bandwidth allocating device in accordance with a fifth reference example.

Finally, FIG. 57 is a schematic block diagram showing the configuration of a dynamic bandwidth allocating device in accordance with a fifth reference example of the present invention. The dynamic bandwidth allocating device in accordance with the fifth reference example has a configuration formed by combining the central office device of the dynamic bandwidth allocating device in accordance with the second reference example with the subscriber units 431 to 436 of the dynamic bandwidth allocating device in accordance with the fourth reference example. Alternatively, the configuration may also be formed by combining the central office device of the dynamic bandwidth allocating device described in connection with the first or third reference example with the subscriber units 431 to 436 of the dynamic bandwidth allocating device in accordance with the fourth reference example.

The top of FIG. 57 shows a determiner for determining whether or not a transmission request can be acceptable and having a configuration similar to that of FIG. 49 showing the second reference example. As described above, a transmission request-ID is read out from the second FIFO memory 191 corresponding to the second "bucket with a hole", e.g. the reference numeral 121 in FIG. 48, and then is sent as information transmittable from the minimum guaranteed bandwidth to a transmission channel/timing allocator 701 for the minimum guaranteed bandwidth of the scheduler 82. In addition, another transmission request-ID is readout from the third FIFO memory, and then is sent as information transmittable from the shared bandwidth to a transmission channel/timing allocator 702 for a shared bandwidth of the scheduler 82. The scheduler 82 includes a channel/subscriber/time information storage 703 for storing information representing which subscriber unit and channel are allowed for transmission, and information such as a reference time of a transmission time slot. As a result of the calculation, information about the allocated transmission channel and time available for transmission by each subscriber unit are obtained, and then stored in an available-for-transmission channel/time information memory 704. Then, a control circuit 160 conveys, on the basis of this information, information about a channel available for the transmission and time to start and finish the transmission to each subscriber unit. The subscriber units 431 to 436 start, on the basis of this information, transmission on the designated channel and at the designated time. A channel available for transmission is allocated in a cyclic manner.

The operation of the dynamic bandwidth allocating device in accordance with the fifth reference example of the present invention may be similar to that of the second and fourth reference examples. FIG. 58 illustrates in time serial an example of signals transmitted from the subscriber units 431 to 436 to the central office device. The timing of the time slots allocated for the minimum guaranteed bandwidth of each channel is always periodically used for transmission by the fixedly allocated subscriber units 431 to 436. The time slots for shared bandwidths, i.e. slots for shared bandwidths, are shared by the plurality of subscriber units 431 to 436. In response to transmission requests by the subscriber units 431 to 436, the central office device 80 determines which subscriber is allowed for transmission to report the determination. The time slot for the minimum guaranteed bandwidth corresponds to a request-ID read out from the second "bucket with a hole" or the second FIFO memory, and has its size equal to that of the bandwidth. The time slot for the shared bandwidth corresponds to a request-ID read out from the third "bucket with a hole" or the third FIFO memory, and has its size equal to that of the bandwidth. However, as described in respect of the second reference example, in the case of only traffic less than the minimum guaranteed bandwidth flowing, if traffic has already been accumulated in the third "bucket with a hole", the minimum guaranteed bandwidth can be appropriated for transmission of this traffic.

In addition, in the case of allocation of the shared channels as described in the fourth reference example, in the transmission channel/timing allocator 702 for a shared bandwidth, in order not to cause congestion when a specific subscriber unit requests a broad bandwidth, the first to fourth solutions described in connection with the fourth reference example may be used to allocate transmission channels.

As described above, the dynamic bandwidth allocating device in accordance with the fifth reference example can be used to dynamically allocate bandwidths for use in communication designating the minimum guaranteed bandwidth and the maximum available-for-transmission bandwidth among the subscriber units 431 to 436 sharing the bandwidths. In addition to this, in a telecommunications system having a limitative number of channels available for transmission, even when some subscriber units have a larger amount of traffic, the channel allocation configuration preventing congestion can be accomplished.

The fifth reference example may be the same as the first to fourth reference examples except for the points described above.

The entire disclosure of Japanese patent application No. 2008-230511 filed on Sep. 9, 2008, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method for allocating bandwidth to a sequence of subscriber units, the sequence having a subscriber unit number 0 at a low end of the sequence and a subscriber unit number (N−1) at a high end of the sequence, N being an integer greater than two, said method comprising the steps of:
   (a) assigning N channels to the subscriber units so that each of the subscriber units has a respective one of the channels as a primary channel;
   (b) except for the subscriber unit number 0, assigning each subscriber unit in the sequence a secondary channel that serves as the primary channel for one of the subscriber units that is lower in the sequence;
   (c) assigning the primary channel of the subscriber unit (N−1) to the subscriber unit number 0 as a secondary channel;
   (d) permitting each subscriber unit to communicate data via its primary channel on a priority basis; and
   (e) permitting each subscriber unit to communicate data via its secondary channel if the secondary channel has bandwidth that is not reserved for the subscriber unit to which the secondary channel serves as a primary channel.

2. The method of claim 1, wherein step (b) is conducted by assigning each subscriber unit in the sequence a secondary channel that serves as the primary channel of the next-lower subscriber unit in the sequence, except for the subscriber unit number 0.

3. The method of claim 1, wherein at least some of the subscriber units have a guaranteed minimum bandwidth in their primary channels.

4. The method of claim 1, wherein the subscriber units emit requests for bandwidth for an upcoming time period, and allocation of bandwidth begins with one of the subscriber units that requests the smallest amount of bandwidth and proceeds in a predetermined manner for the remaining subscriber units.

5. The method of claim 1, wherein the sequence of subscriber units is a first sequence, and further comprising the steps of assigning further channels to further subscriber units in a second sequence, each further subscriber unit being assigned a respective one of the further channels as a primary channel and additionally being assigned at least one further channel as a secondary channel.

6. The method of claim 5, wherein the subscriber units in the first sequence are used by operators with heavy average bandwidth usage and the further subscriber units in the second sequence are used by operators with light average bandwidth usage.

7. The method of claim 5, wherein the subscriber units in the first sequence are used by a mixture of operators with heavy average bandwidth usage and operators with light average bandwidth usage, and the further subscriber units in the second sequence are also used by a mixture of operators with heavy average bandwidth usage and operators with light average bandwidth usage.

8. The method of claim 1, further comprising the step of assigning the primary channel of each subscriber unit in the sequence as a further secondary channel for one of the subscriber units in the sequence.

* * * * *